United States Patent
Fujimori et al.

(10) Patent No.: US 12,168,607 B2
(45) Date of Patent: Dec. 17, 2024

(54) METHOD FOR MANUFACTURING CARBON NANOTUBE, METHOD FOR MANUFACTURING CARBON NANOTUBE ASSEMBLED WIRE, METHOD FOR MANUFACTURING CARBON NANOTUBE ASSEMBLED WIRE BUNDLE, CARBON NANOTUBE MANUFACTURING APPARATUS, CARBON NANOTUBE ASSEMBLED WIRE MANUFACTURING APPARATUS, AND CARBON NANOTUBE ASSEMBLED WIRE BUNDLE MANUFACTURING APPARATUS

(71) Applicants: SUMITOMO ELECTRIC INDUSTRIES, LTD., Osaka (JP); UNIVERSITY OF TSUKUBA, Tsukuba (JP)

(72) Inventors: Toshihiko Fujimori, Osaka (JP); Takeshi Hikata, Osaka (JP); Soichiro Okubo, Osaka (JP); Jun-Ichi Fujita, Tsukuba (JP); Jun Otsuka, Osaka (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 600 days.

(21) Appl. No.: 17/418,564

(22) PCT Filed: Dec. 26, 2019

(86) PCT No.: PCT/JP2019/051332
§ 371 (c)(1),
(2) Date: Jun. 25, 2021

(87) PCT Pub. No.: WO2020/138378
PCT Pub. Date: Jul. 2, 2020

(65) Prior Publication Data
US 2022/0064003 A1    Mar. 3, 2022

(30) Foreign Application Priority Data

Dec. 27, 2018 (JP) ................................ 2018-245685
Sep. 3, 2019 (JP) ................................ 2019-160765

(51) Int. Cl.
     *C01B 32/16*      (2017.01)
     *B01J 8/06*      (2006.01)
     (Continued)

(52) U.S. Cl.
     CPC ............... *C01B 32/164* (2017.08); *B01J 8/06* (2013.01); *C01B 32/168* (2017.08); *D01D 5/00* (2013.01);
     (Continued)

(58) Field of Classification Search
CPC . C01B 32/164; C01B 32/168; C01B 2202/08; C01B 31/02; B01J 8/06; D01D 5/00; D01F 9/127; B82Y 40/00
See application file for complete search history.

(56) References Cited

U.S. PATENT DOCUMENTS 9,969,619 B2*   5/2018   Sundaram ............. C01B 32/162
2003/0161950 A1*   8/2003   Ajayan .................. B82Y 30/00
                                           427/249.1
(Continued)

FOREIGN PATENT DOCUMENTS

CN      101143707 A      3/2008
JP      2005-330175 A      12/2005
(Continued)

OTHER PUBLICATIONS

Behabtu Natnael et al., "Strong, Light, Multifunctional Fibers of Carbon Nanotubes with Ultrahigh Conductivity", Science, (2013), vol. 339, No. 182, pp. 182-186.
(Continued)

*Primary Examiner* — Christopher M Rodd
*Assistant Examiner* — Shibin Liang
(74) *Attorney, Agent, or Firm* — Oliff PLC

(57) ABSTRACT

A method for manufacturing a carbon nanotube includes: a growing step of growing a carbon nanotube from a catalyst particle by supplying a carbon-containing gas to the catalyst particle in a suspended state; and a drawing step of drawing the carbon nanotube by applying a tensile force to the carbon nanotube in a suspended state.

46 Claims, 16 Drawing Sheets

(51) Int. Cl.
*C01B 32/164* (2017.01)
*C01B 32/168* (2017.01)
*D01D 5/00* (2006.01)
*D01F 9/127* (2006.01)
*B82Y 40/00* (2011.01)

(52) U.S. Cl.
CPC .............. *D01F 9/127* (2013.01); *B82Y 40/00* (2013.01); *C01B 2202/08* (2013.01)

(56) References Cited

U.S. PATENT DOCUMENTS

| | | |
|---|---|---|
| 2005/0006801 A1 | 1/2005 | Kinloch et al. |
| 2005/0118090 A1 | 6/2005 | Shaffer et al. |
| 2005/0188727 A1* | 9/2005 | Greywall ............... B82Y 30/00 264/108 |
| 2007/0172410 A1 | 7/2007 | Hikata |
| 2007/0224107 A1 | 9/2007 | Hikata |
| 2017/0172410 A1 | 6/2017 | Vince et al. |
| 2019/0355490 A1 | 11/2019 | Yamazaki et al. |

FOREIGN PATENT DOCUMENTS

| | | | |
|---|---|---|---|
| JP | 2005-350281 A | 12/2005 | |
| JP | 2007-203180 A | 8/2007 | |
| JP | 2007-223823 A | 9/2007 | |
| JP | 2010-99572 A | 5/2010 | |
| JP | 5819888 B2 | 11/2015 | |
| JP | 2018-126705 A | 8/2018 | |
| WO | 2005098084 * | 10/2005 | ............. C32C 16/00 |
| WO | 2005/102923 A1 | 11/2005 | |
| WO | 2007/013579 A1 | 2/2007 | |
| WO | 2012/059716 A1 | 5/2012 | |
| WO | 2014/202740 * | 12/2014 | ............. C01B 31/02 |
| WO | 2016/208558 A | 12/2016 | |
| WO | 2018/143466 A1 | 8/2018 | |

OTHER PUBLICATIONS

Li, Ya-Li et al., "Direct Spinning of Carbon Nanotube Fibers from Chemical Vapor Deposition Synthesis", Science, (2004), vol. 304, No. XP008128720, pp. 276-278.

Duong, Hai M. et al., "Advanced Fabrication and Properties of Aligned Carbon Nanotube Composites: Experiments and Modeling", Intech, (2016), pp. 47-72.

Aug. 5, 2022 Office Action issued in United States U.S. Appl. No. 16/763,343.

Lekawa-Raus et al.; "Electrical Properties of Carbon Nanotube Based Fibers and Their Future Use in Electrical Wiring;" Advanced Functional Materials; 2014; pp. 3661-3682; vol. 24.

Wikipedia, "Bernoulli's principle", <https://web.archive.org/web/2018 0923101640/https://en.wikipedia. org/wiki/Bernoulli's_principle>, (Sep. 23, 2018), pp. 1-14.

* cited by examiner

METHOD FOR MANUFACTURING CARBON NANOTUBE, METHOD FOR MANUFACTURING CARBON NANOTUBE ASSEMBLED WIRE, METHOD FOR MANUFACTURING CARBON NANOTUBE ASSEMBLED WIRE BUNDLE, CARBON NANOTUBE MANUFACTURING APPARATUS, CARBON NANOTUBE ASSEMBLED WIRE MANUFACTURING APPARATUS, AND CARBON NANOTUBE ASSEMBLED WIRE BUNDLE MANUFACTURING APPARATUS

TECHNICAL FIELD

The present disclosure relates to a method for manufacturing a carbon nanotube, a method for manufacturing a carbon nanotube assembled wire, a method for manufacturing a carbon nanotube assembled wire bundle, a carbon nanotube manufacturing apparatus, a carbon nanotube assembled wire manufacturing apparatus, and a carbon nanotube assembled wire bundle manufacturing apparatus. The present application claims priority based on Japanese Patent Application No. 2018-245685 filed on Dec. 27, 2018, and Japanese Patent Application No. 2019-160765 filed on Sep. 3, 2019. The entire contents described in the Japanese patent applications are incorporated herein by reference.

BACKGROUND ART

A carbon nanotube (hereinafter also referred to as CNT) composed of a cylindrical graphene sheet made of carbon atoms bonded in a hexagonal pattern is a material having excellent characteristics, such as a weight that is one fifth of that of copper, a strength that is 20 times that of steel, and a metal-like electrical conductivity. Thus, an electric wire using the carbon nanotube is expected as a material contributing to decreased weight and size and improved corrosion resistance of motors for cars in particular.

The carbon nanotube is obtained, for example, through vapor deposition by supplying a carbon-containing source gas while heating a fine catalyst such as iron to grow the carbon nanotube from the catalyst, as described in PTL 1 (Japanese Patent Laid-Open No. 2005-330175).

CITATION LIST

Patent Literature

PTL 1: Japanese Patent Laid-Open No. 2005-330175

Patent Literature

NPL1: Agnieszka Lekawa-Raus et al., "Electrical Properties of Carbon Nanotube Based Fibers and Their Future Use in Electrical Wiring," Advanced Functional Materials, Vo. 24, p.p. 3661-3682 (2014). DOI: 10.1002/adfm.201303716

SUMMARY OF INVENTION

A method for manufacturing a carbon nanotube in accordance with one aspect of the present disclosure includes:
a growing step of growing a carbon nanotube from a catalyst particle by supplying a carbon-containing gas to the catalyst particle in a suspended state; and
a drawing step of drawing the carbon nanotube by applying a tensile force to the carbon nanotube in a suspended state.

A method for manufacturing a carbon nanotube assembled wire in accordance with another aspect of the present disclosure includes:
a growing step of growing a plurality of carbon nanotubes by supplying a carbon-containing gas to a plurality of catalyst particles in a suspended state to grow one or a plurality of carbon nanotubes from each of the plurality of catalyst particles;
a drawing step of drawing the plurality of carbon nanotubes by applying a tensile force to the plurality of carbon nanotubes in a suspended state; and
an assembling step of obtaining a carbon nanotube assembled wire by orienting and assembling the plurality of carbon nanotubes in the suspended state in a direction along flow of the carbon-containing gas.

A method for manufacturing a carbon nanotube assembled wire bundle in accordance with still another aspect of the present disclosure includes:
a growing step of growing a plurality of carbon nanotubes by supplying a carbon-containing gas to a plurality of catalyst particles in a suspended state to grow one or a plurality of carbon nanotubes from each of the plurality of catalyst particles;
a drawing step of drawing the plurality of carbon nanotubes by applying a tensile force to the plurality of carbon nanotubes in a suspended state;
an assembling step of obtaining a plurality of carbon nanotube assembled wires by orienting and assembling the plurality of carbon nanotubes in the suspended state in a direction along flow of the carbon-containing gas; and
a bundling step of obtaining a carbon nanotube assembled wire bundle by orienting and bundling the plurality of carbon nanotube assembled wires in a direction along a longitudinal direction of the plurality of carbon nanotube assembled wires.

A carbon nanotube manufacturing apparatus in accordance with a further aspect of the present disclosure includes:
a carbon nanotube growing unit in a tubular shape;
a gas supplying unit that supplies a carbon-containing gas into the carbon nanotube growing unit from one end of the carbon nanotube growing unit;
a catalyst supplying unit that supplies a catalyst particle into the carbon nanotube growing unit; and
a carbon nanotube drawing unit that is located on another end of the carbon nanotube growing unit and draws a carbon nanotube obtained in the carbon nanotube growing unit.

A carbon nanotube assembled wire manufacturing apparatus in accordance with a further aspect of the present disclosure includes:
a carbon nanotube growing unit in a tubular shape;
a gas supplying unit that supplies a carbon-containing gas into the carbon nanotube growing unit from one end of the carbon nanotube growing unit;
a catalyst supplying unit that supplies a catalyst particle into the carbon nanotube growing unit; and
a carbon nanotube assembling unit that is located on another end of the carbon nanotube growing unit, and orients and assembles a plurality of carbon nanotubes, which are obtained in the carbon nanotube growing unit, in a direction along flow of the carbon-containing gas.

A carbon nanotube assembled wire bundle manufacturing apparatus in accordance with a further aspect of the present disclosure includes:

a carbon nanotube assembled wire manufacturing apparatus as described above; and a bundling unit that obtains a carbon nanotube assembled wire bundle by orienting and bundling a plurality of carbon nanotube assembled wires, which are obtained by the carbon nanotube assembled wire manufacturing apparatus, in a direction along a longitudinal direction of the plurality of carbon nanotube assembled wires.

DETAILED DESCRIPTION

Figure 1:
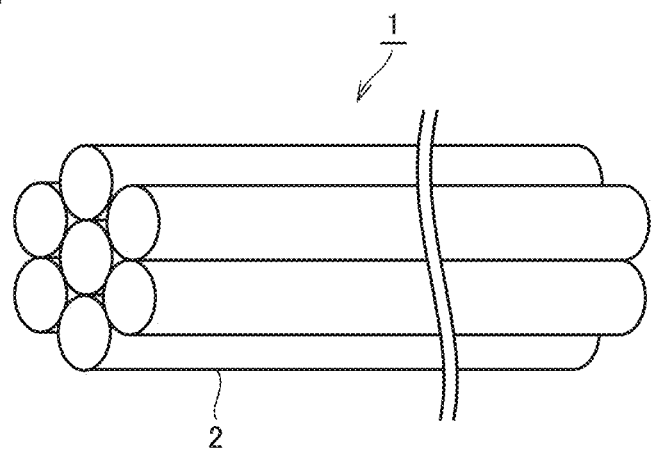
FIG. 1 is a diagram for illustrating a carbon nanotube assembled wire in accordance with an embodiment of the present disclosure.

Problem to be Solved by the Present Disclosure

Carbon nanotubes obtained with the state of the art of producing carbon nanotubes have a diameter of about 0.4 nm to 20 nm and a maximum length of about 55 cm. In order to use a carbon nanotube as an electric wire, a high strength material and the like, the carbon nanotube needs to be longer, and accordingly, techniques capable of elongating a carbon nanotube have been studied.

As one method for elongating a carbon nanotube, a method for orienting and assembling a plurality of carbon nanotubes together in a longitudinal direction to be an assembled wire may be considered.

As one such method, there been studied a method for obtaining a CNT assembled wire by mixing a plurality of non-oriented CNTs with a dispersing agent (e.g., a surfactant, a polymer, or the like) and injection-molding the mixture into fibers (see NPL 1: Agnieszka Lekawa-Raus et al., "Electrical Properties of Carbon Nanotube Based Fibers and Their Future Use in Electrical Wiring," Advanced Functional Materials, Vo. 24, p.p. 3661-3682 (2014). DOI:

10.1002/adfm.201303716). This method includes the step of removing the dispersing agent, and it is difficult to control orientation of a CNT single wire serving as a constituent unit of the assembled wire. In addition, the dispersing agent partially remains in the CNT assembled wire after the dispersing agent is removed, and this tends to impair characteristics such as electric conductivity and mechanical strength that the CNT has.

Accordingly, an object of the present disclosure is to provide a CNT manufacturing method and apparatus capable of elongating a CNT. It is another object of the present disclosure to provide a CNT assembled wire, a CNT assembled wire bundle, a CNT assembled wire manufacturing apparatus, and a CNT assembled wire bundle manufacturing apparatus capable of orienting and assembling CNTs together in a longitudinal direction to obtain an elongated CNT assembled wire and a bundle of such elongated CNT assembled wires.

Advantageous Effect of the Present Disclosure

In accordance with the above aspect, an elongated CNT can be provided. Further, in accordance with the above aspect, there can be provided a CNT assembled wire formed of CNTs oriented and assembled together in their longitudinal direction, and elongated, and a bundle of such CNT assembled wires.

Description of Embodiments of the Present Disclosure

First, aspects of the present disclosure will be described one by one.
(1) A method for manufacturing a carbon nanotube in accordance with one aspect of the present disclosure includes:
a growing step of growing a carbon nanotube from a catalyst particle by supplying a carbon-containing gas to the catalyst particle in a suspended state; and
a drawing step of drawing the carbon nanotube by applying a tensile force to the carbon nanotube in a suspended state.
Thus, an elongated CNT can be provided.
(2) Preferably, in the drawing step, the carbon nanotube is oriented and drawn in a direction along flow of the carbon-containing gas. Thus, the carbon nanotube is less susceptible to bending, and the carbon nanotube in a linear shape including a tube portion T that is composed of only six-membered rings of carbon can be obtained. The carbon nanotube composed of only six-membered rings of carbon is slow in rate of degradation, and can accordingly keep its quality.
(3) Preferably, the tensile force is applied to the carbon nanotube by varying a flow velocity of the carbon-containing gas. Thus, the CNT can be drawn by means of the carbon-containing gas, and therefore, use of a special mechanism for drawing the CNT is unnecessary, which is advantageous in terms of the manufacturing cost.
(4) Preferably, an average flow velocity of the carbon-containing gas at a downstream side is higher than an average flow velocity of the carbon-containing gas at an upstream side. Thus, a tensile force toward the downstream side can be applied to the carbon nanotube.
(5) Preferably, the tensile force is applied to the carbon nanotube by means of a magnetic field. Thus, a magnetic force acts directly on metal contained in the CNT, so that the CNT can be oriented and drawn in the direction along magnetic lines of force.
(6) Preferably, the tensile force is applied to the carbon nanotube by means of an electric field. Thus, an electrostatic force acts directly on the CNT as well as metal contained in the CNT, so that the CNT can be oriented and drawn in the direction along electric lines of force.
(7) A method for manufacturing a carbon nanotube assembled wire in accordance with one aspect of the present disclosure includes:
a growing step of growing a plurality of carbon nanotubes by supplying a carbon-containing gas to a plurality of catalyst particles in a suspended state to grow one or a plurality of carbon nanotubes from each of the plurality of catalyst particles;
a drawing step of drawing the plurality of carbon nanotubes by applying a tensile force to the plurality of carbon nanotubes in a suspended state; and
an assembling step of obtaining a carbon nanotube assembled wire by orienting and assembling the plurality of carbon nanotubes in the suspended state in a direction along flow of the carbon-containing gas.
Thus, CNTs can be oriented and assembled in the longitudinal direction to provide the elongated CNT assembled wire.
(8) Preferably, in the drawing step, the plurality of carbon nanotubes are oriented and drawn in the direction along flow of the carbon-containing gas. Thus, the CNT having its shape along the flow of the carbon-containing gas can be obtained.
(9) Preferably, the drawing step and the assembling step are performed simultaneously. Thus, the time required for the drawing step and the assembling step can be shortened. Further, use of a separate mechanism for growing the CNT and drawing the CNT is unnecessary, which is advantageous in terms of the manufacturing cost.
(10) Preferably, the tensile force is applied to the plurality of carbon nanotubes by varying a flow velocity of the carbon-containing gas. Thus, the CNT can be drawn by using the carbon-containing gas, and therefore, use of a special mechanism for drawing the CNT is unnecessary, which is advantageous in terms of the manufacturing cost.
(11) Preferably, an average flow velocity of the carbon-containing gas at a downstream side is higher than an average flow velocity of the carbon-containing gas at an upstream side. Thus, a tensile force toward the downstream side can be applied to the carbon nanotubes.
(12) Preferably, the tensile force is applied to the plurality of carbon nanotubes by means of a magnetic field. Thus, a magnetic force acts directly on each of the CNTs, and the CNTs can be oriented and drawn in the direction along magnetic lines of force.
(13) Preferably, the tensile force is applied to the carbon nanotubes by means of an electric field. Thus, an electrostatic force acts directly on each of the CNTs, so that the CNTs can be oriented and drawn in the direction along electric lines of force.
(14) Preferably, in the assembling step, the plurality of carbon nanotubes that are oriented are caused to approach each other. Thus, in the resultant CNT assembled wire, the oriented carbon nanotubes can be achieved.

(15) Preferably, in the growing step, the plurality of carbon nanotubes and the carbon-containing gas pass through a first flow channel, in the assembling step, the plurality of carbon nanotubes and the carbon-containing gas pass through one or more second flow channels located downstream of the first flow channel, and the one or more second flow channels each have an area in cross section smaller than an area in cross section of the first flow channel.

Thus, a tensile force toward the downstream side can be applied to the carbon nanotubes.

(16) Preferably, the carbon-containing gas located downstream of the one or more second flow channels is lower in temperature than the carbon-containing gas located upstream of the one or more second flow channels. Thus, CNTs are assembled together easily.

(17) Preferably, the carbon-containing gas located upstream of the one or more second flow channels has a temperature of 800° C. or more, and the carbon-containing gas located downstream of the one or more second flow channels has a temperature of 600° C. or less. Thus, CNTs are assembled together easily.

(18) Preferably, in the one or more second flow channels, the carbon-containing gas at a downstream side is lower in temperature than the carbon-containing gas at an upstream side, and in the one or more second flow channels, the carbon-containing gas at a downstream end has a temperature of 600° C. or less.

Thus, CNTs are assembled together easily in the second flow channel.

(19) Preferably, a first region in which the carbon-containing gas has a temperature of 600° C. or less is located on a downstream side in the one or more second flow channels, and the first region has a length of 1 cm or more in a longitudinal direction of the one or more second flow channels.

Thus, CNTs are assembled together easily in the second flow channel.

(20) Preferably, the one or more second flow channels each have an area in cross section of 0.01 mm$^2$ or more and 4 mm$^2$ or less. Thus, the diameter of the CNT is reduced easily.

(21) Preferably, a ratio S1/S2 is 100 or more and 1000000 or less, where S1 is an area in cross section of the first flow channel and S2 is an area in cross section of each of the one or more second flow channels. Thus, the CNTs are drawn easily and the diameter of the CNTs is reduced easily.

(22) Preferably, in the assembling step, the plurality of carbon nanotubes are reduced in diameter. Thus, the CNT assembled wire including CNTs of a smaller diameter can be obtained.

(23) Preferably, the one or more second flow channels each have a length of 10 mm or more and 200 mm or less. Thus, the CNTs are drawn easily and the diameter of the CNTs is reduced easily.

(24) Preferably, the one or more second flow channels each have a shape of a through hole with a helical groove in a periphery of the through hole. Thus, the gas in the second flow channel flows helically, so that a uniform twist angle is formed easily in the CNT assembled wire.

(25) Preferably, each second flow channel of the one or more second flow channels has an area in cross section smaller in a downstream side of the second flow channel than in an upstream side of the second flow channel. Thus, CNTs are assembled easily in the second flow channel, so that the CNT assembled wire is formed easily.

(26) A method for manufacturing a carbon nanotube assembled wire bundle in accordance with one aspect of the present disclosure includes:

a growing step of growing a plurality of carbon nanotubes by supplying a carbon-containing gas to a plurality of catalyst particles in a suspended state to grow one or a plurality of carbon nanotubes from each of the plurality of catalyst particles;

a drawing step of drawing the plurality of carbon nanotubes by applying a tensile force to the plurality of carbon nanotubes in a suspended state;

an assembling step of obtaining a plurality of carbon nanotube assembled wires by orienting and assembling the plurality of carbon nanotubes in the suspended state in a direction along flow of the carbon-containing gas; and a bundling step of obtaining a carbon nanotube assembled wire bundle by orienting and bundling the plurality of carbon nanotube assembled wires in a direction along a longitudinal direction of the plurality of carbon nanotube assembled wires.

Thus, CNTs can be oriented and assembled in the longitudinal direction to provide the elongated CNT assembled wire bundle.

(27) Preferably, the bundling step includes: an adhering step of adhering a volatile liquid to the plurality of carbon nanotube assembled wires; and an evaporating step of evaporating the volatile liquid adhered to the plurality of carbon nanotube assembled wires. Thus, the obtained CNT assembled wire bundle has an enhanced density.

(28) Preferably, the adhering step is performed before orienting and bundling the plurality of carbon nanotube assembled wires in the direction in the longitudinal direction of the plurality of carbon nanotube assembled wires. Thus, in the process of evaporating the liquid penetrating in gaps between carbon nanotube filaments, the carbon nanotube filaments can be caused to approach each other and bonded firmly.

(29) Preferably, the adhering step is performed after orienting and bundling the plurality of carbon nanotube assembled wires in the direction along the longitudinal direction of the plurality of carbon nanotube assembled wires. Thus, in the process of evaporating the liquid penetrating in gaps between carbon nanotube filaments, the carbon nanotube filaments can be caused to approach each other and bonded firmly.

(30) Preferably, the bundling step is performed while tension is applied to the plurality of carbon nanotube assembled wires. Thus, the obtained CNT assembled wire bundle has an enhanced strength.

(31) Preferably, in the growing step, the plurality of carbon nanotubes and the carbon-containing gas pass through a first flow channel, in the assembling step and the bundling step, the plurality of carbon nanotubes and the carbon-containing gas pass through one or more second flow channels located downstream of the first flow channel, and the one or more second flow channels each have an area in cross section smaller than an area in cross section of the first flow channel.

Thus, a tensile force toward the downstream side can be applied to the carbon nanotubes.

(32) Preferably, the one or more second flow channels each have a shape of a through hole with a helical groove in a periphery of the through hole. Thus, the gas in the second flow channel flows helically, so that a uniform twist angle is formed easily in the CNT assembled wire.

(33) Preferably, the one or more second flow channels are a plurality of second flow channels, and
a distance between nearest neighbor second flow channels of the plurality of second flow channels is shorter in a downstream side of the nearest neighbor second flow channels than in an upstream side of the nearest neighbor second flow channels. Thus, CNT assembled wires are bundled together easily, so that the CNT assembled wire bundle is formed easily.

(34) Preferably, each second flow channel of the second flow channels has an area in cross section smaller in a downstream side of the second flow channel than in an upstream side of the second flow channel. Thus, in the second flow channels, CNTs are assembled easily and CNT assembled wires are assembled easily, so that the CNT assembled wire and the CNT assembled wire bundle are formed easily.

(35) A carbon nanotube manufacturing apparatus in accordance with one aspect of the present disclosure includes:
a carbon nanotube growing unit in a tubular shape;
a gas supplying unit that supplies a carbon-containing gas into the carbon nanotube growing unit from one end of the carbon nanotube growing unit;
a catalyst supplying unit that supplies a catalyst particle into the carbon nanotube growing unit; and
a carbon nanotube drawing unit that is located on another end of the carbon nanotube growing unit and draws a carbon nanotube obtained in the carbon nanotube growing unit.

Thus, the elongated CNT can be provided.

(36) A carbon nanotube assembled wire manufacturing apparatus in accordance with one aspect of the present disclosure includes:
a carbon nanotube growing unit in a tubular shape;
a gas supplying unit that supplies a carbon-containing gas into the carbon nanotube growing unit from one end of the carbon nanotube growing unit;
a catalyst supplying unit that supplies a catalyst particle into the carbon nanotube growing unit; and
a carbon nanotube assembling unit that is located on another end of the carbon nanotube growing unit, and orients and assembles a plurality of carbon nanotubes obtained in the carbon nanotube growing unit, in a direction along flow of the carbon-containing gas.

Thus, CNTs can be oriented and assembled in the longitudinal direction to provide the elongated CNT assembled wire.

(37) Preferably, in the carbon nanotube assembling unit, the carbon nanotubes obtained in the carbon nanotube growing unit are drawn. Thus, use of a separate mechanism for growing the CNT and drawing the CNT is unnecessary, which is advantageous in terms of the manufacturing cost. Further, the time required for the drawing step and the assembling step can be shortened.

(38) Preferably, an average flow velocity of the carbon-containing gas in the carbon nanotube assembling unit is higher than an average flow velocity of the carbon-containing gas in the carbon nanotube growing unit. Thus, in the carbon nanotube assembling unit, a tensile force can be applied to the CNT.

(39) Preferably, the carbon nanotube growing unit has a first flow channel in the carbon nanotube growing unit, the carbon nanotube assembling unit has one or more second flow channels in the carbon nanotube assembling unit, and
the one or more second flow channels each have an area in cross section smaller than an area in cross section of the first flow channel.

Thus, a tensile force toward the downstream side can be applied to the carbon nanotube.

(40) Preferably, the carbon nanotube assembling unit has a honeycomb structure. Thus, in the carbon nanotube assembling unit, a tensile force can be applied to the CNT and simultaneously, a plurality of carbon nanotubes that have been oriented can be caused to approach each other.

(41) Preferably, the honeycomb structure is a honeycomb structural body having a plurality of second flow channels formed by a plurality of through holes, and the second flow channels each have an area in cross section of 0.01 $mm^2$ or more and 4 $mm^2$ or less. Thus, the diameter of the CNT is reduced easily.

(42) Preferably, a ratio S1/S2 is 100 or more and 1000000 or less, where S1 is an area in cross section of the first flow channel and S2 is an area in cross section of each of the second flow channels. Thus, the CNT is drawn easily and the diameter of the CNT is reduced easily.

(43) Preferably, in the carbon nanotube assembling unit, the plurality of carbon nanotubes are reduced in diameter. Thus, the CNT assembled wire including CNTs of a smaller diameter can be obtained.

(44) Preferably, the second flow channels of the carbon nanotube assembling unit each have a length of 10 mm or more and 200 mm or less. Thus, the CNT is drawn easily and the diameter of the CNT is reduced easily.

(45) Preferably, the second flow channels each have a shape of a through hole with a helical groove in a periphery of the through hole. Thus, the gas in the second flow channel flows helically, so that a uniform twist angle is formed in the CNT assembled wire.

(46) Preferably, each second flow channel of the second flow channels has an area in cross section smaller in a downstream side of the second flow channel than in an upstream side of the second flow channel. Thus, the CNTs are assembled easily in the second flow channel, so that the CNT assembled wire is formed easily.

(47) A carbon nanotube assembled wire bundle manufacturing apparatus in accordance with one aspect of the present disclosure preferably includes:
a carbon nanotube assembled wire manufacturing apparatus as described above; and
a bundling unit that obtains a carbon nanotube assembled wire bundle by orienting and bundling a plurality of carbon nanotube assembled wires, which are obtained by the carbon nanotube assembled wire manufacturing apparatus, in a direction along a longitudinal direction of the plurality of carbon nanotube assembled wires.

Thus, the CNTs can be oriented and assembled in the longitudinal direction to provide the elongated CNT assembled wire bundle.

(48) Preferably, the bundling unit includes a liquid adhering apparatus that adheres a volatile liquid to the plurality of carbon nanotube assembled wires. Thus, the CNT assembled wire bundle having a high density can be provided.

(49) Preferably, the bundling unit includes a winding apparatus that winds the plurality of carbon nanotube assembled wires oriented and bundled in the direction along the longitudinal direction of the plurality of carbon nanotube assembled wires while applying tension to the plurality of carbon nanotube assembled wires. Thus, the efficiency of manufacture of the CNT assembled wire bundle is improved.

(50) Preferably, the carbon nanotube assembling unit and the bundling unit are formed of the same honeycomb structural body having a plurality of second flow channels, and the second flow channels each have a shape of a through hole with a helical groove in a periphery of the through hole.

Thus, the gas in the second flow channel flows helically, so that a uniform twist angle is formed easily in the CNT assembled wire.

(51) Preferably, a distance between nearest neighbor second flow channels of the plurality of second flow channels is shorter in a downstream side of the nearest neighbor second flow channels than in an upstream side of the nearest neighbor second flow channels. Thus, the CNT assembled wires are bundled easily, so that the CNT assembled wire bundle is formed easily.

(52) Preferably, each second flow channel of the second flow channels has an area in cross section smaller in a downstream side of the second flow channel than in an upstream side of the second flow channel. Thus, in the second flow channels, CNTs are assembled easily and CNT assembled wires are assembled easily, so that the CNT assembled wire and the CNT assembled wire bundle are formed easily.

Thus, the CNT assembled wire bundle having a high strength can be provided.

In the drawings of the present disclosure, the same reference numerals designate identical or corresponding parts. In addition, dimensional relations in length, width, thickness, depth, and the like are changed as appropriate for clarity and simplicity of the drawings, and do not necessarily represent actual dimensional relations.

In the present specification, an expression in the form of "A to B" means a range's upper and lower limits (that is, A or more and B or less), and when A is not accompanied by any unit and B is alone accompanied by a unit, A has the same unit as B. Further, a range having an upper limit value of C means that the range has an upper limit which is C or less, and a range having a lower limit value of D means that the range has a lower limit which is D or more.

Embodiment 1: Method for Manufacturing Carbon Nanotube

A method for manufacturing a carbon nanotube in accordance with Embodiment 1 will now be described. A method for manufacturing a carbon nanotube includes: supplying a carbon-containing gas to suspended catalyst particles to grow carbon nanotubes from the catalyst particles (hereinafter also referred to as a growing step); and applying a tensile force to the suspended carbon nanotubes to draw the carbon nanotubes (hereinafter also referred to as a drawing step).

Figure 18:
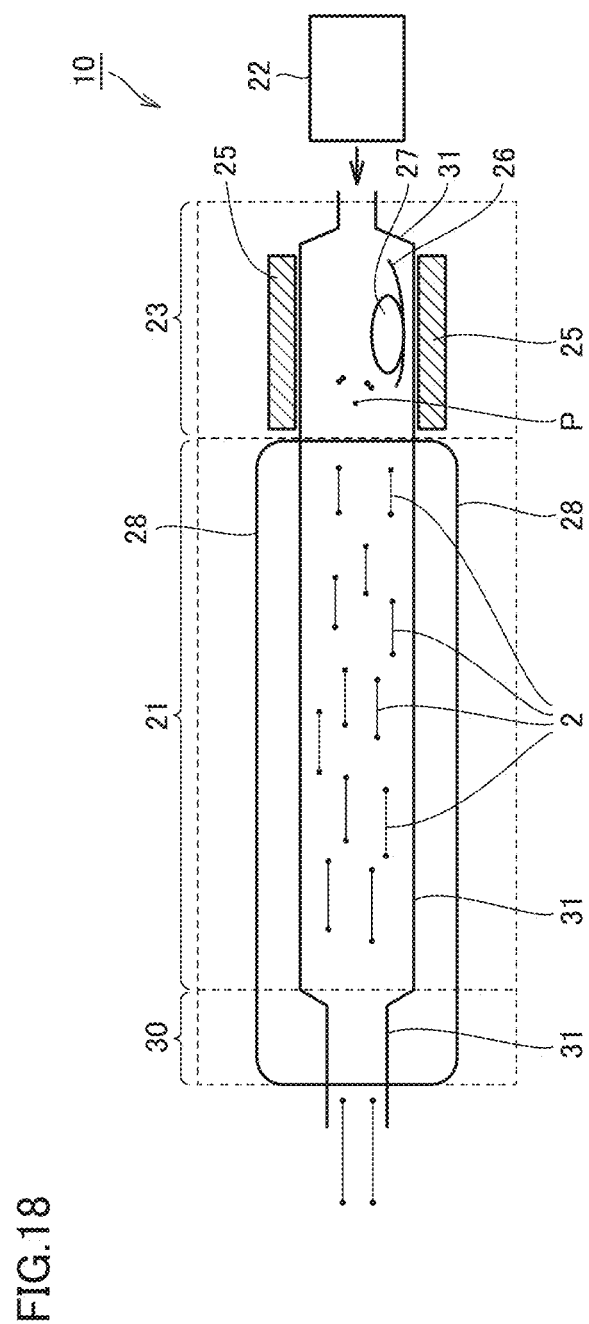
FIG. 18 is a diagram for illustrating a carbon nanotube manufacturing apparatus in accordance with an embodiment of the present disclosure.

The method for manufacturing a carbon nanotube in accordance with Embodiment 1 can be manufactured by, for example, a carbon nanotube manufacturing apparatus 10 shown in FIG. 18. Carbon nanotube manufacturing apparatus 10 can include: a tubular carbon nanotube growing unit (hereinafter also referred to as a CNT growing unit) 21; a gas supplying unit 22 that supplies a carbon-containing gas into CNT growing unit 21 from one end of CNT growing unit 21 (in FIG. 18, a right end thereof); a catalyst supplying unit 23 that supplies catalyst particles P into CNT growing unit 21; and a carbon nanotube drawing unit (hereinafter also referred to as a CNT drawing unit) 30 that is disposed at the other end of CNT growing unit 21 (in FIG. 18, a left end thereof) and draws a carbon nanotube obtained in CNT growing unit 21. CNT growing unit 21, CNT drawing unit 30, and catalyst supplying unit 23 include an uninterrupted reactor tube 31, and CNTs are manufactured inside reactor tube 31.

<Growing Step>

In the growth step, carbon nanotubes are grown from catalyst particles by supplying a carbon-containing gas to the catalyst particles in a suspended state. In the present specification, in the growing step, the CNT has a length of 20 µm or less.

The growing step is performed inside CNT growing unit 21. The growing step is preferably performed at a temperature of 800° C. or more and 1200° C. or less. If the temperature is less than 800° C., CNTs tend to be grown at a slower rate. On the other hand, when the temperature exceeds 1200° C., content of impurity carbon tends to increase. The growing step is performed under a condition in temperature of more preferably 900° C. or more and 1150° C. or less, and still more preferably 950° C. or more and 1050° C. or less.

By wind pressure of the carbon-containing gas supplied from gas supplying unit 22 to catalyst supplying unit 23 and CNT growing unit 21, a catalyst 27 disposed inside catalyst supplying unit 23 is disintegrated and thus becomes catalyst particles P, and catalyst particles P are supplied into CNT growing unit 21.

Examples of catalyst particles P include iron, nickel, cobalt, molybdenum, gold, silver, copper, palladium, and platinum. Inter alia, iron is preferably used from the viewpoint of mass production of elongate CNTs.

The carbon-containing gas is supplied from gas supplying unit 22 to CNT growing unit 21 via catalyst supplying unit 23. As the carbon-containing gas, a reducing gas such as hydrocarbon gas is used. As such a carbon-containing gas, for example, a gaseous mixture of methane and argon, a gaseous mixture of ethylene and argon, a gaseous mixture of ethanol and argon, or the like can be used. The carbon-containing gas preferably includes carbon disulfide ($CS_2$) as an assistive catalyst.

The lower limit for the average flow velocity in the CNT growing unit of the carbon-containing gas supplied from gas supplying unit 22 is 0.05 cm/sec, preferably 0.10 cm/sec, and more preferably 0.20 cm/sec. On the other hand, the upper limit for the average flow velocity in CNT growing unit 21 is preferably 10.0 cm/sec, more preferably 5.0 cm/sec. If the average flow velocity of the carbon-containing gas in CNT growing unit 21 is less than the lower limit, a carbon source gas supplied to catalyst particles P is insufficiently supplied, and carbon nanotubes formed between catalyst particles P tend to grow stagnantly. On the contrary, if the average flow velocity of the carbon-containing gas in CNT growing unit 21 exceeds the upper limit, this tends to detach carbon nanotubes from catalyst particles P, which stops growth of the carbon nanotubes and consequently inhibits formation of carbon nanotubes.

The lower limit for the Reynolds number of the flow in CNT growing unit 21 of the carbon-containing gas supplied from gas supplying unit 22 is preferably 0.01, and more preferably 0.05. On the other hand, the upper limit for the Reynolds number is 1000, preferably 100, and more preferably 10. If the Reynolds number is less than the lower limit, the apparatus is excessively restricted in design, which may make carbon nanotube assembled wire manufacturing apparatus 20 unnecessarily expensive and tends to unnecessarily lower efficiency of manufacturing carbon nanotubes. A Reynolds number exceeding the upper limit tends to disturb flow of the carbon-containing gas and inhibit production of carbon nanotubes between catalyst particles P.

The length of the CNT obtained through the growing step is preferably 0.1 µm or more and 20 µm or less. If the length of the CNT obtained through the growing step is less than 0.1 µm, adjacent CNTs would not be oriented in the longitudinal direction and instead entangled, and tend to form secondary particles. On the other hand, when the length of the CNT exceeds 20 µm, a period of time before a drawing step is performed is increased, which tends to unnecessarily decrease efficiency of manufacturing the carbon nanotube. The length of the CNT obtained through the growing step is more preferably 0.5 µm or more and 15 µm or less, and still more preferably 1 µm or more and 10 µm or less. The length of the CNT can be measured through observation with a scanning electron microscope.

<Drawing Step>

Subsequently, a tensile force is applied to carbon nanotubes in a suspended state that are obtained in the growing step to draw the carbon nanotubes.

The drawing step is performed inside CNT drawing unit 30. In the drawing step, the carbon nanotubes are preferably oriented and drawn in a direction along the flow of the carbon-containing gas. According to this, the carbon nanotube is not easily bent, and a linear carbon nanotube having tube portion T composed only of a six-membered ring of carbon can be obtained. The carbon nanotube consisting of a six-membered ring of carbon is resistant to deterioration and can thus maintain quality.

The tensile force is preferably applied to a plurality of carbon nanotubes by varying the carbon-containing gas in flow velocity. For example, by making an average flow velocity of the carbon-containing gas on the downstream side larger than that of the carbon-containing gas on the upstream side, a tensile force can be applied to the CNT in a direction toward the downstream side. When a tensile force acts on an end of the carbon nanotube, the carbon nanotube is pulled while extending from catalyst particle P, and thus drawn in the longitudinal direction while it is plastically deformed and reduced in diameter.

As a method for making the average flow velocity of the carbon-containing gas on the downstream side larger than the average flow velocity of the carbon-containing gas on the upstream side, for example, a hollow portion which passes the carbon-containing gas is formed to have a cross section smaller in area on the downstream side of the carbon-containing gas than the upstream side of the carbon-containing gas. More specifically, (i) a hollow portion in the CNT drawing unit (corresponding to a downstream side) passing the carbon-containing gas may have a cross section smaller in area than a hollow portion in the CNT growing unit (corresponding to an upstream side) passing the carbon-containing gas, and (ii) in the CNT drawing unit, a hollow portion which passes the carbon-containing gas may be formed to have a cross section smaller in area on the downstream side of the carbon-containing gas than the upstream side of the carbon-containing gas. This generates an acceleration field in the vicinity of a region in which the hollow portion has a cross section reduced in area, and provides the carbon-containing gas with a faster flow velocity.

In the case (i), the CNT drawing unit preferably has the hollow portion with an area in cross section of 0.0001% or more and 35% or less, more preferably 0.001% or more and 35% or less, still more preferably 0.005% or more and 20% or less, and still more preferably 0.01% or more and 5% or less of that in cross section of the hollow portion of the CNT growing unit. When the area in cross section of the hollow portion of the CNT drawing unit is larger than 35% of the area in cross section of the hollow portion of the CNT growing unit, the acceleration field tends to be less likely generated. On the other hand, when the area in cross section of the hollow portion of the CNT drawing unit is less than 0.0001% of the area in cross section of the hollow portion of the CNT growing unit, the CNT tends clog.

In the present specification, unless otherwise specified, the area in cross section of the hollow portion of the CNT growing unit is fixed from the upstream side to the downstream side except for a portion of both ends thereof. In the present specification, when the CNT drawing unit has a plurality of hollow portions, the area in cross section of the hollow portion of the CNT drawing unit means an area in cross section of a single hollow portion. In the present specification, unless otherwise specified, the area in cross section of the hollow portion of the CNT drawing unit is fixed from the upstream side to the downstream side except for a portion of both ends thereof. Herein, an area in cross section being fixed means that the area in cross section has a maximum value and a minimum value with an average value falling within +5%.

When the area in cross section of the hollow portion of the CNT drawing unit is 1% or less of the area in cross section of the CNT growing unit, there may be a high possibility that CNTs are assembled together to form a CNT assembled wire. Therefore, when it is desired to collect a larger amount of single CNTs, the area in cross section of the hollow portion of the CNT drawing unit is preferably larger than 1% and 35% or less of the area in cross section of the CNT growing unit.

In the case (i), the area in cross section of the CNT growing unit can for example be 70 $mm^2$ or more and 7000 $mm^2$ or less. The area in cross section of the CNT drawing unit can for example be 0.005 $mm^2$ or more and 50 $mm^2$ or less. When the area in cross section of the CNT drawing unit is 4 $mm^2$ or less, there may be a high possibility that CNTs are assembled together to form a CNT assembled wire. Therefore, when it is desired to collect a larger amount of single CNTs, the area in cross section of the CNT drawing unit is preferably larger than 4 $mm^2$ and 50 $mm^2$ or less.

In the case (ii), in the CNT drawing unit, the area in cross section of the hollow portion on the downstream side of the carbon-containing gas is preferably 0.001% or more and 35% or less, more preferably 0.005% or more and 20% or less, and still more preferably 0.010% or more and 5% or less of the area in cross section of the hollow portion on the upstream side of the carbon-containing gas. When the area in cross section of the hollow portion on the downstream side is larger than 35% of the area in cross section of the hollow portion on the upstream side, the acceleration field tends to be less likely generated. On the other hand, when the area in cross section of the hollow portion on the downstream side is less than 0.001% of the area in cross section of the hollow portion on the upstream side, CNTs tend to clog.

In the case (ii), the area in cross section of the hollow portion on the downstream side can for example be 0.005 mm² or more and 50 mm² or less. The area in cross section on the upstream side can for example be 70 mm² or more and 7000 mm² or less.

The lower limit for the average flow velocity of the carbon-containing gas in CNT drawing unit 30 is 0.05 cm/sec, preferably 0.2 cm/sec, and more preferably 1 cm/sec. On the other hand, the upper limit for the average flow velocity in CNT drawing unit 30 is preferably 10 cm/sec, more preferably 5 cm/sec. When the average flow velocity of the carbon-containing gas in CNT drawing unit 30 is less than 0.05 cm/sec, a sufficient tensile force is not applied to the carbon nanotube, and the carbon nanotube tends to be drawn stagnantly. On the contrary, if the average flow velocity of the carbon-containing gas in CNT drawing unit 30 exceeds 10 cm/sec, this tends to detach carbon nanotubes from catalyst particles P, which stops growth of the carbon nanotubes and consequently inhibits formation of carbon nanotubes.

The lower limit for the Reynolds number of the flow of the carbon-containing gas in CNT drawing unit 30 is preferably 0.01, and more preferably 0.05. On the other hand, the upper limit for the Reynolds number is 1000, preferably 100, and more preferably 10. If the Reynolds number is less than 0.01, the apparatus is excessively restricted in design, which may make carbon nanotube manufacturing apparatus 10 unnecessarily expensive and tends to unnecessarily lower efficiency of manufacturing carbon nanotubes. A Reynolds number exceeding 1000 tends to disturb flow of the carbon-containing gas and inhibit drawing of carbon nanotubes between catalyst particles P.

The tensile force is preferably applied to a carbon nanotube by using a magnetic field. For example, in the CNT drawing unit, an electric wire can be disposed in the form of a coil surrounding a reactor tube and a current can be passed through the electric wire to generate a magnetic line of force inside the reactor tube in a direction along the central axis of the reactor tube to apply tensile force derived from a magnetic field to a CNT. By applying a magnetic field when drawing a CNT, a magnetic force directly acts on metal included in the CNT, and the CNT can thus be oriented and drawn in a direction along a magnetic line of force passing inside the reactor tube.

The tensile force is preferably applied to a carbon nanotube by using an electric field. For example, in the CNT drawing unit, a positive electrode made of a conductive material is disposed on a downstream side of the carbon-containing gas and a negative electrode made of a conductive material is disposed on an upstream side of the carbon-containing gas, and an electric field along the central axis of the reactor tube is generated to allow tensile force derived from the electric field to be applied to a CNT. By applying an electric field when drawing a CNT, electrostatic force acts directly on each one of CNTs, and the CNTs can be oriented and drawn in a direction along an electric line of force.

Figure 6:
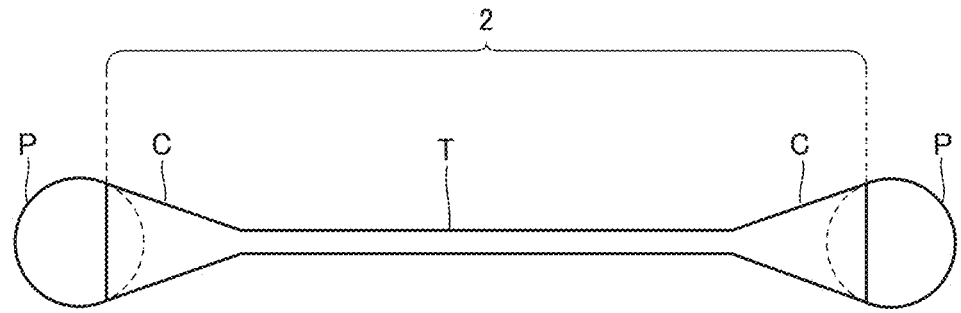
FIG. 6 is a view showing an example of a carbon nanotube used in one embodiment of the present disclosure.

While the carbon nanotube is drawn by tensile force, the carbon nanotube is grown on particle P while having its initial diameter. Thus, the carbon nanotube produced through the drawing step can include a tubular tube portion T and conical cone portions C which expand continuously in diameter from ends of the tube portion, as shown in FIG. 6.

That is, in the drawing step, a carbon nanotube formed through vapor deposition is stretched by tensile force simultaneously with the formation thereof to thereby convert some hexagonal cells of the carbon nanotube into pentagonal cells to form the conical cone portion, and convert the pentagonal cells again into hexagonal cells to form the tube portion which is a carbon nanotube with a smaller diameter.

In the drawing step, a carbon nanotube grown on catalyst particle P is grown while being stretched by using tensile force, and the tube portion can be formed at an extremely larger rate than the carbon nanotube is grown on catalyst particle P. Thus, a long carbon nanotube can be formed in a relatively short period of time. Thus, a sufficiently long carbon nanotube can be formed even if a condition allowing the carbon nanotube to be continuously grown on catalyst particle P can only be maintained for a short period of time.

It is believed that in the drawing step, causing a tensile force to act on a carbon nanotube on catalyst particle P promotes incorporation of carbon atoms at a growth point of the carbon nanotube. Thus, it is believed that the carbon nanotube can be grown further faster and hence increased in length further faster.

It is believed that, in the drawing step, by causing tensile force to act on a carbon nanotube on catalyst particle P, the carbon nanotube is less likely to be curved, and thus a linear carbon nanotube composed of a cylindrical body formed of a sheet with tube portion T consisting of a six-membered ring of carbon can be obtained. The carbon nanotube consisting of a six-membered ring of carbon is resistant to deterioration and can thus maintain quality.

The length of the CNT obtained through the drawing step is preferably 10 μm or more, and further preferably 100 μm or more. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

Embodiment 2: Carbon Nanotube

A carbon nanotube manufactured in the method for manufacturing a carbon nanotube in accordance with Embodiment 1 will now be described with reference to FIG. 6.

(Shape of Carbon Nanotube)

The carbon nanotube can be a CNT of a known structure. Examples of the carbon nanotube that can be used include a single-layer carbon nanotube in which only a single carbon layer (graphene) has a cylindrical shape, a double-layer carbon nanotube or a multilayer carbon nanotube in which a stacked body of a plurality of carbon layers has a cylindrical shape, and the like.

The shape of the carbon nanotube is not particularly limited, and both a carbon nanotube having closed ends and a carbon nanotube having opened ends can be used. Further, as shown in FIG. 6, carbon nanotube 2 may have a tube portion T having one or both ends with a catalyst P, which is used in producing the carbon nanotube, adhering thereto. In addition, a cone portion C made of a conical graphene may be formed at one end or both ends of tube portion T of carbon nanotube 2.

The length of the carbon nanotube can be selected as appropriate depending on the application. The length of the carbon nanotube is preferably 10 μm or more, and further preferably 100 μm or more, for example. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

The diameter of the carbon nanotube is preferably 0.6 nm or more and 20 nm or less, and further preferably 1 nm or more and 10 nm or less. In particular, when the diameter of the carbon nanotube is 1 nm or more and 10 nm or less, such a diameter is suitable from the viewpoint of heat resistance under oxidizing conditions.

How the diameter of the carbon nanotube is measured is the same as has been described in comparing a distance between CNTs and an average diameter of the CNTs, and accordingly, will not be described repeatedly. When the CNT includes a cone portion at one end or both ends thereof, the diameter is measured at a location other than the cone portion.

(D/G Ratio)

The carbon nanotube preferably has a D/G ratio of 0.1 or less, the D/G ratio being a ratio of a peak intensity of a D band to a peak intensity of a G band in a Raman spectroscopic analysis with a wavelength of 532 nm.

The G band is a peak originating in the CNT seen in the vicinity of a Raman shift of 1590 $cm^{-1}$ in a Raman spectrum obtained through Raman spectroscopy. The D band is a peak originating in amorphous carbon or a defect in graphite or the CNT seen in the vicinity of a Raman shift of 1350 $cm^{-1}$ in the Raman spectrum obtained through Raman spectroscopy. Therefore, as the D/G ratio has a smaller value, the carbon nanotube has a higher crystallinity, and the carbon nanotube contains a smaller amount of amorphous carbon or defective graphite.

A CNT having a D/G ratio of 0.1 or less has little amorphous carbon or defective graphite, and hence has high crystallinity. Thus, the CNT can have high tensile strength and high electrical conductivity. If the D/G ratio of the CNT exceeds 0.1, the CNT may be unable to have sufficient tensile strength and high electrical conductivity. The D/G ratio is preferably 0.1 or less, and more preferably 0.01 or less. Although the lower limit value for the D/G ratio is not particularly limited, it can be 0 or more, for example.

In the present specification, the D/G ratio of the carbon nanotube is a value measured in the following method.

The carbon nanotube is subjected to Raman spectroscopic analysis under the following conditions to obtain a Raman spectrum (hereinafter also referred to as the Raman spectrum of the CNT assembled wire). A D/G ratio is calculated from a peak intensity of the D band and a peak intensity of the G band in the Raman spectrum of the CNT.

Measurement Conditions for Raman Spectroscopic Analysis
Wavelength: 532 nm
Laser power: 17 mW
Exposure time: one second
Average number of times: three times
Magnification of objective lens: 50 times Embodiment 3: Carbon Nanotube Manufacturing Apparatus A carbon nanotube manufacturing apparatus used in the method for manufacturing a carbon nanotube in accordance with Embodiment 1 will now be described with reference to FIG. 18. Carbon nanotube manufacturing apparatus 10 shown in FIG. 18 can include: a tubular carbon nanotube growing unit (hereinafter also referred to as a CNT growing unit) 21; a gas supplying unit 22 that supplies a carbon-containing gas into CNT growing unit 21 from one end of CNT growing unit 21 (in FIG. 18, a right end thereof); a catalyst supplying unit 23 that supplies catalyst particles P into CNT growing unit 21; and a carbon nanotube drawing unit (hereinafter also referred to as a CNT drawing unit) 30 that is disposed at the other end of CNT growing unit 21 (in FIG. 18, a left end thereof) and draws a carbon nanotube obtained in CNT growing unit 21. CNT growing unit 21, CNT drawing unit 30, and catalyst supplying unit 23 include uninterrupted reactor tube 31, and CNTs are manufactured inside reactor tube 31.

<Carbon Nanotube Growing Unit>

Carbon nanotube growing unit 21 is in the form of a tube that is a quartz tube for example. In CNT growing unit 21, carbon nanotubes 2 are formed on catalyst particles P by using a carbon-containing gas.

Carbon nanotube growing unit 21 is disposed in electric furnace 28 and heated by a heater (not shown).

The internal temperature in CNT growing unit 21 is preferably 800° C. or more and 1200° C. or less. In order to maintain such a temperature, the carbon-containing gas may be heated previously and then supplied from gas supplying unit 22 into CNT growing unit 21, or the carbon-containing gas may be heated in CNT growing unit 21.

<Gas Supplying Unit>

Gas supplying unit 22 supplies the carbon-containing gas to CNT growing unit 21 at one end of carbon nanotube growing unit 21 (in FIG. 18, a right end thereof). Gas supplying unit 22 can include a gas cylinder (not shown) and a flow control valve (not shown).

The type of the carbon-containing gas supplied from gas supplying unit 22, the average flow velocity thereof in the CNT growing unit, and the Reynolds number of the flow thereof in the CNT growing unit can be the same as those described in Embodiment 1, and accordingly, will not be described repeatedly.

Preferably, gas supplying unit 22 can repeatedly change the amount of the carbon-containing gas to be supplied to CNT growing unit 21. This can increase/decrease the flow velocity of the carbon-containing gas in CNT growing unit 21, which can help separating catalyst particles integrated together and thus increase the number of carbon nanotubes to be obtained.

<Catalyst Supplying Unit>

Catalyst supplying unit 23 may be disposed between gas supplying unit 22 and CNT growing unit 21. A catalyst holder 26 for holding catalyst 27 is disposed inside catalyst supplying unit 23. Catalyst supplying unit 23 is provided with a heater 25. That is, catalyst supplying unit 23 is heated by a heater.

Catalyst supplying unit 23 supplies a flow of the carbon-containing gas with catalyst 27 disintegrated by wind pressure of the carbon-containing gas and thus divided into a plurality of catalyst particles P. Thus, by using catalyst 27, a plurality of catalyst particles P of high temperature in contact with one another can be formed in the flow of the carbon-containing gas. This ensures that carbon nanotubes are grown among a plurality of catalysts.

Examples of catalyst 27 can include ferrocene ($Fe(C_5H_5)_2$), nickelocene ($Ni(C_5H_5)_2$), cobaltocene ($Co(C_5H_5)_2$, etc.), and the like. Inter alia, ferrocene is particularly preferable as it is excellent in disintegrability and catalysis. It is believed that, when ferrocene is heated to a high temperature in catalyst supplying unit 23 and exposed to the carbon-containing gas, it forms iron carbide ($Fe_3C$) on a surface thereof due to carburization, and is thus disintegratable from the surface to release fine catalyst particles P successively. In this case, a major ingredient of catalyst particles P formed will be iron carbide or iron.

The lower limit for the average diameter of catalyst particles P is preferably 30 nm, more preferably 40 nm, and further preferably 50 nm. On the other hand, the upper limit for the average diameter of catalyst particles P is preferably 1000 µm, more preferably 100 µm, and further preferably 10 µm. If the average diameter of catalyst particles P is less than the lower limit, carbon nanotubes formed from the catalyst particles tend to have a small diameter and a low drawing ratio, and hence insufficient length. On the contrary, if the average diameter of the catalyst particles exceeds the upper limit, it tends to be difficult to draw carbon nanotubes formed by the catalyst particles.

<Carbon Nanotube Drawing Unit>

Carbon nanotube drawing unit 30 is disposed at an end of CNT growing unit 21 opposite to gas supplying unit 23. That is, CNT drawing unit 30 is disposed downstream of CNT growing unit 21 as seen in the direction of the flow of the carbon-containing gas. In CNT drawing unit 30, a carbon nanotube is drawn.

As the CNT drawing unit, any structure can be used as long as it can apply tensile force to a carbon nanotube in a suspended state and thus draw the carbon nanotube. For example, as shown in FIG. 18, the CNT drawing unit may comprise a cylindrical structure having a smaller diameter than the CNT growing unit. Further, the CNT drawing unit can be formed of a honeycomb structure, a straight-tube-type narrow tube structure, or the like.

When the CNT drawing unit is formed of a cylindrical structure, the area in cross section of the hollow portion of the CNT drawing unit is preferably 0.01% or more, more preferably 0.005% or more and 20% or less, and still more preferably 0.01% or more and 5% or less of the area in cross section of the CNT growing unit. The area in cross section of the CNT drawing unit in this case can for example be 0.005 $mm^2$ or more and 50 $mm^2$ or less.

When the CNT drawing unit is formed of a cylindrical structure, the length of the cylindrical structure in the direction along the through hole (i.e., the longitudinal direction) is preferably 1 mm or more and 1 m or less, more preferably 10 mm or more and 50 cm or less, and still more preferably 15 mm or more and 10 cm or less. When the length of the cylindrical structure in the direction along the through hole is less than 1 mm, CNTs suspended in a vapor phase are insufficiently accelerated and a growth promoting effect tends to be suppressed. On the other hand, when the length of the cylindrical structure in the direction along the through-hole exceeds 1 m, an amount of CNTs deposited on the internal wall of the through hole is increased, and it tends to be difficult to collect the CNTs.

When the length of the CNT drawing unit exceeds 20 mm, there may be a high possibility that CNTs are assembled together to form a CNT assembled wire. Therefore, when it is desired to collect a larger amount of single CNTs, the length of the CNT drawing unit is preferably 1 mm or more and less than 20 mm.

When the CNT drawing unit has a honeycomb structure, the honeycomb structure is disposed in the carbon nanotube assembled wire manufacturing apparatus such that the through holes have a longitudinal direction along the flow of the carbon-containing gas.

In the present specification, a honeycomb structure means a porous body having a large number of narrow tubular through holes.

When the CNT drawing unit is formed of a honeycomb structure, each through hole preferably has an area in cross section of 0.005 $mm^2$ or more, preferably 0.01 $mm^2$ or more, more preferably 0.05 $mm^2$ or more, still more preferably 0.1 $mm^2$ or more, and still more preferably 0.5 $mm^2$ or more. When the area in cross section of the through hole is less than 0.005 $mm^2$, CNTs tend to clog the through hole. On the other hand, the upper limit for the area in cross section of the through hole is preferably 100 $mm^2$, more preferably 50 $mm^2$, and still more preferably 10 $mm^2$, for example. In the present specification, the area in cross section of the through hole is fixed from the upstream side to the downstream side. Herein, an area in cross section being fixed means that the area in cross section has a maximum value and a minimum value with an average value falling within ±5%.

When the area in cross section of the CNT drawing unit is 4 $mm^2$ or less, there may be a high possibility that CNTs are assembled together to form a CNT assembled wire. Therefore, when it is desired to collect a larger amount of single CNTs, the area in cross section of the CNT drawing unit is preferably larger than 4 $mm^2$ and 100 $mm^2$ or less.

When the CNT drawing unit is formed of a honeycomb structure, the honeycomb structure, as seen in a direction along the through hole (i.e., the longitudinal direction), preferably has a length of 1 mm or more and 1 m or less, more preferably 10 mm or more and 50 cm or less, and still more preferably 15 mm or more and 10 cm or less. When the honeycomb structure has a length of less than 1 mm in the direction along the through hole, the CNTs suspended in a vapor phase are insufficiently accelerated and a growth promoting effect tends to be suppressed. On the other hand, when the honeycomb structure has a length exceeding 1 m in the direction along the through hole, an amount of CNTs deposited on the internal wall of the through hole is increased, and it tends to be difficult to collect the CNTs.

When the length of the CNT drawing unit exceeds 20 mm, there may be a high possibility that CNTs are assembled together to form a CNT assembled wire. Therefore, when it is desired to collect a larger amount of single CNTs, the length of the CNT drawing unit is preferably 1 mm or more and less than 20 mm.

The honeycomb structure can be made of a ceramic material (alumina, zirconia, aluminum nitride, silicon carbide, silicon nitride, forsterite, steatite, cordierite, mullite, ferrite, and the like), quartz glass, glass, metals, graphite. Inter alia, the ceramic material is preferable in view of heat resistance and durability required in manufacturing CNTs.

Other Configurations

The CNT manufacturing apparatus can include in addition to the above configuration a magnetic field generating unit that generates a magnetic field. Specifically, in the CNT drawing unit, an electric wire can be provided in the form of a coil surrounding a reactor tube. When a current is passed through the electric wire, a magnetic line of force can be generated inside the reactor tube in a direction along the central axis of the reactor tube to apply tensile force derived from a magnetic field to a CNT.

The CNT manufacturing apparatus can include in addition to the above configuration a magnetic field generating unit that generates a magnetic field. Specifically, in the CNT drawing unit, a positive electrode made of a conductive material can be disposed on a downstream side of the carbon-containing gas, and a negative electrode made of a conductive material can be disposed on an upstream side of the carbon-containing gas. Thus, an electric field can be generated along the central axis of the reactor tube, and a tensile force derived from the electric field can be applied to the CNT.

Embodiment 4: Method for Manufacturing Carbon Nanotube Assembled Wire

A method for manufacturing a carbon nanotube assembled wire in accordance with Embodiment 4 will now be described. A method for manufacturing a carbon nanotube assembled wire includes: supplying a carbon-containing gas to a plurality of suspended catalyst particles to grow one or more carbon nanotubes from each of the plurality of catalyst particles (hereinafter also referred to as a growing step); applying a tensile force to a plurality of suspended carbon nanotubes to draw the plurality of carbon nanotubes (hereinafter also referred to as a drawing step); and orienting and assembling the plurality of suspended carbon nanotubes together in a direction along the flow of the carbon-containing gas to obtain a carbon nanotube assembled wire (hereinafter also referred to as an assembling step).

Figure 14:
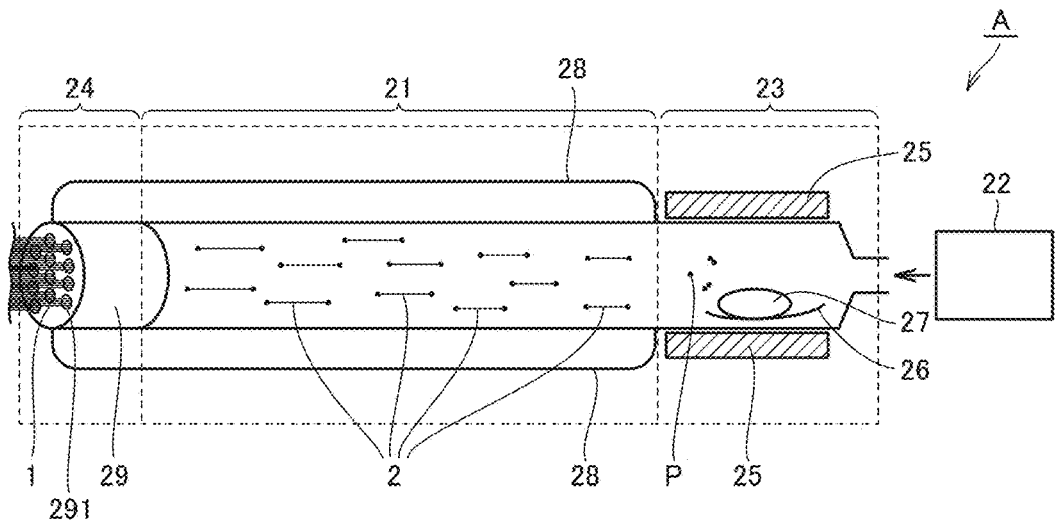
FIG. 14 is a diagram for illustrating a carbon nanotube assembled wire manufacturing apparatus in accordance with an embodiment of the present disclosure.

The carbon nanotube assembled wire can be manufactured for example in a carbon nanotube assembled wire manufacturing apparatus shown in FIG. 14. Carbon nanotube assembled wire manufacturing apparatus 20 can include: a tubular carbon nanotube growing unit (hereinafter also referred to as a CNT growing unit) 21; a gas supplying unit 22 that supplies a carbon-containing gas into CNT growing unit 21 from one end of CNT growing unit 21 (in FIG. 14, a right end thereof); a catalyst supplying unit 23 that supplies catalyst particles P into CNT growing unit 21; and a carbon nanotube assembling unit 24 (hereinafter also referred to as a CNT assembling unit) that is disposed at the other end of CNT growing unit 21 (in FIG. 14, a left end thereof) and orients and assembles a plurality of carbon nanotubes that are obtained in CNT growing unit 21 together in a direction along a flow of the carbon-containing gas.

<Growing Step>

In the growth step, one or more carbon nanotubes are grown from catalyst particles by supplying a carbon-containing gas to the catalyst particles in a suspended state. How the growing step is specifically be performed will not be described as it is the same as that described in Embodiment 1.

The length of the CNT obtained through the growing step is preferably 0.1 µm or more and 20 µm or less. If the length of the CNT obtained through the growing step is less than 0.1 µm, adjacent CNTs would not be oriented in the longitudinal direction and instead entangled, and tend to form secondary particles. On the other hand, when the length of the CNT exceeds 20 µm, a period of time before a drawing step is performed is increased, which tends to unnecessarily decrease efficiency of manufacturing the carbon nanotube. The length of the CNT obtained through the growing step is more preferably 0.5 µm or more and 15 µm or less, and still more preferably 1 µm or more and 10 µm or less. The length of the CNT can be measured through observation with a scanning electron microscope.

<Drawing Step>

Subsequently, a tensile force is applied to the plurality of carbon nanotubes in the suspended state that are obtained in the growing step to draw the plurality of carbon nanotubes.

The drawing step is performed inside CNT growing unit 21 and CNT assembling unit 24, or inside CNT assembling unit 24. When the drawing step is performed inside CNT growing unit 21, the drawing step is preferably performed in CNT growing unit 21 on a downstream side of the carbon-containing gas, that is, on a side closer to the CNT assembling unit.

The tensile force is preferably applied to a plurality of carbon nanotubes by varying the carbon-containing gas in flow velocity. For example, by making an average flow velocity of the carbon-containing gas on the downstream side larger than that of the carbon-containing gas on the upstream side, a tensile force can be applied to the CNT in a direction toward the downstream side. When a tensile force acts on an end of the carbon nanotube, the carbon nanotube is pulled while extending from catalyst particle P, and thus drawn in the longitudinal direction while it is plastically deformed and reduced in diameter.

In the drawing step, the plurality of carbon nanotubes are preferably oriented in a direction along the flow of the carbon-containing gas and thus drawn. According to this, it is believed that the carbon nanotube is not easily bent, and a linear carbon nanotube having tube portion T composed only of a six-membered ring of carbon can be obtained. The carbon nanotube consisting of a six-membered ring of carbon is resistant to deterioration and can thus maintain quality.

The carbon-containing gas on the downstream side preferably has an average flow velocity of 0.051 cm/sec or more and 10.001 cm/sec or less, and more preferably 0.201 cm/sec or more and 5.001 cm/sec or less. When the carbon-containing gas on the downstream side has an average flow velocity of less than 0.051 cm/sec, the carbon nanotube tends to be drawn insufficiently faster than it is grown. On the contrary, if the carbon-containing gas on the downstream side has an average flow velocity exceeding 10.001 cm/sec, this tends to detach carbon nanotubes from catalyst particles P, which stops growth of the carbon nanotubes and consequently inhibits formation of carbon nanotubes.

The carbon-containing gas on the upstream side preferably has an average flow velocity of 0.050 cm/sec or more and 10.000 cm/sec or less, and more preferably 0.200 cm/sec or more and 5.000 cm/sec or less. If the carbon-containing gas on the upstream side has an average flow velocity of less than 0.050 cm/sec, insufficient wind pressure is provided, and carbon nanotubes formed between catalyst particles P tend to grow stagnantly. On the contrary, if the carbon-containing gas on the upstream side has an average flow velocity exceeding 10.000 cm/sec, this tends to detach carbon nanotubes from catalyst particles P, which stops growth of the carbon nanotubes and consequently inhibits formation of carbon nanotubes.

As a method for making the average flow velocity of the carbon-containing gas on the downstream side larger than the average flow velocity of the carbon-containing gas on the upstream side, for example, a hollow portion which passes the carbon-containing gas is formed to have a cross section smaller in area on the downstream side of the carbon-containing gas than the upstream side of the carbon-containing gas. More specifically, (i) in the CNT growing unit, a hollow portion which passes the carbon-containing gas may be formed to have a cross section smaller in area on the downstream side of the carbon-containing gas than the upstream side of the carbon-containing gas, and (ii) a hollow portion in the CNT assembling unit (corresponding to the downstream side) passing the carbon-containing gas may have a cross section smaller in area than a hollow portion in the CNT growing unit (corresponding to the upstream side) passing the carbon-containing gas. This generates an acceleration field in the vicinity of a region in which the hollow portion has a cross section reduced in area, and provides the carbon-containing gas with a faster flow velocity.

In the case (i), in CNT growing unit 21, the area in cross section of the hollow portion on the downstream side of the carbon-containing gas is preferably 0.001% or more and 35% or less, more preferably 0.005% or more and 20% or less, and still more preferably 0.01% or more and 5% or less of the area in cross section of the hollow portion on the upstream side of the carbon-containing gas. When the area in cross section of the hollow portion on the downstream side is larger than 35% of the area in cross section of the hollow portion on the upstream side, the acceleration field tends to be less likely generated. On the other hand, when the area in cross section of the hollow portion on the downstream side is less than 0.001% of the area in cross section of the hollow portion on the upstream side, CNTs tend to clog.

Figure 15:
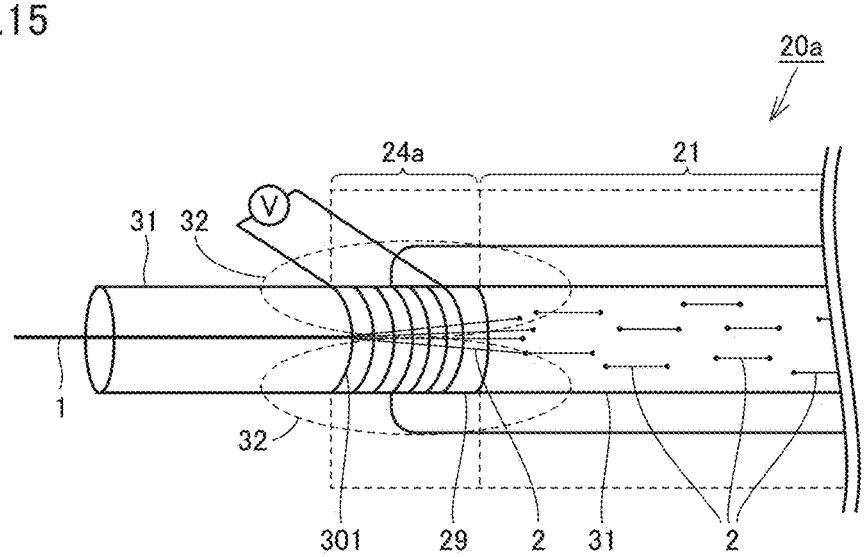
FIG. 15 is a view for illustrating an electric field generation unit of a carbon nanotube assembled wire manufacturing apparatus in accordance with another embodiment of the present disclosure.

The tensile force is preferably applied to a plurality of carbon nanotubes by using a magnetic field. A specific example of using a magnetic field as tensile force will now be described with reference to FIG. 15. FIG. 15 is a view showing the vicinity of a magnetic field generating unit 24a of a CNT assembled wire manufacturing apparatus 20a. As shown in FIG. 15, in CNT assembled wire manufacturing apparatus 20a at a CNT assembling unit 24a located on a downstream side of the carbon-containing gas, an electric wire 301 can be disposed in the form of a coil surrounding reactor tube 31 and a current can be passed through the electric wire to generate magnetic line of force 32 inside reactor tube 31 in a direction along the central axis of reactor tube 31 to apply tensile force derived from a magnetic field to a CNT. By applying a magnetic field when drawing a CNT, a magnetic force directly acts on metal included in the CNT, and the CNT can be oriented and drawn in a direction along magnetic line of force 32 passing inside the reactor tube.

While FIG. 15 shows the magnetic field drawing and also assembling CNTs together, the CNTs may not be drawn and assembled together simultaneously. That is, the magnetic field may only draw CNTs and may not assemble CNTs together. In this case, electric wire 301 is disposed in CNT growing unit 21 on a downstream side of the carbon-containing gas to generate a magnetic field in CNT growing unit 21.

Figure 16:
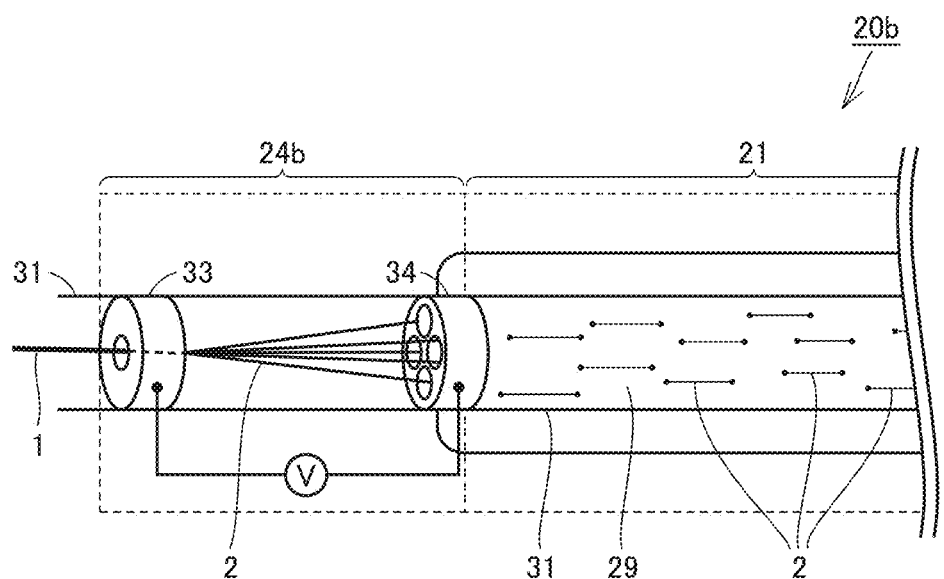
FIG. 16 is a view for illustrating a magnetic field generation unit of a carbon nanotube assembled wire manufacturing apparatus in accordance with another embodiment of the present disclosure.

The tensile force is preferably applied to a plurality of carbon nanotubes by using an electric field. A specific example of using an electric field as tensile force will now be described with reference to FIG. 16. FIG. 16 is a diagram showing the vicinity of an electric field generating unit 24b of a CNT assembled wire manufacturing apparatus 20b. As shown in FIG. 16, in a CNT assembling unit 24b, a positive electrode 33 made of a conductive material is disposed on a downstream side of the carbon-containing gas and a negative electrode 34 made of a conductive material is disposed on an upstream side of the carbon-containing gas, and an electric field along the central axis of reactor tube 31 is generated to allow tensile force derived from the electric field to be applied to a CNT. By applying an electric field when drawing a CNT, electrostatic force acts directly on the CNT and metal included in the CNT, and the CNT can be oriented in a direction along an electric line of force and thus drawn.

While FIG. 16 shows the electric field drawing and also assembling CNTs together, the CNTs may not be drawn and assembled together simultaneously. That is, the electric field may only draw CNTs and may not assemble CNTs together. In this case, positive electrode 33 and negative electrode 34 are disposed in CNT growing unit 21 on a downstream side of the carbon-containing gas to generate an electric field in CNT growing unit 21.

While the carbon nanotube is drawn by tensile force, the carbon nanotube is grown on particle P while having its initial diameter. Thus, the carbon nanotube produced through the drawing step can include a tubular tube portion T and conical cone portions C which expand continuously in diameter from ends of the tube portion, as shown in FIG. 6.

That is, in the drawing step, a carbon nanotube formed through vapor deposition is stretched by tensile force simultaneously with the formation thereof to thereby convert some hexagonal cells of the carbon nanotube into pentagonal cells to form the conical cone portion, and convert the pentagonal cells again into hexagonal cells to form the tube portion which is a carbon nanotube with a smaller diameter.

In the drawing step, a carbon nanotube grown on catalyst particle P is grown while being stretched by using tensile force, and the tube portion can be formed at an extremely larger rate than the carbon nanotube is grown on catalyst particle P. Thus, a long carbon nanotube can be formed in a relatively short period of time. Thus, a sufficiently long carbon nanotube can be formed even if a condition allowing the carbon nanotube to be continuously grown on catalyst particle P can only be maintained for a short period of time.

It is believed that in the drawing step, causing a tensile force to act on a carbon nanotube on catalyst particle P promotes incorporation of carbon atoms at a growth point of the carbon nanotube. Thus, it is believed that the carbon nanotube can be grown further faster and hence increased in length further faster.

It is believed that, in the drawing step, by causing tensile force to act on a carbon nanotube on catalyst particle P, the carbon nanotube is less likely to be curved, and thus a linear carbon nanotube composed of a cylindrical body formed of a sheet with tube portion T consisting of a six-membered ring of carbon can be obtained. The carbon nanotube consisting of a six-membered ring of carbon is resistant to deterioration and can thus maintain quality.

The length of the CNT obtained through the drawing step is preferably 10 μm or more, and further preferably 100 μm or more. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

<Assembling Step>

Subsequently, the plurality of carbon nanotubes in the suspended state are oriented and assembled together in a direction along the flow of the carbon-containing gas to obtain a carbon nanotube assembled wire. The assembling step is performed inside CNT assembling unit 24.

As a method for orienting and assembling a plurality of suspended CNTs together in a direction along a flow of the carbon-containing gas, causing the plurality of carbon nanotubes to approach one another while they are oriented is considered. More specifically, a hollow portion in the CNT assembling unit passing the carbon-containing gas may have a cross section smaller in area than a hollow portion in the CNT growing and drawing units passing the carbon-containing gas. More specifically, the CNT assembling unit may have a honeycomb structure, and the honeycomb structure may have through holes arranged to have a longitudinal direction along the flow of the carbon-containing gas.

In the present embodiment, the honeycomb structure means a porous body having a large number of narrow tubular through holes, as shown in FIG. 14 by a honeycomb structure 29.

When the CNT assembling unit is formed of a honeycomb structure, an area in cross section of each through hole is preferably 0.005 mm$^2$ or more and 100 mm$^2$ or less, more preferably 0.01 mm$^2$ or more and 100 mm$^2$ or less, still more preferably 0.05 mm$^2$ or more and 100 mm$^2$ or less, still more preferably 0.1 mm$^2$ or more and 50 mm$^2$ or less, and still more preferably 0.5 mm$^2$ or more and 10 mm$^2$ or less. When the area in cross section of the through hole is less than 0.005 mm², CNTs tend to clog the through hole. On the other hand, when the through hole has an area in cross section exceeding 100 mm², CNTs insufficiently approach one another, and tend to be unable to form an assembly.

When the area in cross section of the CNT assembling unit is more than 4 mm², CNTs are insufficiently assembled together, and there is a possibility that single CNTs may exist together with a CNT assembled wire. Therefore, when it is desired to collect a larger amount of CNT assembled wire, the area in cross section of the CNT assembling unit is preferably 0.005 mm² or more and 4 mm² or less, and more preferably 0.01 mm² or more and 4 mm² or less.

When the CNT assembling unit is formed of a honeycomb structure, the honeycomb structure, as seen in a direction along the through hole (i.e., the longitudinal direction), preferably has a length of 1 mm or more and 1 m or less, more preferably 10 mm or more and 50 cm or less, and still more preferably 15 mm or more and 10 cm or less. When the honeycomb structure has a length of less than 1 mm in the direction along the through hole, the CNTs suspended in a vapor phase are insufficiently accelerated and a growth promoting effect tends to be suppressed. On the other hand, when the honeycomb structure has a length exceeding 1 m in the direction along the through hole, an amount of CNTs deposited on the internal wall of the through hole is increased, and it tends to be difficult to collect the CNTs.

When the length of the CNT drawing unit is less than 20 mm, CNTs are insufficiently assembled together, and there is a possibility that single CNTs may exist together with a CNT assembled wire. Therefore, when it is desired to collect a larger amount of CNT assembled wire, the length of the CNT drawing unit is preferably 20 mm or more and 1 m or less.

The carbon-containing gas in the CNT assembling unit preferably has an average flow velocity of 0.05 cm/sec or more and 10 cm/sec or less, and more preferably 0.2 cm/sec or more and 5 cm/sec or less. When the average flow velocity of the carbon-containing gas is less than 0.05 cm/sec, a thin-film non-oriented CNT tends to be obtained. On the other hand, when the average flow velocity of the carbon-containing gas exceeds 10 cm/sec, the carbon-containing gas tends to arrive at the CNT assembling unit in an unreacted state and cause an incomplete decomposition reaction, resulting in adhesion of tar.

While in the above description the drawing step is followed by the assembling step, the drawing step and the assembling step may be performed simultaneously. Furthermore, the drawing step may be followed by an additional drawing step and an assembling step performed simultaneously. For example, when the honeycomb structure is used as the CNT assembling unit, drawing CNTs and assembling the CNTs are simultaneously performed in the through holes of the honeycomb structure.

In accordance with the above-described method for manufacturing a CNT assembled wire, a carbon-containing gas can be supplied to the catalyst supplying unit, the CNT growing unit, and the CNT assembling unit continuously, and a CNT assembled wire can be continuously manufactured without limitation on length. The CNT assembled wire can be adjusted in length, as appropriate, by adjusting the flow rate of the carbon-containing gas, how long in time it is supplied, and the like.

The length of the CNT assembled wire obtained through the assembling step is preferably 100 μm or more, more preferably 1000 μm or more, and further preferably 10000 μm or more. Although the upper limit value for the length of the CNT assembled wire is not particularly limited, it is preferably 1 m or less from the viewpoint of manufacturing. The length of the CNT assembled wire can be measured through observation with an optical microscope or visual observation.

More Preferable Embodiments

Figure 20:
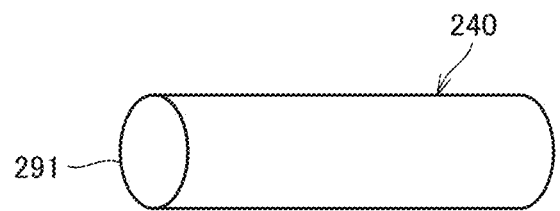
FIG. 20 shows a second flow channel of a carbon nanotube assembling unit in accordance with an embodiment of the present disclosure.

A more preferable embodiment of the method for manufacturing a carbon nanotube assembled wire will now be described with reference to FIGS. 14 and 20. FIG. 14 is a diagram for illustrating a carbon nanotube assembled wire manufacturing apparatus in accordance with an embodiment of the present disclosure. FIG. 20 is an enlarged view of a second flow channel of the carbon nanotube assembling unit. In FIG. 20, the right side is the upstream side, and the left side is the downstream side.

Preferably, in the growing step, a plurality of carbon nanotubes and the carbon-containing gas pass through a first flow channel, and in the assembling step, the plurality of carbon nanotubes and the carbon-containing gas pass through one or more second flow channels located downstream of the first flow channel, with each second flow channel having an area in cross section smaller than the first flow channel. In FIG. 14, the first flow channel corresponds to the hollow portion of CNT growing unit 21, and the second flow channel corresponds to the hollow portion of CNT assembling unit 24 (that is, a through hole of honeycomb structure 29).

Thus, a tensile force toward the downstream side can be applied to the carbon nanotubes.

Preferably, the carbon-containing gas located downstream of the one or more second flow channels is lower in temperature than the carbon-containing gas located upstream of the one or more second flow channels. Thus, CNTs are assembled together easily.

Preferably, the carbon-containing gas located upstream of the one or more second flow channels has a temperature of 800° C. or more, and the carbon-containing gas located downstream of the one or more second flow channels has a temperature of 600° C. or less. Thus, CNTs are assembled together easily.

The temperature of the carbon-containing gas upstream of the one or more second flow channels is preferably 800° C. or more and 1200° C. or less, more preferably 900° C. or more and 1150° C. or less, and still more preferably 950° C. or more and 1050° C. or less.

The temperature of the carbon-containing gas downstream of the one or more second flow channels is preferably 600° C. or less, more preferably 500° C. or less, and still more preferably 300° C. or less. While the lower limit for the temperature of the carbon-containing gas downstream of the one or more second flow channels is not particularly limited, it can for example be 80° C. It is to be noted that exposing a CNT assembled wire having passed through the one or more second flow channels to a liquid of ethanol in the form of mist or the like to impregnate gaps between CNT filaments with the liquid, and subsequently evaporating the liquid at about 78° C. can serve as an additional process to reduce the gaps between the CNT filaments to bond them together to achieve high density.

Preferably, the temperature of the carbon-containing gas in the one or more second flow channels is preferably lower at the downstream side than at the upstream side, and the temperature of the carbon-containing gas in the second flow channel at a downstream end is 600° C. or less. Thus, CNTs are assembled together easily in the second flow channels.

Herein, the downstream end in the second flow channel corresponds to an outlet 291 on a downstream side of a second flow channel 240 (i.e. a through hole of the honeycomb structure) in FIG. 20.

The temperature of the carbon-containing gas in the second flow channel at the downstream end is more preferably 500° C. or less, and still more preferably 300° C. or less. While the lower limit for the temperature of the carbon-containing gas in the second flow channel at the downstream end is not particularly limited, it can for example be 80° C.

Preferably, a first region in which the temperature of the carbon-containing gas is 600° C. or less is present in the second flow channel on the downstream side, and the length of the first region in the longitudinal direction of the second flow channel is 1 cm or more. Thus, CNTs are assembled together easily in the second flow channel.

The length of the first region in the longitudinal direction of the second flow channel is preferably 1 cm or more, and more preferably 5 cm or more. While the upper limit for the length of the first region in the longitudinal direction of the second flow channel is not particularly limited, it is preferably 20 cm, for example.

The area in cross section of each of the second flow channels is preferably 0.01 mm$^2$ or more and 4 mm$^2$ or less. Thus, the diameter of the CNT is reduced easily. The area in cross section of each of the second flow channels is more preferably 0.1 mm$^2$ or more and 2 mm$^2$ or less, and still more preferably 0.2 mm$^2$ or more and 1 mm$^2$ less.

Preferably, a ratio S1/S2 is 100 or more and 1000000 or less, where S1 is an area in cross section of the first flow channel and S2 is an area in cross section of each of the second flow channels. Thus, the CNT is drawn easily and the diameter of the CNT is reduced easily. S1/S2 is more preferably 1000 or more and 100000 or less, and still more preferably 4000 or more and 40000 or less.

In the present specification, unless otherwise specified, the area in cross section of the first flow channel is fixed from the upstream side to the downstream side except for a portion of both ends thereof. In the present specification, unless otherwise specified, the area in cross section of each of the second flow channels is fixed from the upstream side to the downstream side except for a portion of both ends thereof. Herein, an area in cross section being fixed means that the area in cross section has a maximum value and a minimum value with an average value falling within +5%.

Preferably, in the assembling step, the plurality of carbon nanotubes are reduced in diameter. Thus, the CNT assembled wire including CNTs of a smaller diameter can be obtained.

Preferably, the one or more second flow channels each have a length of 10 mm or more and 200 mm or less. Thus, the CNT is drawn easily and the diameter of the CNT is reduced easily. The length of each of the second flow channels is more preferably 20 mm or more and 100 mm or less, and still more preferably 30 mm or more and 80 mm or less.

Figure 23:
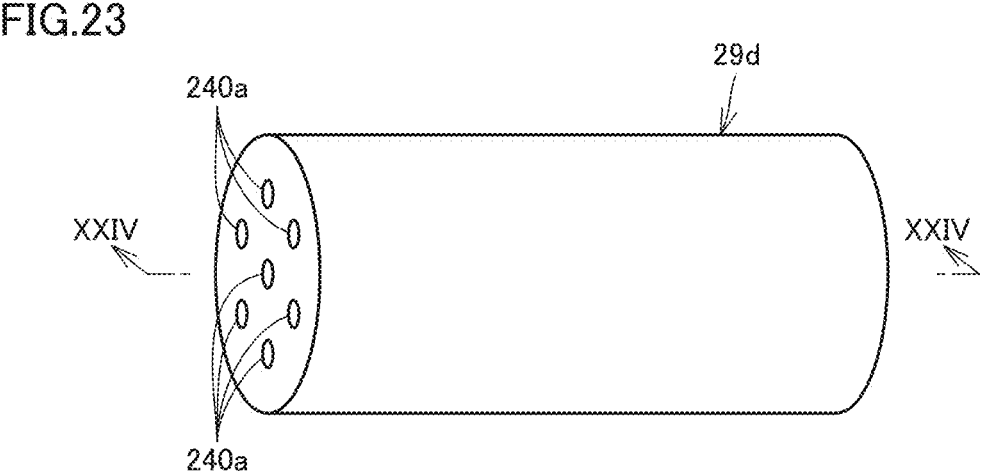
FIG. 23 shows an example of a honeycomb structure.
Figure 24:
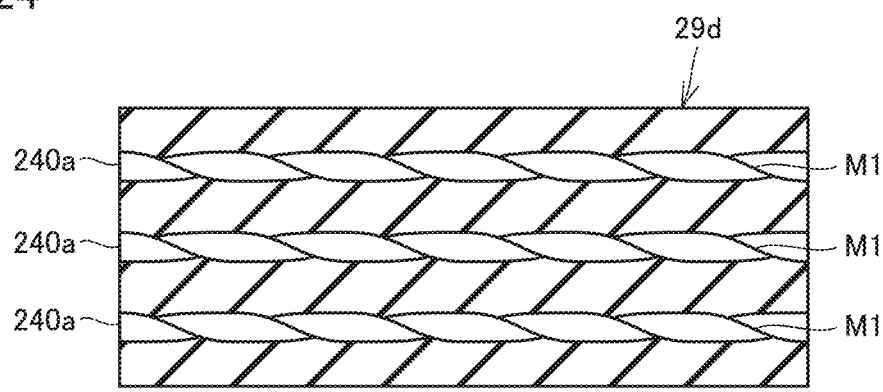
FIG. 24 is a cross section of the honeycomb structure of FIG. 23 taken along a line XXIV-XXIV.

An example of a preferable form of the second flow channel will now be described with reference to FIGS. 23 and 24. FIG. 23 shows a honeycomb structure 29d including a plurality of second flow channels 240a. FIG. 24 is a cross section of the honeycomb structure of FIG. 23 taken along a line XXIV-XXIV. Preferably, as shown in FIG. 24, second flow channels 240a each have a shape of a through hole with a helical groove M1 in a periphery of the through hole. Thus, the gas in the second flow channel flows helically, so that a uniform twist angle is formed easily in the CNT assembled wire. When a CNT assembled wire has a uniform twist angle, a CNT assembled wire bundle formed by bundling such CNT assembled wires can also have a uniform twist angle. Thus, the CNT assembled wire bundle can have excellent mechanical strength.

Figure 33:
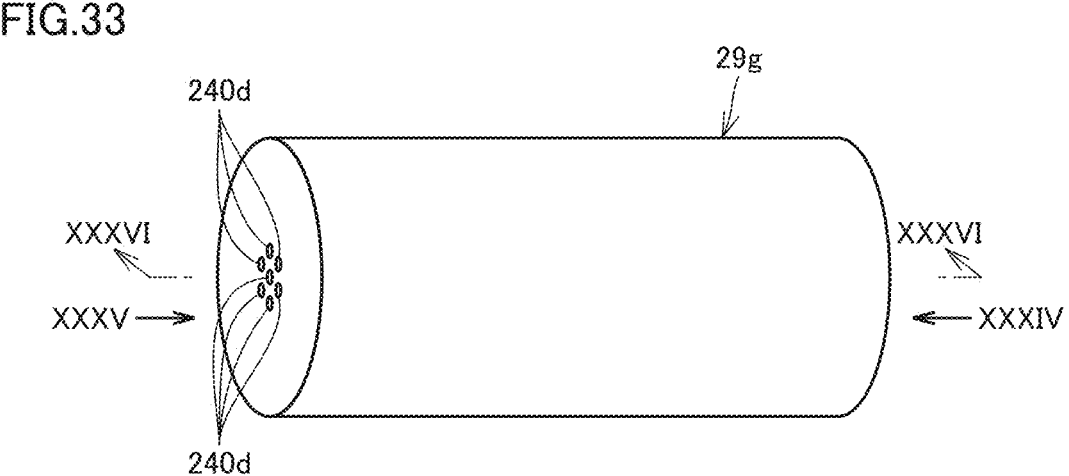
FIG. 33 shows another example of the honeycomb structure.
Figure 34:
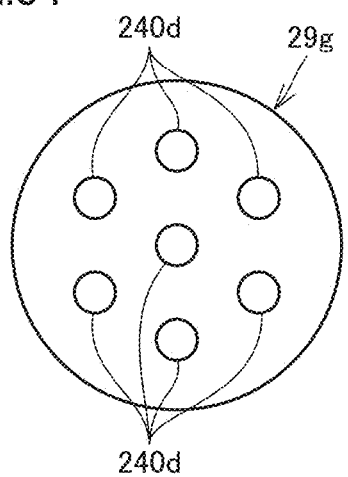
FIG. 34 is a view of the honeycomb structure of FIG. 33 as seen in a direction indicated by an arrow XXXIV (or on an upstream side).
Figure 35:
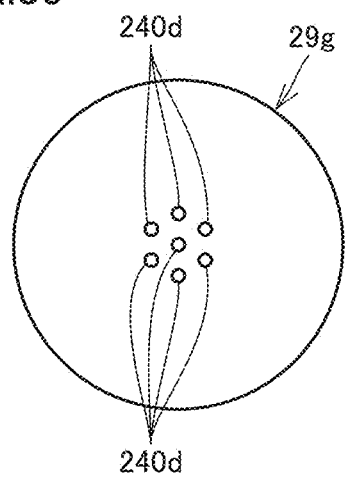
FIG. 35 is a view of the honeycomb structure of FIG. 33 as seen in a direction indicated by an arrow XXXV (or on a downstream side).
Figure 36:
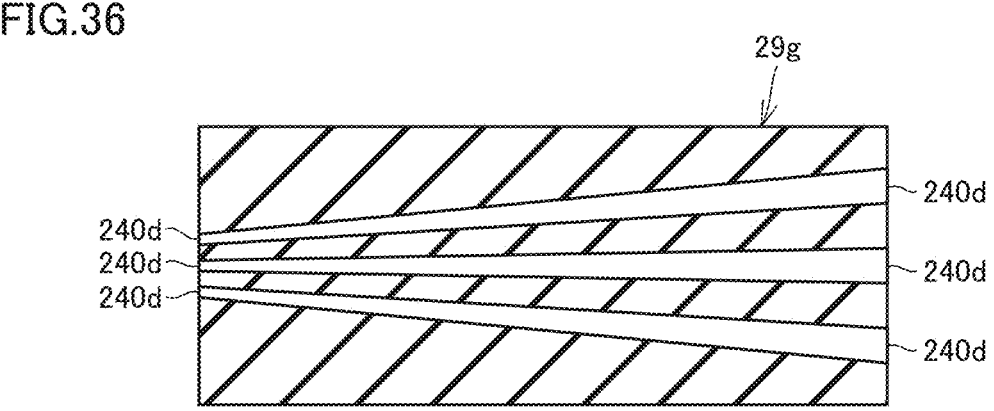
FIG. 36 is a cross section of the honeycomb structure of FIG. 33 taken along a line XXXVI-XXXVI.

Another preferable example of the second flow channel will now be described with reference to FIGS. 33 to 36. FIG. 33 shows a honeycomb structure 29g including a plurality of second flow channels 240d. FIG. 34 is a view of the honeycomb structure of FIG. 33 as seen in a direction indicated by an arrow XXXIV (or on an upstream side). FIG. 35 is a view of the honeycomb structure of FIG. 33 as seen in a direction indicated by an arrow XXXV (or on a downstream side). FIG. 36 is a cross section of the honeycomb structure of FIG. 33 taken along a line XXXVI-XXXVI.

As shown in FIG. 36, the area in cross section of each of second flow channels 240d is preferably smaller on the downstream side than on the upstream side. Thus, CNTs are assembled easily in the second flow channel, so that a CNT assembled wire is formed easily. Herein, the area in cross section of the second flow channel means an area in a cross section with the second flow channel's longitudinal direction as a normal thereto.

The area in cross section of the upstream side of the second flow channel is preferably 0.1 mm$^2$ or more and 100 mm$^2$ or less, and more preferably 0.5 mm$^2$ or more and 50 mm$^2$ or less. The area in cross section of the downstream side thereof is preferably 0.005 mm$^2$ or more and 10 mm$^2$ or less, and more preferably 0.01 mm$^2$ or more and 1 mm$^2$ or less.

S2B/S2A, which is a ratio of an area in cross section S2B on the downstream side of the second flow channel to an area in cross section S2A on the upstream side of the second flow channel, is preferably 0.00005 or more and 0.5 or less, and more preferably 0.0001 or more and 0.25 or less.

Embodiment 5: Carbon Nanotube Assembled Wire

A carbon nanotube assembled wire manufactured in the method for manufacturing a carbon nanotube assembled wire in accordance with Embodiment 4 will now be described. FIG. 1 is a diagram for illustrating a carbon nanotube assembled wire (hereinafter also referred to as a CNT assembled wire) in accordance with an embodiment of the present disclosure. As shown in FIG. 1, a carbon nanotube assembled wire 1 in accordance with the present embodiment includes a plurality of carbon nanotubes 2. In the CNT assembled wire, the plurality of carbon nanotubes 2 are preferably oriented at a degree of orientation of 0.9 or more and 1.0 or less.

(Carbon Nanotube)

In the present embodiment, as carbon nanotube 2, basically, the carbon nanotube described in Embodiment 2 can be used.

The length of the carbon nanotube can be selected as appropriate depending on the application. The length of the carbon nanotube is preferably 10 μm or more, and further preferably 100 μm or more, for example. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

The diameter of the carbon nanotube is preferably 0.6 nm or more and 20 nm or less, more preferably 1 nm or more and 10 nm or less, and still more preferably 1 nm or more and 2 nm or less. When the diameter of the carbon nanotube is 1 nm or more and 10 nm or less, it is preferable from the viewpoint of heat resistance under an oxidizing condition. When the diameter of the carbon nanotube is 0.6 nm or more and 2 nm or less, it is preferable from the viewpoint of enhancement in breaking strength.

In the present specification, a diameter of a carbon nanotube means an average outer diameter of a single CNT. The CNT's average outer diameter is obtained by directly observing cross sections at two arbitrary positions of the CNT with a transmission electron microscope, measuring, in each cross section, an outer diameter, which is the distance between farthest two points on the outer circumference of the CNT, and calculating an average value of the obtained outer diameters. When the CNT includes a cone portion at one end or both ends thereof, the diameter is measured at a location other than the cone portion.

The carbon nanotube preferably has a D/G ratio of 0.1 or less, the D/G ratio being a ratio of a peak intensity of a D band to a peak intensity of a G band in a Raman spectroscopic analysis with a wavelength of 532 nm.

In the present specification, the D/G ratio of each carbon nanotube in the carbon nanotube assembled wire is a value measured in the following method.

The carbon nanotube assembled wire is subjected to Raman spectroscopic analysis under the following conditions to obtain a Raman spectrum (hereinafter also referred to as the Raman spectrum of the CNT assembled wire). A D/G ratio is calculated from a peak intensity of the D band and a peak intensity of the G band in the Raman spectrum of the CNT assembled wire. The D/G ratio of the CNT assembled wire is regarded as the D/G ratio of each carbon nanotube in the carbon nanotube assembled wire.

Measurement Conditions for Raman Spectroscopic Analysis
Wavelength: 532 nm
Laser power: 17 mW
Exposure time: one second
Average number of times: three times
Magnification of objective lens: 50 times The reason for regarding that the D/G ratio of each CNT in the CNT assembled wire in accordance with the present embodiment is the same as the D/G ratio of the CNT assembled wire is as follows:

The present inventors subjected a plurality of carbon nanotubes before being assembled together to Raman spectroscopic analysis under the same conditions as those described above to obtain a Raman spectrum (hereinafter also referred to as a CNT Raman spectrum). A D/G ratio was calculated from a peak intensity of the D band and a peak intensity of the G band in each of a plurality of obtained CNT Raman spectra.

Subsequently, the carbon nanotubes were assembled together to prepare a CNT assembled wire. The CNT assembled wire was subjected to a Raman spectroscopic analysis under the above conditions to obtain a Raman spectrum (hereinafter also referred to as a Raman spectrum of the CNT assembled wire). A D/G ratio was calculated from a peak intensity of the D band and a peak intensity of the G band in the Raman spectrum of the CNT assembled wire.

It has been confirmed that a value obtained by averaging data in D/G ratio of the plurality of carbon nanotubes before being assembled together, as calculated above, is substantially equal to that of the D/G ratio of the CNT assembled wire. This indicates that the D/G ratio of the carbon nanotubes before being assembled together is maintained in the CNTs in the CNT assembled wire. Therefore, in the present specification, the D/G ratio of each carbon nanotube in the CNT assembled wire can be regarded as the same as the D/G ratio of the CNT before being assembled together.

(Degree of Orientation)

A method for calculating a degree of orientation of a CNT in the present specification will now be described with reference to FIGS. 2 to 5. In the present specification, a CNT's degree of orientation is a value calculated through the following procedure of steps (a1) to (a6). Note that, as measured by the applicants, it has been confirmed that, insofar as a given, single sample is measured, even when a result of measurement of degree of orientation, which will be described hereinafter, is calculated a plurality of times while a location where a measurement field of view (having a size of 10 nm×10 nm) is selected is changed, such measurement results thus obtained do not have substantial variation.

(a1) Imaging CNT assembled wire

The CNT assembled wire is imaged using the following instrument under the following conditions.

Figure 2:
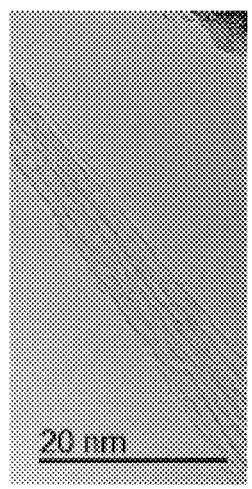
FIG. 2 is an image via a transmission electron microscope (TEM) of an example of a carbon nanotube assembled wire in accordance with an embodiment of the present disclosure.

Transmission electron microscope (TEM): "JEM2100" (product name) manufactured by JEOL Ltd.
Conditions: a magnification of 50,000 times to 1.2 million times, and an acceleration voltage of 60 kV to 200 kV FIG. 2 shows an example of a TEM image of the CNT assembled wire in accordance with the present embodiment.

(a2) Binarizing the captured image

The image captured in the above step (a1) is binarized through the following procedure using the following image processing program.

Image processing program: Non-destructive paper surface fiber orientation analysis program "FiberOri8single03" (http://www.enomae.com/FiberOri/index.htm)

Processing procedure
1. Histogram Average Brightness Correction
2. Background Removal
3. Binarization by Single Threshold
4. Brightness inversion.

Figure 3:
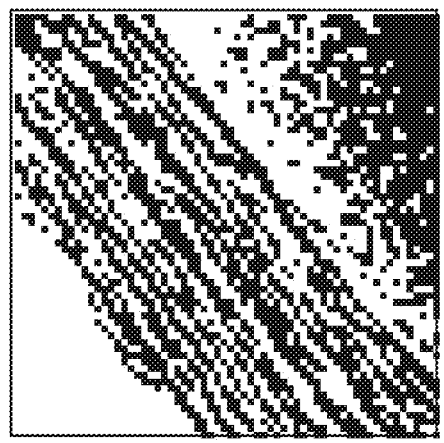
FIG. 3 is an image obtained by binarizing the FIG. 2 TEM image.

FIG. 3 shows an image obtained by binarizing the TEM image of FIG. 2.

(a3) Fourier transform of binarized image

The image obtained in step (a2) is subjected to Fourier transform using the same image processing program (Non-destructive paper surface fiber orientation analysis program "FiberOri8single03" (http://www.enomae.com/FiberOri/index.htm)).

Figure 4:
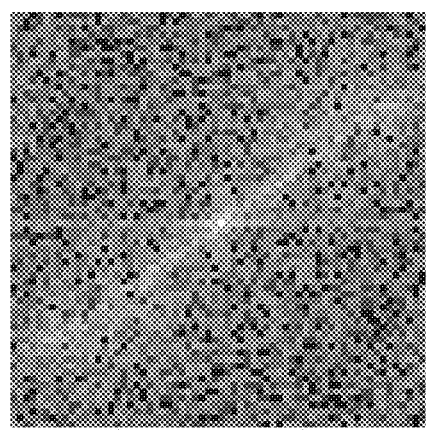
FIG. 4 is an image obtained by subjecting the FIG. 3 binarized image to Fourier-transform.

FIG. 4 shows an image obtained from the FIG. 3 binarized image through Fourier-transform.

(a4) Calculating degree of orientation and intensity of orientation

In the Fourier-transformed image, with the X-axis having a positive direction represented as 0°, an average amplitude with respect to counterclockwise angle (θ°) is calculated.

Figure 5:
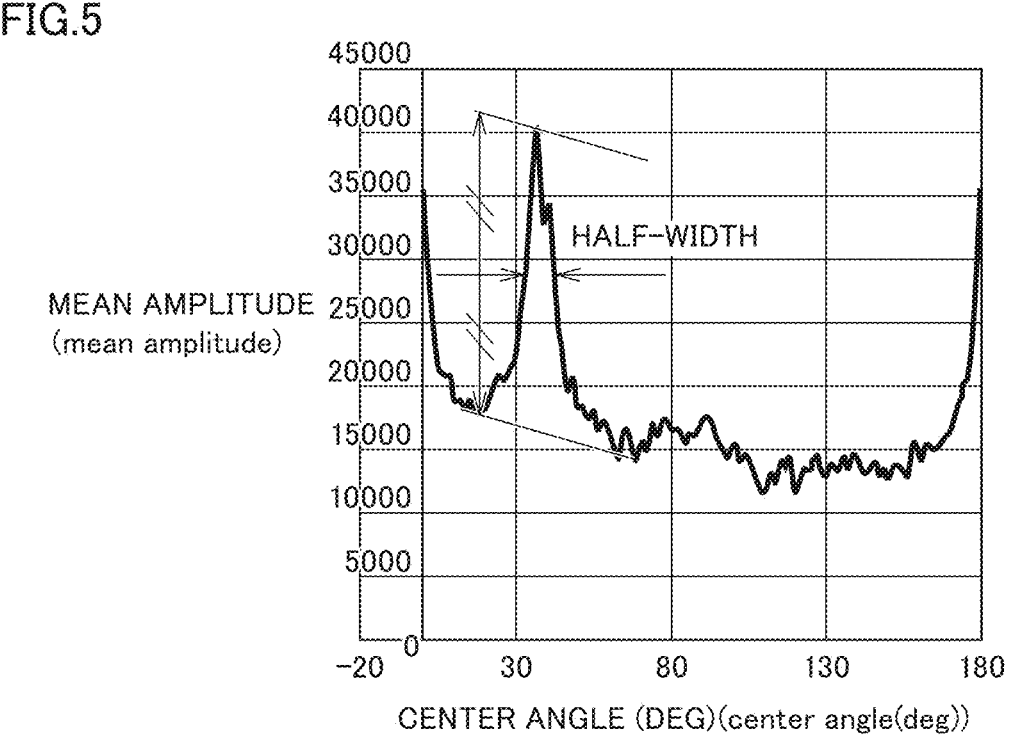
FIG. 5 is a graph showing a relationship between degree of orientation and intensity of orientation obtained from the FIG. 4. Fourier-transformed image.

FIG. 5 is a graph showing a relationship between degree of orientation and intensity of orientation obtained from the FIG. 4 Fourier transformed image.

(a5) Measuring Half Width

Based on the graph of FIG. 5, a full width at half maximum (FWHM) is measured.

(a6) Calculating degree of orientation

Based on the full width at half maximum, degree of orientation is calculated using the following equation (1).

$$\text{degree of orientation} = (180° - \text{full width at half maximum})/180° \qquad (1)$$

A degree of orientation of 0 means being fully non-oriented. A degree of orientation of 1 means being fully oriented.

The carbon nanotube assembled wire in accordance with the present embodiment preferably has a plurality of carbon nanotubes oriented at a degree of orientation of 0.9 or more and 1.0 or less. This means that the CNT assembled wire of the present embodiment has the plurality of CNTs highly oriented. Thus, the CNT assembled wire in accordance with the present embodiment can be elongated while maintaining the CNT's characteristics in electrical conductivity and mechanical strength.

When the CNT assembled wire has CNTs with a degree of orientation of less than 0.9, the CNT assembled wire tends to be reduced in electrical conductivity and mechanical strength. The lower limit value for the degree of orientation is preferably 0.93, more preferably 0.94, and still more preferably 0.95. The upper limit value for the degree of orientation is preferably 0.99, and more preferably 1.

(Shape)

The carbon nanotube assembled wire has the shape of a yarn in which the plurality of carbon nanotubes are oriented and assembled together in their longitudinal direction.

The length of the carbon nanotube assembled wire is not particularly limited, and can be adjusted as appropriate depending on the application. The length of the CNT assembled wire is preferably 100 µm or more, more preferably 1000 µm or more, and further preferably 10 cm or more, for example. Although the upper limit value for the length of the CNT assembled wire is not particularly limited, it is preferably 1 m or less from the viewpoint of manufacturing. The length of the CNT assembled wire can be measured through observation with a scanning electron microscope, an optical microscope, or visual observation.

The size of the diameter of the carbon nanotube assembled wire is not particularly limited, and can be adjusted as appropriate depending on the application. The diameter of the CNT assembled wire is preferably 0.1 µm or more, and further preferably 1 µm or more, for example. Although the upper limit value for the diameter of the CNT assembled wire is not particularly limited, it is preferably 100 µm or less from the viewpoint of manufacturing. In the present embodiment, the size of the diameter of the CNT assembled wire is smaller than the length of the CNT assembled wire. That is, the direction of the length of the CNT assembled wire corresponds to the longitudinal direction.

In the present specification, the diameter of the carbon nanotube assembled wire means an average outer diameter of a single CNT assembled wire. The average outer diameter of a single CNT assembled wire is obtained by observing cross sections at two arbitrary positions of the single CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters.

(Elements Originating from Catalyst)

Preferably, the carbon nanotube assembled wire includes at least one type of metal element selected from the group consisting of iron, nickel, cobalt, molybdenum, gold, silver, copper, yttrium, chromium, palladium, platinum and tungsten, and the metal element is dispersed in the carbon nanotube assembled wire in the longitudinal direction thereof. Herein, the metal element dispersed in the CNT assembled wire in the longitudinal direction thereof means that the metal element is not localized in the CNT assembled wire in the longitudinal direction thereof.

These metal elements originate from a catalyst (ferrocene ($Fe(C_5H_5)_2$), nickelocene ($Ni(C_5H_5)_2$), cobaltocene ($Co(C_5H_5)_2$), and the like) used in manufacturing a CNT assembled wire. The CNT assembled wire in accordance with the present embodiment includes these metal elements such that the metal elements are dispersed in the CNT assembled wire in the longitudinal direction thereof, so that the metal elements do not affect the CNT's characteristics in electric conductivity, and the CNT assembled wire can be elongated while maintaining the inherent electric conductivity.

What type of metal element is included in the CNT assembled wire and how much the former is contained in the latter can be confirmed and measured through energy dispersive X-ray spectrometry (EDX). A total content of the metal elements in the CNT assembled wire is preferably 0.1% or more and 50% or less, more preferably 1% or more and 40% or less, and still more preferably 5% or more and 20% or less based on atomicity.

The fact that the CNT assembled wire includes a metal element dispersed therein in the longitudinal direction thereof can be confirmed through EDX, electron energy loss spectrometry (EELS) or the like measurable at the same time as an electron microscope such as SEM and TEM.

Preferably, the carbon nanotube assembled wire includes the element of sulfur, and the element of sulfur is dispersed in the carbon nanotube assembled wire in the longitudinal direction thereof. Herein, the element of sulfur dispersed in the CNT assembled wire in the longitudinal direction thereof means that the element of sulfur is not localized in the CNT assembled wire in the longitudinal direction thereof.

The element of sulfur originates from an assistive catalyst ($CS_2$) used in manufacturing the CNT assembled wire. The CNT assembled wire in accordance with the present embodiment includes the element of sulfur such that it is dispersed in the CNT assembled wire in the longitudinal direction thereof, so that the element of sulfur does not affect the CNT's characteristics in electric conductivity and mechanical strength, and the CNT assembled wire can be elongated while maintaining these characteristics.

The fact that the CNT assembled wire includes the element of sulfur, and the content of the element of sulfur in the CNT assembled wire can be confirmed and measured through EDX, thermogravimetry, and X-ray photoelectron spectroscopy. The content of the element of sulfur in the CNT assembled wire is preferably 0.1% or more and 20% or less, more preferably 1% or more and 15% or less, and still more preferably 2% or more and 10% or less based on atomicity.

The fact that the CNT assembled wire includes the element of sulfur dispersed therein in the longitudinal direction thereof can be confirmed by EDX, EELS or the like measurable at the same time as an electron microscope such as SEM and TEM.

Embodiment 6: Carbon Nanotube Assembled Wire Manufacturing Apparatus

A carbon nanotube assembled wire manufacturing apparatus used for manufacturing a carbon nanotube assembled wire in accordance with Embodiment 6 will now be described with reference to FIG. 14.

Carbon nanotube assembled wire manufacturing apparatus 20 shown in FIG. 14 can include: a tubular carbon nanotube growing unit (hereinafter also referred to as a CNT growing unit) 21; a gas supplying unit 22 that supplies a carbon-containing gas into CNT growing unit 21 from one end of CNT growing unit 21 (in FIG. 14, a right end thereof); a catalyst supplying unit 23 that supplies catalyst particles P into CNT growing unit 21; and a carbon nanotube assembling unit (hereinafter also referred to as a CNT assembling unit) that is disposed at the other end of CNT growing unit 21 (in FIG. 14, a left end thereof) and orients and assembles a plurality of carbon nanotubes that are obtained in CNT growing unit 21 together in a direction along a flow of the carbon-containing gas.

<Carbon Nanotube Growing Unit>

Carbon nanotube growing unit 21 is in the form of a tube that is a quartz tube for example. In CNT growing unit 21, carbon nanotubes 2 are formed on catalyst particles P by using a carbon-containing gas.

Carbon nanotube growing unit 21 is disposed in electric furnace 28 and heated by a heater (not shown).

The internal temperature in CNT growing unit 21 is preferably 800° C. or more and 1200° C. or less. In order to maintain such a temperature, the carbon-containing gas may be heated previously and then supplied from gas supplying unit 22 into CNT growing unit 21, or the carbon-containing gas may be heated in CNT growing unit 21.

In CNT growing unit 21, it is preferable that an area in cross section of a hollow portion passing the carbon-containing gas passes be smaller on the downstream side of the carbon-containing gas than on the upstream side of the carbon-containing gas. This allows the carbon-containing gas to have an average flow velocity larger on the downstream side than on the upstream side, and allows tensile force to be applied to carbon nanotube 2.

A relationship that CNT growing unit 21 has between the area in cross section of the hollow portion on the downstream side of the carbon-containing gas and the area in cross section of the hollow portion on the upstream side of the carbon-containing gas can be the same as that described for the method for manufacturing a CNT assembled wire in accordance with Embodiment 4, and accordingly, will not be described repeatedly.

<Gas Supplying Unit>

Gas supplying unit 22 can be the same as the gas supplying unit described for the carbon nanotube manufacturing apparatus of Embodiment 3, and accordingly, will not be described repeatedly.

<Catalyst Supplying Unit>

Catalyst supplying unit 23 can be the same as the gas catalyst supplying unit described for the carbon nanotube manufacturing apparatus in accordance with Embodiment 3, and accordingly, will not be described repeatedly.

<Carbon Nanotube Assembling Unit>

Carbon nanotube assembling unit 24 is disposed at an end of CNT growing unit 21 opposite to gas supplying unit 23. That is, CNT assembling unit 24 is disposed downstream of CNT growing unit 21 as seen in the direction of the flow of the carbon-containing gas. In CNT assembling unit 24, a carbon nanotube assembled wire is formed.

The CNT assembling unit may have any structure that can orient and assemble a plurality of suspended carbon nanotubes together in the direction of the flow of the carbon-containing gas. For example, the CNT assembling unit can have a honeycomb structure, a straight-tube-type narrow tube structure, or the like.

When the CNT assembling unit has a honeycomb structure, the honeycomb structure is disposed in the carbon nanotube assembled wire manufacturing apparatus such that the through holes have a longitudinal direction along the flow of the carbon-containing gas.

When the CNT assembling unit has a honeycomb structure, it can be identical in configuration to that described for the method for manufacturing a CNT assembled wire in accordance with Embodiment 4, and accordingly, it will not be described repeatedly.

Other Configurations

As shown in FIG. 15, CNT assembled wire manufacturing apparatus 20a can include a magnetic field generating unit 24a that generates a magnetic field in addition to the above configuration. Magnetic field generating unit 24a is configured by disposing electric wire 301 in CNT growing unit 21 or CNT assembling unit 24 in the form of a coil surrounding reactor tube 31. When a current is passed through electric wire 301, magnetic line of force 32 can be generated inside reactor tube 31 in a direction along the central axis of reactor tube 31 to generate a magnetic field. A tensile force derived from the magnetic field can thus be applied to CNTs.

As shown in FIG. 16, CNT assembled wire manufacturing apparatus 20b can include an electric field generating unit 24b that generates an electric field in addition to the above configuration. Electric field generating unit 24b is configured by disposing in CNT growing unit 21 or CNT assembling unit 24 positive electrode 33 made of a conductive material on a downstream side of the carbon-containing gas and negative electrode 34 made of a conductive material on an upstream side of the carbon-containing gas. Thus, an electric field can be generated by generating an electric field along the central axis of reactor tube 31. A tensile force derived from the electric field can thus be applied to CNTs.

More Preferable Embodiments

A more preferable embodiment of the carbon nanotube assembled wire manufacturing apparatus will now be described below.

Preferably, the carbon nanotube growing unit has a first flow channel therein, and the carbon nanotube assembling unit has one or more second flow channels therein, with each second flow channel having an area in cross section smaller than the first flow channel. In FIG. 14, the first flow channel corresponds to the hollow portion of CNT growing unit 21, and the second flow channel corresponds to the hollow portion of CNT assembling unit 24 (that is, a through hole of honeycomb structure 29).

Thus, a tensile force toward the downstream side can be applied to the carbon nanotubes.

Preferably, the carbon nanotube assembling unit has a honeycomb structure having a plurality of second flow channels composed of a plurality of through holes, and each second flow channel has an area in cross section of 0.01 mm$^2$ or more and 4 mm$^2$ or less. Thus, the diameter of the CNT is reduced easily. More preferably, each second flow channel has an area in cross section of 0.02 mm$^2$ or more and 2 mm$^2$ or less, and still more preferably 0.1 mm$^2$ or more and 1 mm$^2$ or less.

Preferably, a ratio S1/S2 is 100 or more and 1000000 or less, where S1 is an area in cross section of the first flow channel and S2 is an area in cross section of each of the second flow channels. Thus, the CNT is drawn easily and the diameter of the CNT is reduced easily. S1/S2 is more preferably 1000 or more and 100000 or less, and still more preferably 2000 or more and 20000 or less.

Preferably, in the carbon nanotube assembling unit, the plurality of carbon nanotubes are reduced in diameter. Thus, the CNT assembled wire including CNTs of a smaller diameter can be obtained.

Preferably, the second flow channels of the carbon nanotube assembling unit each have a length of 10 mm or more and 200 mm or less. Thus, the CNT is drawn easily and the diameter of the CNT is reduced easily. The length of each second flow channel is more preferably 20 mm or more and 100 mm or less, and still more preferably 30 mm or more and 50 mm or less.

Preferably, the second flow channels each have a shape of a through hole with a helical groove in a periphery of the through hole. Thus, the gas in the second flow channel flows helically, so that a uniform twist angle is formed in the CNT assembled wire. Details of a case in which each second flow channel has a shape of a through hole with a helical groove in a periphery of the through hole have been described for the method for manufacturing a CNT assembled wire in accordance with Embodiment 4, and accordingly, will not be described repeatedly.

Preferably, each second flow channel has an area in cross section smaller on a downstream side than an upstream side. Thus, CNTs are assembled easily in the second flow channel, so that a CNT assembled wire is formed easily. Details of a case in which each second flow channel has an area in cross section smaller on the downstream side than the upstream side have been described for the method for manufacturing a CNT assembled wire in accordance with Embodiment 4, and accordingly, will not be described repeatedly.

Embodiment 7: Method for Manufacturing Carbon Nanotube Assembled Wire Bundle

A method for manufacturing a carbon nanotube assembled wire bundle in accordance with Embodiment 7 can include: supplying a carbon-containing gas to a plurality of suspended catalyst particles to grow one or more carbon nanotubes from each of the plurality of catalyst particles (hereinafter also referred to as a growing step); applying a tensile force to a plurality of suspended carbon nanotubes to draw the plurality of carbon nanotubes (hereinafter also referred to as a drawing step); orienting and assembling the plurality of suspended carbon nanotubes together in a direction along the flow of the carbon-containing gas to obtain a plurality of carbon nanotube assembled wires (hereinafter also referred to as an assembling step); and orienting the plurality of carbon nanotube assembled wires in their longitudinal direction and thus bundling them together to obtain a carbon nanotube assembled wire bundle (hereinafter also referred to as a bundling step).

The growing, drawing and assembling steps in the method for manufacturing a carbon nanotube assembled wire bundle are the same as those in the method for manufacturing a carbon nanotube assembled wire in accordance with Embodiment 4, and accordingly, will not be described repeatedly.

<Bundling Step>

In the bundling step, a plurality of carbon nanotube assembled wires are oriented in their longitudinal direction and thus bundled together to obtain a carbon nanotube assembled wire bundle.

The bundling step and the assembling step can be performed simultaneously. That is, in the assembling step, in parallel with production of CNT assembled wires, the obtained CNT assembled wires can be oriented in a direction along the longitudinal direction and thus bundled together to obtain a CNT assembled wire bundle. In this case, the bundling step is performed inside CNT assembling unit 24.

The bundling step may be performed independently after the assembling step. That is, the bundling step can be performed after CNT assembled wires are produced in the assembling step. In this case, a CNT bundling unit is preferably connected downstream of CNT assembling unit 24 as seen in the direction of the flow of the carbon-containing gas.

The CNT bundling unit can for example be a honeycomb structure, a straight-tube-type narrow tube structure, or the like.

Preferably, the bundling step includes: an adhering step of adhering a volatile liquid to the plurality of carbon nanotube assembled wires; and an evaporating step of evaporating the volatile liquid adhered to the carbon nanotube assembled wires. Thus, the obtained CNT assembled wire bundle has an enhanced density.

Examples of the volatile liquid include methanol, ethanol, isopropyl alcohol, acetone, methyl ethyl ketone, xylene, anisole, toluene, cresol, pyrrolidone, carbitol, carbitol acetate, water, an epoxy monomer, and an acrylic monomer. The volatile liquid include monomer or resin.

Preferably, the adhering step is performed before orienting and bundling the plurality of carbon nanotube assembled wires in the direction along the longitudinal direction of the plurality of carbon nanotube assembled wires. This allows carbon nanotubes to be brought into close contact with each other uniformly and at a high density while the liquid with which the carbon nanotubes have gaps impregnated evaporates and thus escapes.

Preferably, the adhering step is performed after orienting and bundling the plurality of carbon nanotube assembled wires in the direction along the longitudinal direction of the plurality of carbon nanotube assembled wires. This allows carbon nanotubes to be brought into close contact with each other uniformly and at a high density while the liquid with which the carbon nanotubes have gaps impregnated evaporates and thus escapes.

The evaporating step can be performed by natural drying. Preferably, the bundling step is performed while tension is applied to the plurality of carbon nanotube assembled wires. Thus, the obtained CNT assembled wire bundle has an enhanced strength.

Other Preferable Embodiments

Preferably, in the growing step, the plurality of carbon nanotubes and the carbon-containing gas pass through a first flow channel, and in the assembling step and the bundling step, the plurality of carbon nanotubes and the carbon-containing gas pass through one or more second flow channels located downstream of the first flow channel, with the one or more second flow channels each having an area in cross section smaller than an area in cross section of the first flow channel. Thus, a tensile force toward the downstream side can be applied to the carbon nanotubes.

Preferably, the second flow channels each have a shape of a through hole with a helical groove in a periphery of the through hole. Thus, the gas in the second flow channel flows helically, so that a uniform twist angle is formed easily in the CNT assembled wire. Details of a case in which each second flow channel has a shape of a through hole with a helical groove in a periphery of the through hole have been described for the method for manufacturing a CNT assembled wire in accordance with Embodiment 4, and accordingly, will not be described repeatedly.

Preferably, each second flow channel has an area in cross section smaller on a downstream side than an upstream side. Thus, in the second flow channels, CNTs are assembled easily and CNT assembled wires are assembled easily, so that the CNT assembled wire and the CNT assembled wire bundle are formed easily. Details of a case in which each second flow channel has an area in cross section smaller on the downstream side than the upstream side have been described for the method for manufacturing a CNT assembled wire in accordance with Embodiment 4, and accordingly, will not be described repeatedly.

Figure 25:
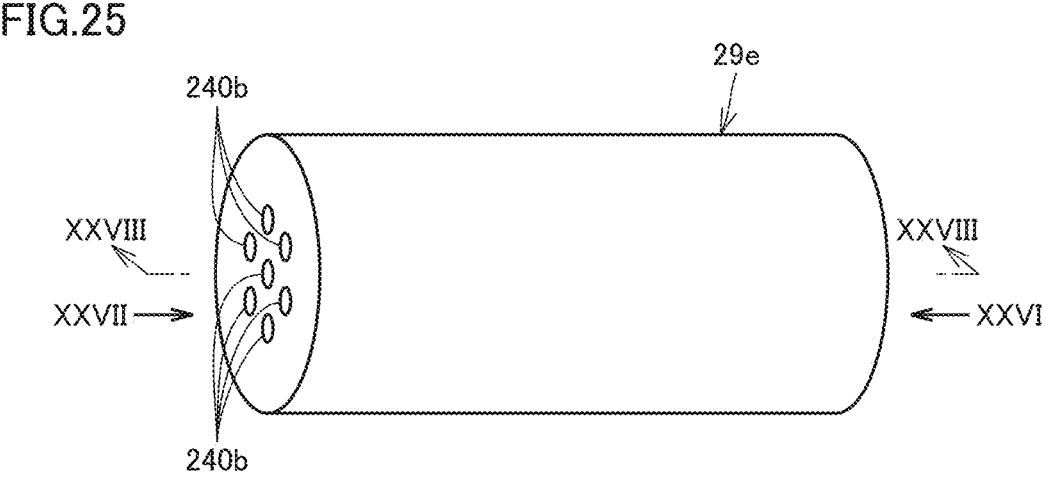
FIG. 25 shows another example of the honeycomb structure.
Figure 26:
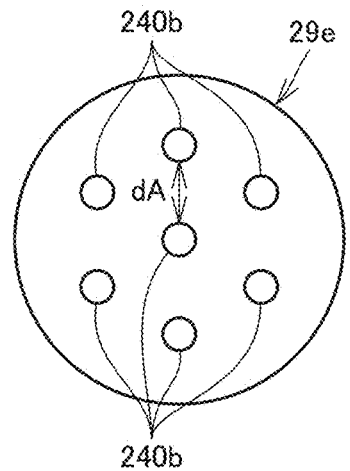
FIG. 26 is a view of the honeycomb structure of FIG. 25 as seen in a direction indicated by an arrow XXVI (or on an upstream side).
Figure 27:
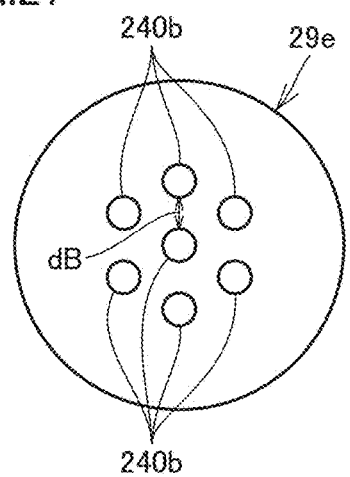
FIG. 27 is a view of the honeycomb structure of FIG. 25 as seen in a direction indicated by an arrow XXVII (or on a downstream side).
Figure 28:
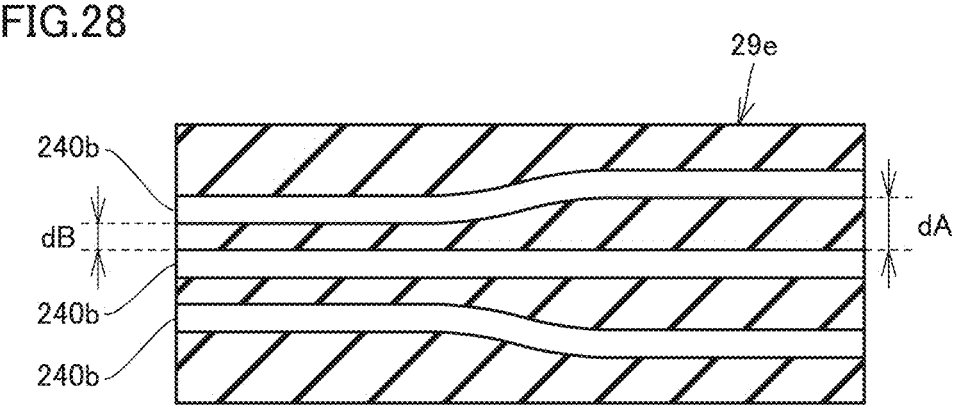
FIG. 28 is a cross section of the honeycomb structure of FIG. 25 taken along a line XXVIII-XXVIII.

Another preferred embodiment of the second flow channel will now be described with reference to FIGS. 25 to 28. FIG. 25 is a diagram showing an example of a honeycomb structure 29e including a plurality of second flow channels 240b. FIG. 26 is a view of honeycomb structure 29e of FIG. 25 as seen in a direction indicated by an arrow XXVI (or on an upstream side). FIG. 27 is a view of honeycomb structure 29e of FIG. 25 as seen in a direction indicated by an arrow XXVII (or on a downstream side). FIG. 28 is a cross section of the honeycomb structure of FIG. 25 taken along a line XXVIII-XXVIII.

In FIGS. 26 and 28, a distance between nearest neighbor second flow channels on the upstream side is indicated by a shortest distance dA between the peripheries of two second flow channels. In FIGS. 27 and 28, a distance between nearest neighbor second flow channels on the downstream side is indicated by a shortest distance dB between the peripheries of two second flow channels. Preferably, as shown in FIGS. 26 to 28, there are a plurality of second flow channels 240b, and the distance between nearest neighbor second flow channels is shorter on the downstream side than on the upstream side (i.e., shortest distance dB is shorter than shortest distance dA). Thus, the CNT assembled wires are bundled easily, so that the CNT assembled wire bundle is formed easily.

Figure 29:
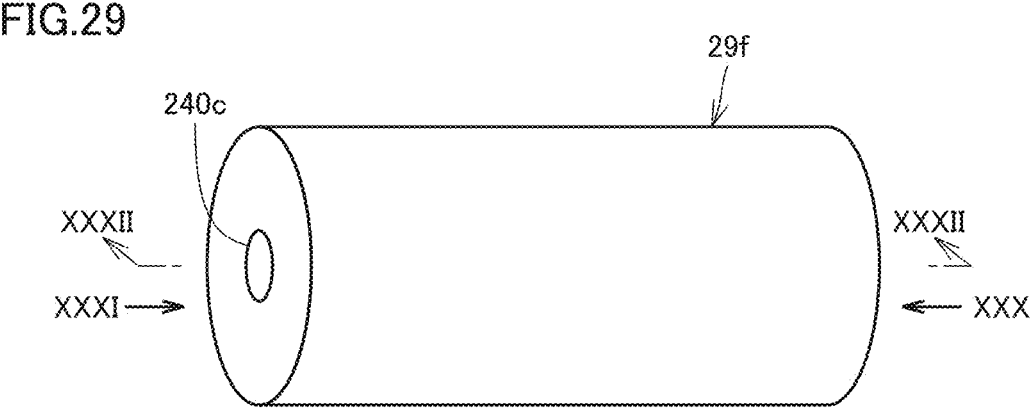
FIG. 29 shows another example of the honeycomb structure.
Figure 30:
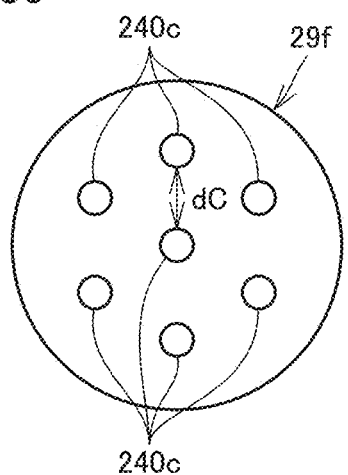
FIG. 30 is a view of the honeycomb structure of FIG. 29 as seen in a direction indicated by an arrow XXX (or on an upstream side).
Figure 31:
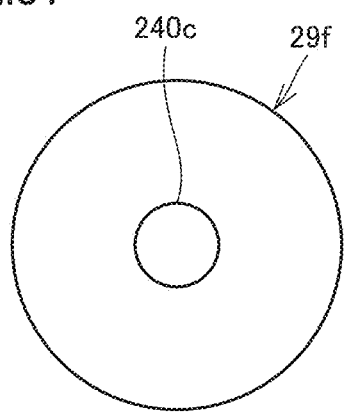
FIG. 31 is a view of the honeycomb structure of FIG. 29 as seen in a direction indicated by an arrow XXXI (or on a downstream side).
Figure 32:
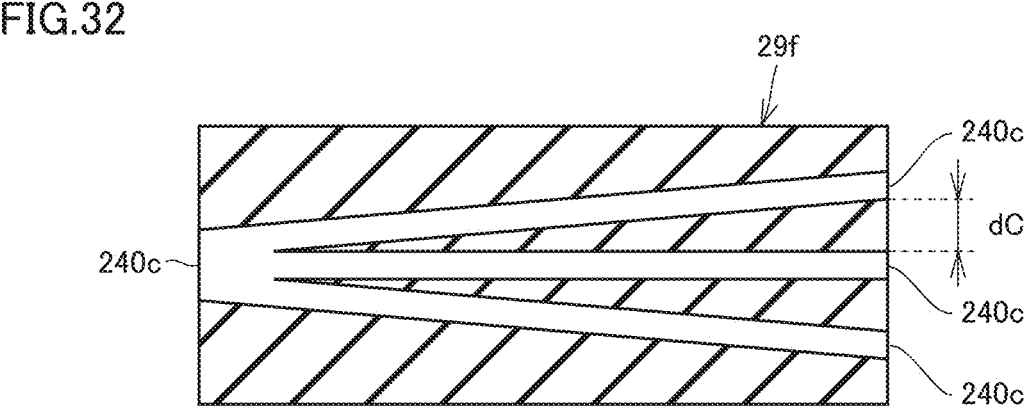
FIG. 32 is a cross section of the honeycomb structure of FIG. 29 taken along a line XXXII-XXXII.

Another preferred embodiment of the second flow channel will now be described with reference to FIGS. 29 to 32. FIG. 29 is a diagram showing another example of a honeycomb structure 29f including a plurality of second flow channels 240c. FIG. 30 is a view of honeycomb structure 29f of FIG. 29 as seen in a direction indicated by an arrow XXX (or on the upstream side). FIG. 31 is a view of honeycomb structure 29f of FIG. 29 as seen in a direction indicated by an arrow XXXI (or on the downstream side). FIG. 32 is a cross section of the honeycomb structure of FIG. 29 taken along a line XXXII-XXXII.

In FIGS. 30 and 32, a distance between nearest neighbor second flow channels on the upstream side is indicated by a shortest distance dC between the peripheries of two second flow channels. As shown in FIG. 32, the plurality of second flow channels 240c are connected at the downstream side (a left side in FIG. 32), and the shortest distance between the second flow channels on the downstream side is 0. That is, the embodiment shown in FIGS. 29 to 32 corresponds to a case in which the distance between nearest neighbor second flow channels is shorter on the downstream side than on the upstream side (i.e., a shortest distance of 0 is shorter than shortest distance dC). Thus, the CNT assembled wires are bundled easily, so that the CNT assembled wire bundle is formed easily.

The second flow channel may include two or more of the following forms (I) to (III) described above. (I) The second flow channels each have a shape of a through hole with a helical groove in a periphery of the through hole. (II) A distance between nearest neighbor second flow channels is shorter on a downstream side than on an upstream side. (III) The second flow channels each have an area in cross section smaller on the downstream side than on the upstream side.

Embodiment 8: Carbon Nanotube Assembled Wire Bundle

Figure 7:
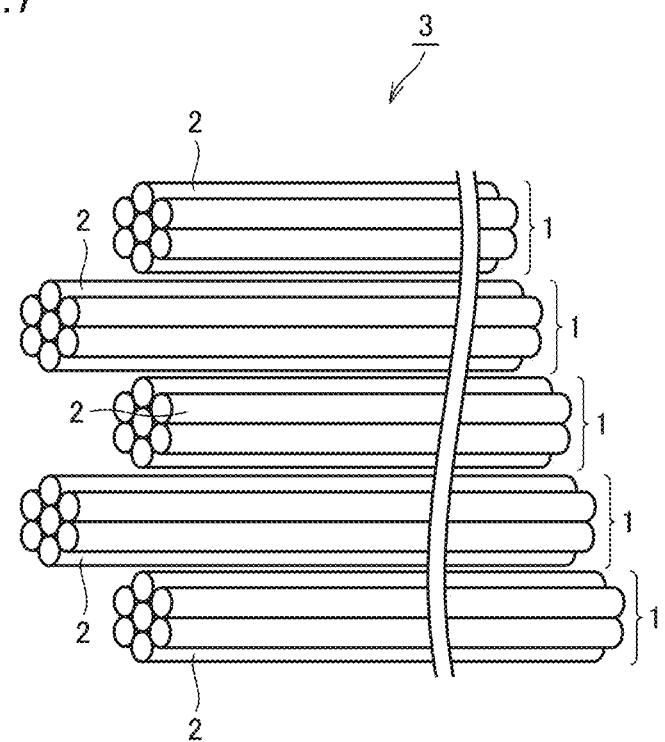
FIG. 7 is a diagram for illustrating a carbon nanotube assembled wire bundle in accordance with an embodiment of the present disclosure.

A carbon nanotube assembled wire bundle manufactured in the method for manufacturing a carbon nanotube assembled wire bundle in accordance with Embodiment 7 will now be described. FIG. 7 is a diagram for illustrating a carbon nanotube assembled wire bundle in accordance with an embodiment of the present disclosure. As shown in FIG. 7, a carbon nanotube assembled wire bundle (hereinafter, also referred to as a CNT assembled wire bundle) 3 in accordance with the present embodiment preferably includes an oriented region in which carbon nanotube assembled wire 1 is oriented at a degree of orientation of 0.8 or more and 1 or less.

(Configuration of Carbon Nanotube Assembled Wire Bundle)

As carbon nanotube assembled wire 1 configuring carbon nanotube assembled wire bundle 3, the CNT assembled wire of Embodiment 5 can be used. As carbon nanotube 2 configuring CNT assembled wire 1, the same carbon nanotube as described in Embodiment 2 can be used.

(Degree of Orientation)

Preferably, carbon nanotube assembled wire 1 has carbon nanotube 2 oriented at a degree of orientation of 0.9 or more and 1 or less, and carbon nanotube assembled wire bundle 3 includes an oriented region in which carbon nanotube assembled wire 1 is oriented at a degree of orientation of 0.8 or more and 1 or less.

The degree of orientation of the CNT in the carbon nanotube assembled wire has a value calculated in a method similar to the method described in Embodiment 5 for calculating a degree of orientation of a carbon nanotube in a carbon nanotube assembled wire, and accordingly, will not be described repeatedly.

The degree of orientation of the CNT assembled wire in the carbon nanotube assembled wire bundle is basically a value calculated through a procedure similar to that of steps (a1) to (a6) described in Embodiment 5 for a method for calculating a degree of orientation. What is different is that, in step (a1), the CNT assembled wire bundle is imaged using the following equipment under the following conditions.

Scanning electron microscope (SEM): Cry-10 (product name) manufactured by Technex Lab Co., Ltd.
Imaging conditions: a magnification of 40 times to 100,000 times, and an acceleration voltage of 1 kV to 17 k.
Measurement field of view: 30 μm×30 μm FIG. 8 shows an SEM image of an example of the CNT assembled wire bundle in accordance with the present embodiment, as imaged under the above conditions.

Figure 8:
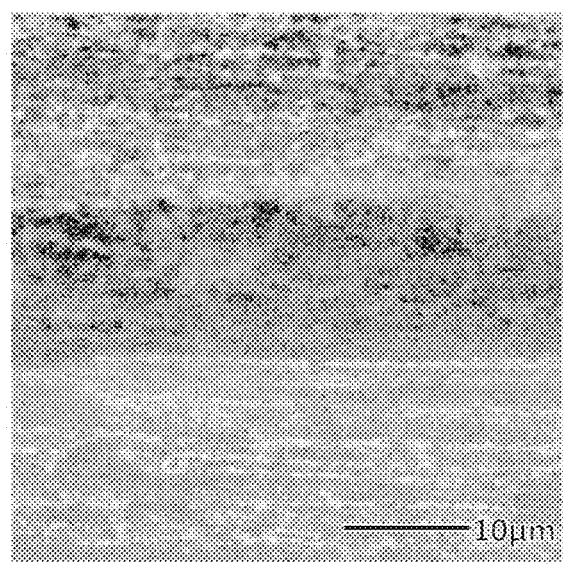
FIG. 8 is an image of an example of a CNT assembled wire bundle via a scanning electron microscope (SEM) in accordance with the present embodiment.
Figure 9:
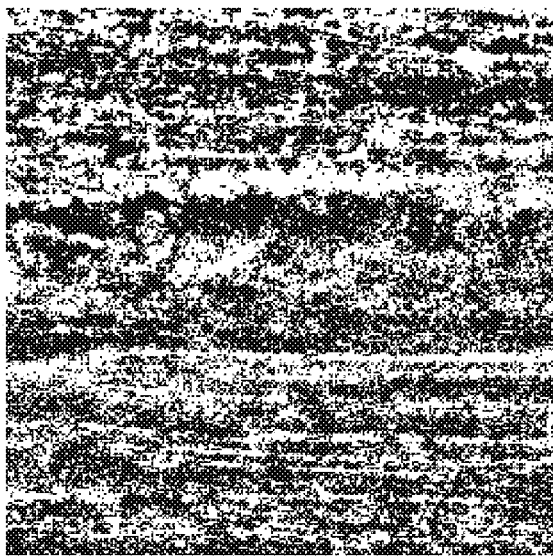
FIG. 9 is an image obtained by binarizing the FIG. 8 SEM image.
Figure 10:
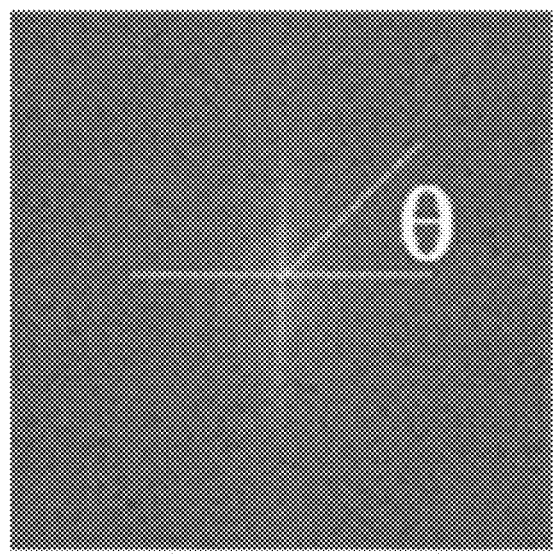
FIG. 10 is an image obtained by subjecting the FIG. 9 binarized image to Fourier-transform.

FIG. 9 shows an image obtained by binarizing the FIG. 8 SEM image in step (a2). FIG. 10 shows an image obtained by subjecting the FIG. 9 binarized image to Fourier transform in step (a3).

Figure 11:
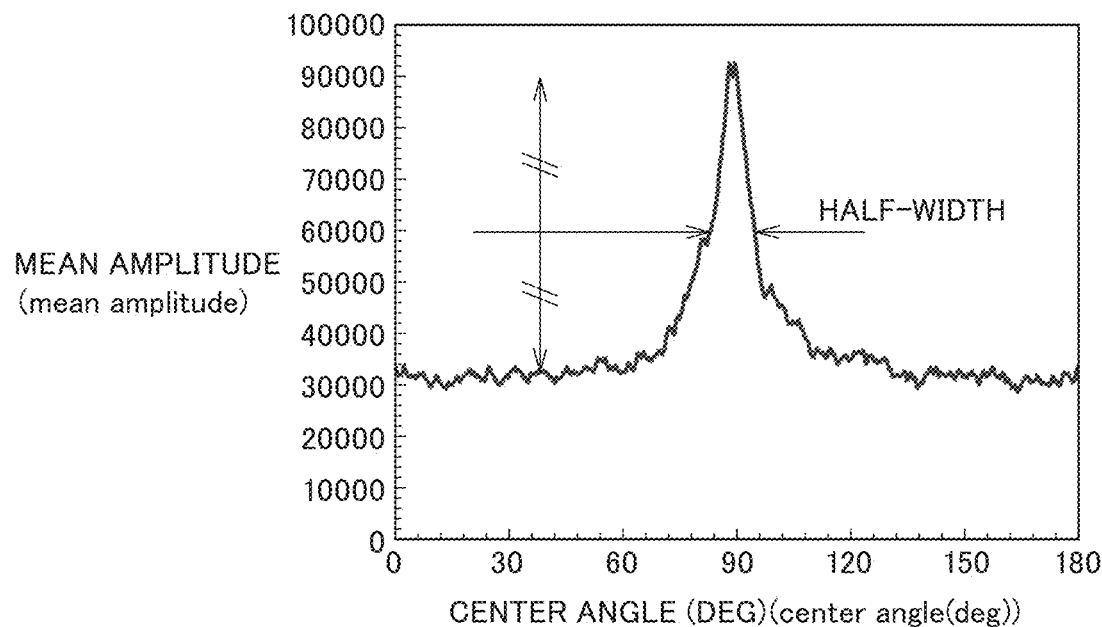
FIG. 11 is a graph showing a relationship between degree of orientation and intensity of orientation obtained from the FIG. 10. Fourier-transformed image.

FIG. 11 is a graph showing a relationship between degree of orientation and intensity of orientation obtained from the FIG. 10 Fourier transformed image in step (a4).

In step (a5), a full width at half maximum is measured based on the graph of FIG. 11. In step (a6), based on the full width at half maximum, degree of orientation is calculated by the following equation (1).

$$\text{degree of orientation} = (180° - \text{full width at half maximum})/180° \quad (1)$$

A degree of orientation of 0 means being fully non-oriented. A degree of orientation of 1 means being fully oriented.

The above measurement is performed at ten or more arbitrarily selected measurement fields of view. When one or more of the all of the measurement fields of view show that the carbon nanotube assembled wire bundle has the carbon nanotube assembled wires with a degree of orientation of 0.8 or more and 1 or less, it is determined that the carbon nanotube assembled wire bundle includes an oriented region in which the carbon nanotube assembled wires are oriented at a degree of orientation of 0.8 or more and 1 or less.

Preferably, the carbon nanotube assembled wire bundle in accordance with the present embodiment is composed of carbon nanotube assembled wires composed of carbon nanotubes oriented at a degree of orientation of 0.9 or more and 1 or less, and the carbon nanotube assembled wire bundle includes an oriented region having carbon nanotube assembled wires oriented at a degree of orientation of 0.8 or more and 1 or less. This means that the CNT assembled wire bundle of the present embodiment has the CNTs and CNT assembled wires highly oriented. Thus, the CNT assembled wire bundle in accordance with the present embodiment can be elongated while maintaining the CNT's characteristics in electrical conductivity and mechanical strength.

When the CNT assembled wire has CNTs with a degree of orientation of less than 0.9, the CNT assembled wire tends to be reduced in electrical conductivity and mechanical strength. The lower limit value for the degree of orientation is 0.9, preferably 0.93, more preferably 0.94, and still more preferably 0.95. The upper limit value for the degree of orientation is preferably 0.99, and more preferably 1.

When the CNT assembled wire bundle has CNT assembled wires with a degree of orientation of less than 0.8, the CNT assembled wire bundle tends to be reduced in electrical conductivity and mechanical strength. The lower limit value for the degree of orientation is 0.8, preferably 0.83, and more preferably 0.85. The upper limit value for the degree of orientation is preferably 0.95, and more preferably 1.

The carbon nanotube assembled wire bundle has the shape of a string in which a plurality of carbon nanotube assembled wires are oriented and assembled together in their longitudinal direction. The fact that the carbon nanotube assembled wire bundle has the shape of a string in which a plurality of carbon nanotube assembled wires are oriented and assembled together in their longitudinal direction can be confirmed by observation with an optical microscope or a scanning electron microscope.

The length of the carbon nanotube assembled wire bundle is not particularly limited, and can be adjusted as appropriate depending on the application. The length of the CNT assembled wire bundle is preferably 100 µm or more, more preferably 1000 µm or more, and further preferably 10 cm or more, for example. Although the upper limit value for the length of the CNT assembled wire bundle is not particularly limited, it is preferably 1 m or less from the viewpoint of manufacturing. The length of the CNT assembled wire bundle can be measured through observation with an optical microscope or visual observation.

The size of the diameter of the carbon nanotube assembled wire bundle is not particularly limited, and can be adjusted as appropriate depending on the application. The diameter of the CNT assembled wire bundle is preferably 1 µm or more, and further preferably 10 µm or more, for example. Although the upper limit value for the diameter of the CNT assembled wire bundle is not particularly limited, it is preferably 1000 µm or less from the viewpoint of manufacturing. In the present embodiment, the size of the diameter of the CNT assembled wire bundle is smaller than the length of the CNT assembled wire bundle.

In the present specification, the diameter of the carbon nanotube assembled wire bundle means an average outer diameter of a single CNT assembled wire bundle. The average outer diameter of a single CNT assembled wire bundle is obtained by observing cross sections at two arbitrary positions of the single CNT assembled wire bundle with an optical microscope, measuring, in each cross section, an outer diameter, which is the distance between farthest two points on the outer circumference of the CNT assembled wire bundle, and calculating an average value of the obtained outer diameters.

(Oriented Region and Amorphous Region)

Figure 12:
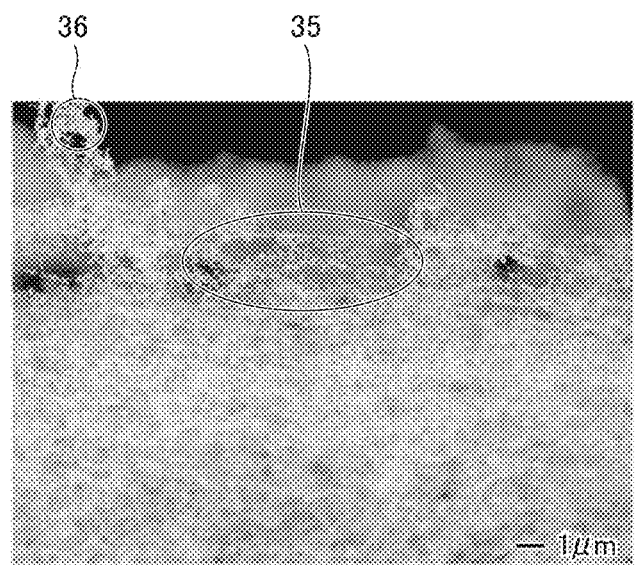
FIG. 12 is a SEM image of one example of a carbon nanotube assembled wire bundle in accordance with one embodiment of the present disclosure.

FIG. 12 is a SEM image of a carbon nanotube assembled wire bundle in accordance with one embodiment of the present disclosure. As shown in FIG. 12, the carbon nanotube assembled wire bundle can include an oriented region 35 and an amorphous region 36 in which the carbon nanotube assembled wire has a degree of orientation of 0 or more and less than 0.8. In the present specification, the oriented region means a region in which the CNT assembled wire bundle has CNT assembled wires with a degree of orientation of 0.8 or more and 1.0 or less. On the other hand, the amorphous region means a region in which the CNT assembled wire bundle has CNT assembled wires with a degree of orientation of 0 or more and less than 0.8. As the CNT assembled wire bundle includes an orientated region and an amorphous region, a buffering function against bending or twisting can be added as desired while adjacent CNT assembled wires do not bond to each other.

A proportion of the oriented region in the carbon nanotube assembled wire bundle is preferably 50% by volume or more and less than 100% by volume. Thus, in the carbon nanotube assembled wire bundle, the CNT assembled wire can have a sufficient degree of orientation. The proportion of the oriented region in the CNT assembled wire bundle is more preferably 60% by volume or more and 99% by volume or less, and still more preferably 70% by volume or more and 99% by volume or less.

A proportion of the amorphous region in the carbon nanotube assembled wire bundle is preferably larger than 0% by volume and 50% by volume or less. Thus, in the carbon nanotube assembled wire bundle, the CNT assembled wire can have a sufficient degree of orientation. The proportion of the amorphous region in the CNT assembled wire bundle is more preferably 1% by volume or more and 40% by volume or less, and still more preferably 1% by volume or more and 30% by volume or less.

A proportion of the oriented region and that of the amorphous region in the carbon nanotube assembled wire bundle is a value calculated through the following procedure of steps (b1) to (b3).

(b1) Setting a measurement field of view

On a surface of the carbon nanotube assembled wire bundle, a rectangular field of view of 1 mm×1 mm for measurement is selected randomly at 10 locations or more.

(b2) Measuring degree of orientation

For each of the ten or more measurement fields of view set in step (b1), a degree of orientation of the CNT assembled wires in the CNT assembled wire bundle is calculated through a procedure similar to that followed in measuring a degree of orientation of CNT assembled wires in a CNT assembled wire bundle, as described above.

(b3) Calculating a proportion

A proportion of an oriented region in the CNT assembled wire bundle can be obtained by calculating a proportion of the number of measurement fields of view that show a degree of orientation of 0.8 or more and 1.0 or less (i.e., the oriented region) out of the ten or more measurement fields of view. In addition, a proportion of an amorphous region in the CNT assembled wire bundle can be obtained by calculating a proportion of the number of measurement fields of view that show a degree of orientation of 0 or more and less than 0.8 (i.e., the amorphous region) out of the ten or more measurement fields of view.

(Distance Between Carbon Nanotube Assembled Wires)

Preferably, in at least a portion of the oriented region of the CNT assembled wire bundle of the present embodiment, a minimum value of a distance between adjacent ones of the plurality of carbon nanotube assembled wires is preferably 10 times or more an average diameter of the plurality of carbon nanotube assembled wires. According to this, a buffering function against bending or twisting can be added as desired while adjacent carbon nanotube assembled wires do not bond to each other.

Figure 13:
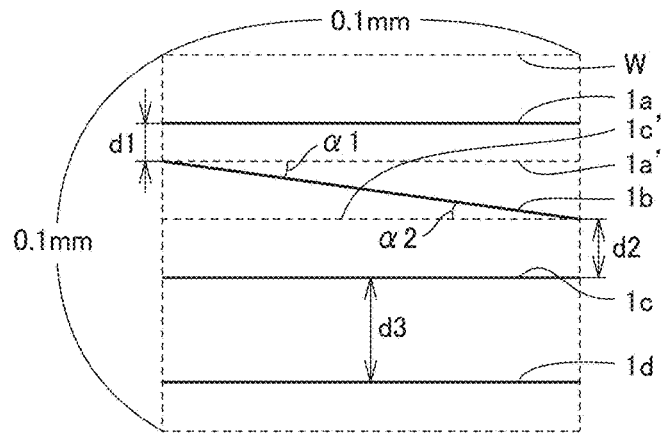
FIG. 13 is a diagram schematically showing an oriented region of a CNT assembled wire bundle in accordance with an embodiment of the present disclosure.

A method for measuring a distance between adjacent CNT assembled wires in the oriented region of the CNT assembled wire bundle in the present specification will now be described with reference to FIG. 13. FIG. 13 is a diagram schematically showing an example of an oriented region of a CNT assembled wire bundle in accordance with an embodiment of the present disclosure. In the present specification, a distance between CNT assembled wires can be confirmed through the following procedure of steps (c1) and (c2).

(c1) Setting a measurement field of view

One oriented region is arbitrarily selected from oriented regions observed through steps (b1) to (b3), and a field of view of a square of 0.1 mm×0.1 mm for measurement is set in the selected oriented region. When setting the measurement field of view, at least one side of a square that is the peripheral frame of the measurement field of view is set to be substantially parallel to at least one of the carbon nanotube assembled wires. For example, in FIG. 13, a carbon nanotube assembled wire 1a and one side W of the square are parallel to each other. Herein, being substantially parallel means that a specific carbon nanotube assembled wire and one side of a rectangle form an angle of 5° or less.

(c2) Measuring a distance between adjacent carbon nanotube assembled wires

In the measurement field of view set in step (c1), a distance between adjacent carbon nanotube assembled wires is measured through observation with a scanning electron microscope. Herein, being between adjacent carbon nanotube assembled wires means being between a specific carbon nanotube assembled wire and a carbon nanotube assembled wire present closest to the specific carbon nanotube assembled wire.

For example, a CNT assembled wire adjacent to carbon nanotube assembled wire 1a shown in FIG. 13 is a carbon nanotube assembled wire 1b, and a minimum value of the distance between CNT assembled wire 1a and CNT assembled wire 1b is d1. A CNT assembled wire adjacent to a carbon nanotube assembled wire 1c is carbon nanotube assembled wire 1b, and a minimum value of the distance between CNT assembled wire 1c and CNT assembled wire 1b is d2. A CNT assembled wire adjacent to a carbon nanotube assembled wire 1d is carbon nanotube assembled wire 1c, and a minimum value of the distance between CNT assembled wire 1d and CNT assembled wire 1c is d3.

(Comparing Distance Between CNT Assembled Wires with Average Diameter of CNT Assembled Wires)

Lengths d1, d2 and d3 are measured, and a minimum value of these is determined. By comparing the minimum value with the average diameter of the plurality of carbon nanotube assembled wires, it can be confirmed whether the minimum value of the distances between adjacent ones of the plurality of carbon nanotube assembled wires is 10 times or more the average diameter of the plurality of carbon nanotube assembled wires in at least a portion of the oriented region of the CNT assembled wire bundle. Herein, the average diameter of the plurality of carbon nanotube assembled wires means an average diameter of the plurality of carbon nanotube assembled wires present in the measurement field of view set in step (c1).

In the present specification, the diameter of the carbon nanotube assembled wire means an average outer diameter of a single CNT assembled wire. The average outer diameter of each of CNT assembled wires 1a, 1b, 1c, 1d is obtained by directly observing cross sections at two arbitrary positions of each CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters. The average diameter of the plurality of carbon nanotube assembled wires in the measurement field or view is calculated from the average outer diameter of each of CNT assembled wires 1a, 1b, 1c, and 1d.

The minimum value of the distances between adjacent ones of the plurality of carbon nanotube assembled wires is preferably 10 times or more and 50 times or less, more preferably 15 times or more and 40 times or less, and still more preferably 20 times or more and 30 times or less of the average diameter of the plurality of carbon nanotube assembled wires. When the minimum value of the distances between adjacent ones of the plurality of carbon nanotube assembled wires exceeds 50 times the average diameter of the plurality of carbon nanotube assembled wires, many gaps result and accordingly, foreign matters are easily introduced, and when an external force is applied, stress concentration occurs in the vicinity of the foreign matters and the buffering function is reduced, and the carbon nanotube assembled wires may break.

(Angle Between Carbon Nanotube Assembled Wires)

In at least a portion of the oriented region of the CNT assembled wire bundle of the present embodiment, a maximum value of angles between adjacent carbon nanotube assembled wires is preferably 10° or less. According to this, a buffering function against bending or twisting can be added as desired while adjacent carbon nanotube assembled wires do not bond to each other.

In the present specification, an angle between adjacent carbon nanotubes in at least a portion of an oriented region of a CNT assembled wire bundle can be confirmed through the following procedure of steps (d1) and (d2).

(d1) Determining Measurement Field of View

A measurement field of view of a square of 0.1 mm×0.1 mm is determined in a manner similar to that in step (c1).

(d2) Measuring angle between adjacent carbon nanotube assembled wires

In the field of view set in step (d1), an angle between adjacent carbon nanotube assembled wires is measured. Herein, being between adjacent carbon nanotube assembled wires means being between a specific carbon nanotube assembled wire and a carbon nanotube assembled wire present closest to the specific carbon nanotube assembled wire.

For example, a CNT assembled wire adjacent to carbon nanotube assembled wire 1a shown in FIG. 13 is carbon nanotube assembled wire 1b, and an angle between CNT assembled wire 1a and CNT assembled wire 1b, which is equal to an angle between a line 1a' parallel to CNT assembled wire 1a and CNT assembled wire 1b, is α1°. A CNT assembled wire adjacent to carbon nanotube assembled wire 1c is carbon nanotube assembled wire 1b, and an angle between CNT assembled wire 1c and CNT assembled wire 1b, which is equal to an angle between a line 1c' parallel to CNT assembled wire 1c and CNT assembled wire 1b, is α2°. A CNT assembled wire adjacent to carbon nanotube assembled wire 1c is carbon nanotube assembled wire 1d, and CNT assembled wire 1c and CNT assembled wire 1d are parallel to each other and form an angle of 0°.

When angles α1° and α2° have a maximum value of 10° or less, it is determined that an angle between adjacent carbon nanotube assembled wires is 10° or less in at least a portion of the oriented region of the CNT assembled wire bundle.

The angle between adjacent carbon nanotube assembled wires is preferably 10° or less, more preferably 9° or less, still more preferably 5° or less, and most preferably 0°.

(Elements Originating from Catalyst)

Preferably, the carbon nanotube assembled wire bundle includes at least one type of metal element selected from the group consisting of iron, nickel, cobalt, molybdenum, gold, silver, copper, yttrium, chromium, palladium, platinum and tungsten, and the metal element is dispersed in the carbon nanotube assembled wire bundle in the longitudinal direction thereof. Herein, the metal element dispersed in the CNT assembled wire bundle in the longitudinal direction thereof means that the metal element is not localized in the CNT assembled wire in the longitudinal direction thereof.

These metal elements originate from a catalyst (ferrocene $(Fe(C_5H_5)_2)$, nickelocene $(Ni(C_5H_5)_2)$, cobaltocene $(Co(C_5H_5)_2)$, and the like) used in manufacturing a CNT assembled wire bundle. The CNT assembled wire bundle in accordance with the present embodiment includes these metal elements such that the metal elements are dispersed in the CNT assembled wire bundle in the longitudinal direction thereof, so that the metal elements do not affect the CNT's characteristics in electric conductivity, and the CNT assembled wire bundle can be elongated while maintaining the inherent electric conductivity.

What type of metal element is included in the CNT assembled wire bundle and how much the former is contained in the latter can be confirmed and measured through energy dispersive X-ray spectrometry (EDX). A total content of the metal element in the CNT assembled wire bundle is preferably 0.1% or more and 50% or less, more preferably 1% or more and 40% or less, and still more preferably 5% or more and 20% or less based on atomicity.

The fact that the CNT assembled wire bundle includes a metal element dispersed therein in the longitudinal direction thereof can be confirmed through EDX, electron energy loss spectrometry (EELS) or the like measurable at the same time as an electron microscope such as SEM and TEM.

Preferably, the carbon nanotube assembled wire bundle includes the element of sulfur, and the element of sulfur is dispersed in the carbon nanotube assembled wire bundle in the longitudinal direction thereof. Herein, the element of sulfur dispersed in the CNT assembled wire bundle in the longitudinal direction thereof means that the element of sulfur is not localized in the CNT assembled wire bundle in the longitudinal direction thereof.

The element of sulfur originates from an assistive catalyst $(CS_2)$ used in manufacturing the CNT assembled wire bundle. The CNT assembled wire bundle in accordance with the present embodiment includes the element of sulfur such that it is dispersed in the CNT assembled wire bundle in the longitudinal direction thereof, so that the element of sulfur does not affect the CNT's characteristics in electric conductivity and mechanical strength, and the CNT assembled wire bundle can be elongated while maintaining these characteristics.

The fact that the CNT assembled wire bundle includes the element of sulfur, and the content of the element of sulfur in the CNT assembled wire bundle can be confirmed and measured through EDX, thermogravimetry, and X-ray photoelectron spectroscopy. The content of the element of sulfur in the CNT assembled wire bundle is preferably 0.1% or more and 20% or less, more preferably 1% or more and 15% or less, and still more preferably 2% or more and 10% or less based on atomicity.

The fact that the CNT assembled wire bundle includes the element of sulfur dispersed therein in the longitudinal direction thereof can be confirmed by EDX, EELS or the like measurable at the same time as an electron microscope such as SEM and TEM.

Embodiment 9: Carbon Nanotube Assembled Wire Bundle Manufacturing Apparatus

Figure 21:
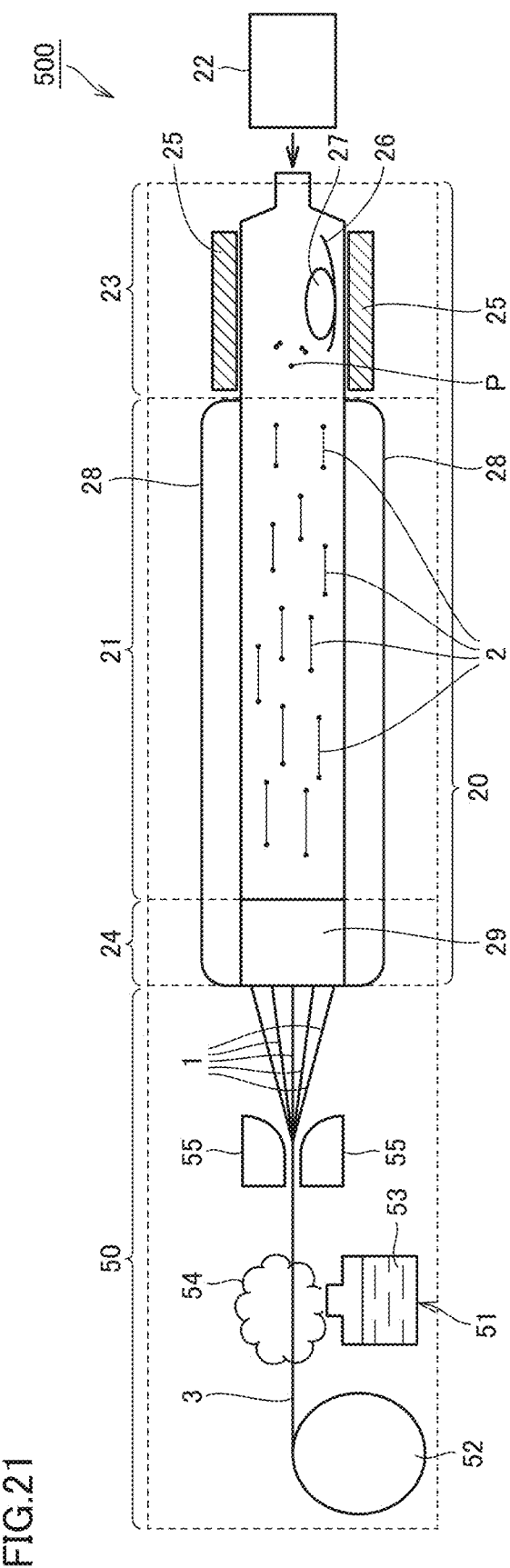
FIG. 21 is a diagram for illustrating a carbon nanotube assembled wire bundle manufacturing apparatus in accordance with an embodiment of the present disclosure.
Figure 22:
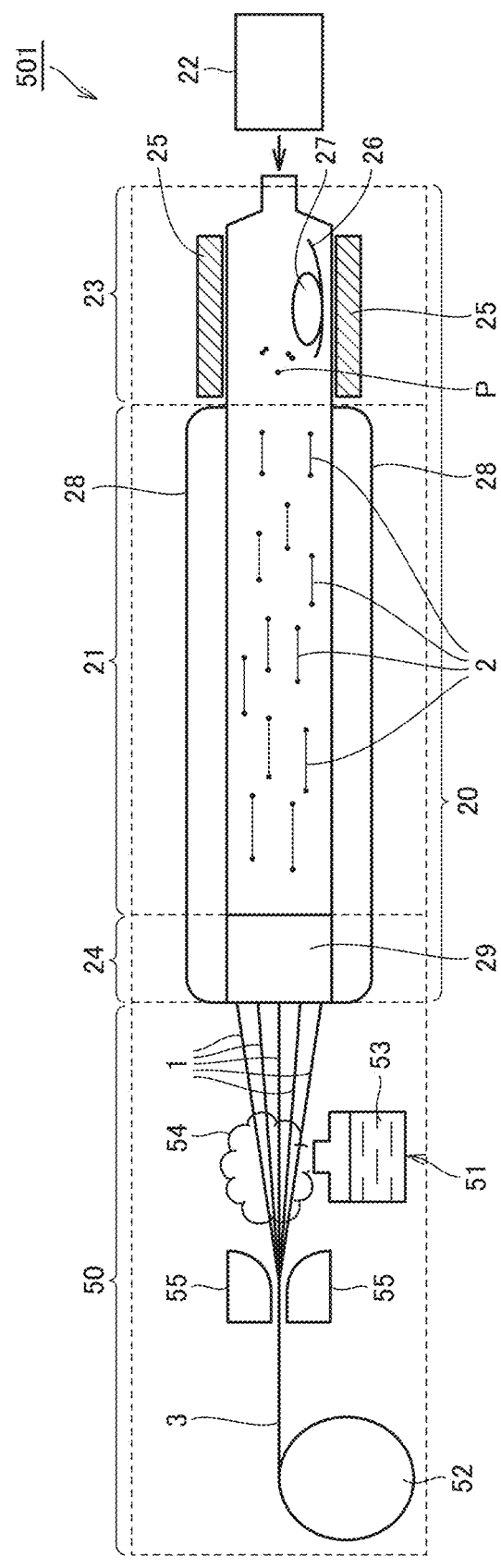
FIG. 22 is a diagram for illustrating another example of a carbon nanotube assembled wire bundle manufacturing apparatus in accordance with an embodiment of the present disclosure.

A carbon nanotube assembled wire bundle manufacturing apparatus used in a method for manufacturing a carbon nanotube assembled wire bundle in accordance with Embodiment 7 will now be described with reference to FIGS. 21 and 22. FIGS. 21 and 22 are diagrams showing a carbon nanotube assembled wire bundle manufacturing apparatus.

Carbon nanotube assembled wire bundle manufacturing apparatuses 500, 501 can include: carbon nanotube assembled wire manufacturing apparatus 20 described in Embodiment 6; and a bundling unit 50 that obtains a carbon nanotube assembled wire bundle by orienting and bundling a plurality of carbon nanotube assembled wires, which are obtained by the carbon nanotube assembled wire manufacturing apparatus, in a direction along a longitudinal direction of the plurality of carbon nanotube assembled wires.

Carbon nanotube assembled wire manufacturing apparatus 20 can have the same structure as that of the carbon nanotube assembled wire manufacturing apparatus described for Embodiment 6, and accordingly, it will not be described repeatedly.

<Bundling Unit>

In bundling unit 50, a plurality of suspended CNT assembled wires are oriented in their longitudinal direction and thus bundled together to form a carbon nanotube assembled wire bundle.

The bundling unit may have any structure that can orient a plurality of carbon nanotube assembled wires that are obtained in a carbon nanotube assembled wire manufacturing apparatus, and assemble them together in their longitudinal direction.

For example, the bundling unit can have a honeycomb structure, a straight-tube-type narrow tube structure, or the like. When the bundling unit has a honeycomb structure, the honeycomb structure is disposed in the carbon nanotube assembled wire bundle manufacturing apparatus such that the through holes have a longitudinal direction along the flow of the carbon-containing gas.

When the bundling unit has a honeycomb structure, it can be identical in configuration to that described for the above-described CNT assembled wire manufacturing apparatus.

The bundling unit can have a structure shared by the carbon nanotube assembling unit. That is, the CNT assembling unit can also function as the bundling unit.

The bundling unit can have a structure separate from the carbon nanotube assembling unit. In this case, the bundling unit is preferably disposed downstream of CNT assembling unit 24 as seen in the direction of the flow of the carbon-containing gas. For example, preferably, a diaphragm 55 is provided to the bundling unit disposed downstream of a CNT assembled wire, and a plurality of carbon nanotube assembled wires 1 are passed through diaphragm 55 and thus oriented and assembled together in their longitudinal direction.

Preferably, bundling unit 50 includes a liquid adhering apparatus 51 that adheres a volatile liquid 53 to the plurality of carbon nanotube assembled wires 1. Thus, a CNT assembled wire bundle having a high density can be provided.

As a method for adhering the volatile liquid to a carbon nanotube assembled wire, for example, atomizing the volatile liquid into vapor 55 and spraying vapor 55 to the carbon nanotube assembled wire are considered.

Liquid adhering apparatus 51 is disposed at a position where carbon nanotube assembled wire 1 can be exposed to the volatile liquid. For example, as shown in FIG. 21, liquid adhering apparatus 51 can be disposed downstream of diaphragm 55. Further, as shown in FIG. 22, liquid adhering apparatus 51 can be disposed upstream of diaphragm 55.

Preferably, the bundling unit includes a winding apparatus 52 that orients, bundles and winds the plurality of carbon nanotube assembled wires in a direction along the longitudinal direction of the plurality of carbon nanotube assembled wires while applying tension to the plurality of carbon nanotube assembled wires.

Thus, a CNT assembled wire bundle having a high density can be provided.

Other Configurations

The CNT assembled wire bundle manufacturing apparatus can include in addition to the above configuration a magnetic field generating unit that generates a magnetic field. It can be configured to be identical to the magnetic field generating unit described for the above CNT assembled wire manufacturing apparatus.

The CNT assembled wire bundle manufacturing apparatus can include, in addition to the above configuration, an electric field generating unit that generates an electric field. It can be configured to be identical to the electric field generating unit described for the above CNT assembled wire manufacturing apparatus.

Other Preferable Embodiments

Preferably, the carbon nanotube assembling unit and the bundling unit are formed of the same honeycomb structural body having a plurality of second flow channels, and the second flow channels each have a shape of a through hole with a helical groove in a periphery of the through hole. Thus, the gas in the second flow channel flows helically, so that a uniform twist angle is formed easily in the CNT assembled wire. Details of a case in which each second flow channel helically extends have been described for the method for manufacturing a CNT assembled wire in accordance with Embodiment 4, and accordingly, will not be described repeatedly.

Preferably, a distance between nearest neighbor second flow channels of the plurality of second flow channels is shorter in a downstream side of the nearest neighbor second flow channels than in an upstream side of the nearest neighbor second flow channels. Thus, the CNT assembled wires are bundled easily, so that the CNT assembled wire bundle is formed easily. Details of a case in which a distance between nearest neighbor second flow channels of the plurality of second flow channels is shorter in a downstream side of the nearest neighbor second flow channels than in an upstream side of the nearest neighbor second flow channels have been described for the method for manufacturing a CNT assembled wire bundle in accordance with Embodiment 7, and accordingly, will not be described repeatedly.

Preferably, each second flow channel has an area in cross section smaller on the downstream side than the upstream side. Thus, in the second flow channels, CNTs are assembled easily and CNT assembled wires are assembled easily, so that the CNT assembled wire and the CNT assembled wire bundle are formed easily. Details of a case in which each second flow channel has an area in cross section smaller on the downstream side than the upstream side have been described for the method for manufacturing a CNT assembled wire in accordance with Embodiment 4, and accordingly, will not be described repeatedly.

Examples

The present embodiment will be described more specifically with reference to examples. However, the present embodiment is not limited by these examples.

<<Study 1>>
[Preparing Carbon Nanotube Manufacturing Apparatus]
<Apparatus 1>

As an apparatus 1, a carbon nanotube manufacturing apparatus having a configuration similar to that of a carbon nanotube manufacturing apparatus outlined as shown in FIG. 18 was prepared. Specifically, carbon nanotube growing unit 21 and carbon nanotube drawing unit 30 are disposed in electric furnace 28. The CNT growing unit is a quartz tube having an inner diameter of 20 mm and a length of 800 mm. Carbon nanotube drawing unit 30 is a quartz tube in communication with the carbon nanotube growing unit, and has an average inner diameter of 8 mm and a length of 300 mm.

Catalyst supplying unit 23 is disposed on a side of CNT growing unit 21 opposite to a side thereof in communication with CNT drawing unit 30. Catalyst supplying unit 23 is a quartz tube having an inner diameter of 20 mm and a length of 200 mm, and is disposed in communication with the CNT growing unit. In catalyst supplying unit 23, ferrocene is disposed as a catalyst on catalyst holder 26. Catalyst supplying unit 23 is heated by heater 25.

Gas supplying unit 22 is disposed on a side of catalyst supplying unit 23 opposite to a side thereof connected to CNT growing unit 21. Apparatus 1 corresponds to an example.

<Apparatus 2>

As an apparatus 2, an apparatus having a configuration basically similar to that of apparatus 1 was prepared. Apparatus 2 differs from apparatus 1 in that the former does not include carbon nanotube drawing unit 30. That is, in this apparatus, the CNT drawing unit is not disposed at an end of CNT growing unit 21 that is located on a side opposite to a side in communication with catalyst supplying unit 23. Note that the length of the carbon nanotube growing unit of apparatus 2 was the same as the total length of the carbon nanotube growing unit and the carbon nanotube drawing unit of apparatus 1.

Apparatus 2 corresponds to a comparative example.

[Producing Carbon Nanotubes]

Carbon nanotubes for samples 1 and 2 were prepared using apparatuses 1 and 2, respectively, as manufacturing apparatuses. Initially, in each of apparatuses 1 and 2, an electric furnace's internal temperature was raised to 1000° C. while argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit. Thereafter, in apparatus 1, CNTs were drawn in the CNT drawing unit.

[Measuring Carbon Nanotube]

(Shape)

The carbon nanotubes of samples 1 and 2 were measured in average length and average diameter. How the average length and the average diameter were measured is the same as has been described in Embodiment 2, and accordingly, it will not be described repeatedly.

The CNT of sample 1 was a carbon nanotube drawn in its longitudinal direction in the form of a linear yarn, and had an average length of 10 μm and an average diameter of 1.2 nm.

The CNT of sample 2 had an average length of 2 μm and an average diameter of 1.2 nm. From the above, it has been confirmed that the CNT (sample 1) obtained by apparatus 1 is longer than the CNT (sample 2) obtained by apparatus 2.

<<Study 2>>

[Preparing Carbon Nanotube Assembled Wire Manufacturing Apparatus]

<Apparatus 3>

As an apparatus 3, a carbon nanotube assembled wire manufacturing apparatus having a configuration similar to that of the carbon nanotube assembled wire manufacturing apparatus outlined in FIG. 14 was prepared. Specifically, carbon nanotube growing unit 21 and carbon nanotube assembling unit 24 are disposed in electric furnace 28. The CNT growing unit is a quartz tube having an inner diameter of 20 mm and a length of 800 mm. As carbon nanotube assembling unit 24, a ceramic honeycomb structure is disposed in a quartz tube in communication with the CNT growing unit. The honeycomb structure has about 200 through holes per inch, and each throughhole has an area in cross section of 0.8 mm².

Catalyst supplying unit 23 is disposed on a side of CNT growing unit 21 opposite to a side thereof in communication with CNT assembling unit 24. Catalyst supplying unit 23 is a quartz tube having an inner diameter of 20 mm and a length of 200 mm, and is disposed in communication with the CNT growing unit. In catalyst supplying unit 23, ferrocene is disposed as a catalyst on catalyst holder 26. Catalyst supplying unit 23 is heated by heater 25.

Gas supplying unit 22 is disposed on a side of catalyst supplying unit 23 opposite to a side thereof connected to CNT growing unit 21. Apparatus 3 corresponds to an example.

<Apparatus 4>

As an apparatus 4, an apparatus having a configuration basically similar to that of apparatus 3 was prepared. Apparatus 4 differs from apparatus 3 in that the former does not include carbon nanotube assembling unit 24. That is, in this apparatus, the CNT assembling unit is not disposed at an end of CNT growing unit 21 that is located on a side opposite to a side in communication with catalyst supplying unit 23. Apparatus 4 corresponds to a comparative example.

<Apparatus 5>

Figure 19:
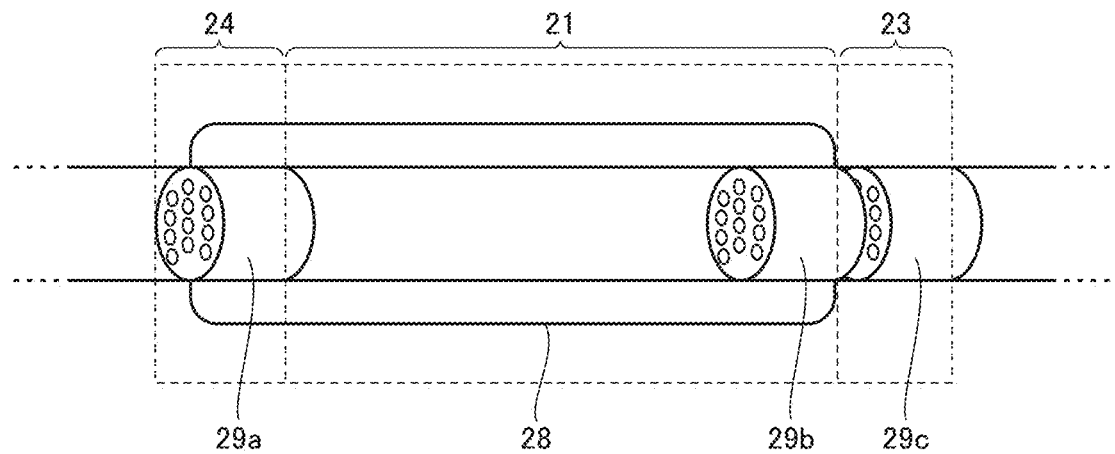
FIG. 19 is a diagram for illustrating an apparatus 5 and an apparatus 6 manufactured in an example.

As an apparatus 5, an apparatus having a configuration basically similar to that of apparatus 3 was prepared. Apparatus 5 differs from apparatus 3 in that the honeycomb structure is not disposed downstream of the carbon nanotube growing unit, as shown in FIG. 19 by a honeycomb structure 29a; rather, it is disposed inside carbon nanotube growing unit 21 at an upstream side as seen in the direction of the flow of the carbon-containing gas, as shown by a honeycomb structure 29b. Apparatus 5 corresponds to a comparative example.

<Apparatus 6>

As an apparatus 6, an apparatus having a configuration basically similar to that of apparatus 3 was prepared. Apparatus 6 differs from apparatus 3 in that the honeycomb structure is not disposed downstream of the carbon nanotube growing unit, as shown in FIG. 19 by honeycomb structure 29a; rather, it is disposed inside catalyst supplying unit 23, as shown by a honeycomb structure 29c. Apparatus 6 corresponds to a comparative example.

[Producing Carbon Nanotube Assembled Wires]

Carbon nanotube assembled wires for samples 3 to 6 were produced using apparatuses 3 to 6, respectively, as manufacturing apparatuses. Initially, in each of apparatuses 3 to 6, an electric furnace's internal temperature was raised to 1000° C. while an argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit.

Figure 17:
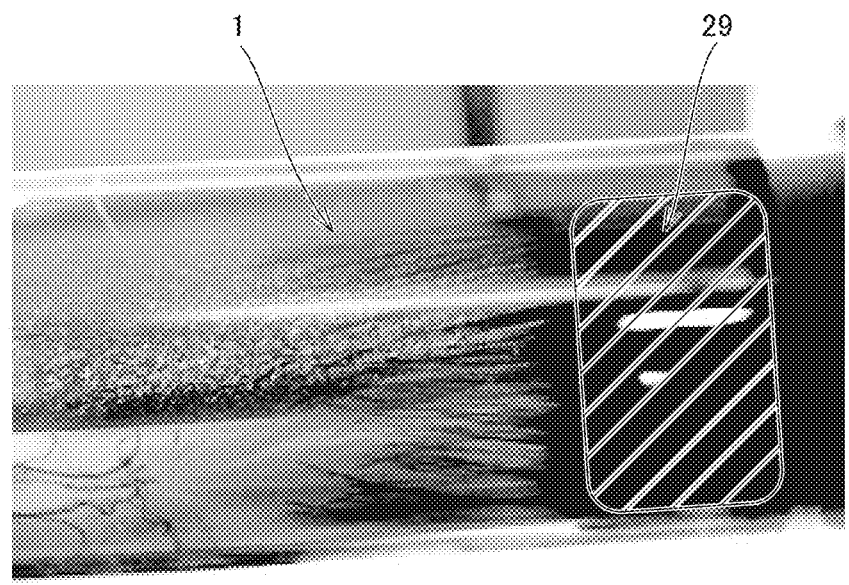
FIG. 17 is an image of a carbon nanotube assembled wire of a sample 1.

Thereafter, in apparatus 3, CNTs were drawn and assembled together in the CNT assembling unit and a CNT assembled wire was thus obtained. When a downstream side of the honeycomb structure constituting the CNT assembling unit of apparatus 3 was visually observed, then, as shown in FIG. 17, it has been confirmed that carbon nanotube assembled wire 1 (sample 3) formed of a plurality of CNTs assembled together is discharged through a through hole of honeycomb structure 29.

When a downstream side of the CNT growing unit in apparatus 4 was observed with a SEM, a CNT assembled wire (sample 4) having a plurality of CNTs assembled together was confirmed.

In apparatuses 5 and 6, no CNT assembled wire was observed in the CNT growing unit.

[Measuring Carbon Nanotube Assembled Wire]
(Degree of Orientation)

The carbon nanotube assembled wires of samples 3 and 4 had their degrees of orientation measured. The method used herein for calculating the degrees of orientation is the same as the method described in Embodiment 5, and accordingly, it will not be described repeatedly.

A TEM image of the CNT assembled wire of sample 3 is shown in FIG. 2, and a Fourier transformed image thereof is shown in FIG. 4. FIG. 5 shows a relationship between angle of orientation and intensity of orientation presented by sample 1.

Sample 3 provided a full width at half maximum of 12° and a degree of orientation of 0.93. Sample 4 provided a full width at half maximum of 54° and a degree of orientation of 0.70.

From the above, it has been confirmed that the CNT assembled wire obtained from apparatus 3 (sample 3) has a larger degree of orientation of CNT than the CNT assembled wire obtained from apparatus 4 (sample 4).

(Shape)

The carbon nanotube assembled wire of sample 3 had its average length and average diameter measured. How the average length and the average diameter were measured is the same as has been described in Embodiment 5, and accordingly, it will not be described repeatedly.

The CNT assembled wire of sample 3 was in the form of a linear yarn composed of a plurality of carbon nanotubes oriented and assembled together in their longitudinal direction, and had an average length of 10 cm and an average diameter of 50 μm.

(Elements Originating from Catalyst)

The carbon nanotube assembled wire of sample 3 was subjected to EDX analysis to identify an element included in the CNT assembled wire that originates from the catalyst.

Sample 3 was confirmed to include iron and sulfur. In addition, through SEM observation and EDX analysis, it has been confirmed that iron and sulfur are dispersed longitudinally of the CNT assembled wire.

<<Study 3>>

[Preparing Carbon Nanotube Assembled Wire Bundle Manufacturing Apparatus]

(Apparatus 7)

As an apparatus 7, a carbon nanotube assembled wire bundle manufacturing apparatus having a configuration basically similar to that of apparatus 3 was prepared. Apparatus 7 differs from apparatus 3 in that the former introduces an orifice plate on the outlet side of the honeycomb in order to converge CNT assembled wires to one point.

(Apparatus 8)

As an apparatus 8, an apparatus having a configuration basically similar to that of apparatus 7 was prepared. The apparatus differs from apparatus 7 in that the former does not include a mechanism for converging CNT assembled wires.

<Producing a Carbon Nanotube Assembled Wire Bundle>

Carbon nanotube assembled wire bundles for samples 7 and 8 were produced using manufacturing apparatuses that are apparatuses 7 and 8, respectively. Initially, in each of apparatuses 7 and 8, an electric furnace's internal temperature was raised to 1000° C. while an argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit.

Thereafter, in apparatus 7, CNTs were drawn and assembled together in the CNT assembling unit and CNT assembled wires were thus obtained, and the CNT assembled wires were bundled together and a CNT assembled wire bundle was thus obtained. When a downstream side of the honeycomb structure constituting the CNT assembling unit of apparatus 7 was visually observed, it has been confirmed that a carbon nanotube assembled wire bundle (sample 7) formed of a plurality of CNT assembled wires assembled together was discharged through a through hole of honeycomb structure 29.

When a downstream side of the CNT growing unit in apparatus 8 was observed with a SEM, a CNT assembled wire (sample 8) having a plurality of CNTs assembled together was confirmed.

<Measuring a Carbon Nanotube Assembled Wire Bundle>

(Degree of Orientation)

The carbon nanotube assembled wire bundles of samples 7 and 8 had their degrees of orientation measured. The method used herein to calculate a degree of orientation of CNT in a CNT assembled wire is the same as the method described in Embodiment 5, and accordingly, it will not be described repeatedly. The method used herein to calculate a degree of orientation of a CNT assembled wire in a CNT assembled wire bundle is the same as that described in Embodiment 8, and accordingly, it will not be described repeatedly.

The CNT assembled wire bundle of sample 7 was composed of CNT assembled wires composed of CNTs having a degree of orientation of 0.94, and the CNT assembled wire bundle was composed of CNT assembled wires having a degree of orientation of 0.93.

The CNT assembled wire bundle of sample 8 was composed of CNT assembled wires composed of CNTs having a degree of orientation of 0.93, and the CNT assembled wire bundle was composed of CNT assembled wires having a degree of orientation of 0.76.

From the above, it has been confirmed that the CNT assembled wire bundle obtained from apparatus 7 (sample 7) is composed of CNT assembled wires composed of CNTs having a higher degree of orientation and is also composed of CNT assembled wires having a higher degree of orientation than the CNT assembled wire bundle obtained from apparatus 8 (sample 8).

(Shape)

The carbon nanotube assembled wire bundle of sample 7 had its average length and average diameter measured. How the average length and the average diameter were measured is the same as has been described in Embodiment 8, and accordingly, it will not be described repeatedly.

The CNT assembled wire bundle of sample 7 was in the form of a linear yarn composed of a plurality of carbon nanotube assembled wires oriented and assembled together in their longitudinal direction, and had an average length of 10 cm and an average diameter of 200 μm.

(Elements Originating from Catalyst)

CNT assembled wires included in the carbon nanotube assembled wire bundle of sample 7 were subjected to EDX analysis to identify an element included in the CNT assembled wire that originates from the catalyst.

Sample 7 was confirmed to include iron and sulfur. In addition, through SEM observation and EDX analysis, it has been confirmed that iron and sulfur are dispersed longitudinally of the CNT assembled wire.

(Proportion of Oriented Region and Amorphous Region)

The carbon nanotube assembled wire bundle of sample 7 was subjected to measurement of a proportion in volume of the oriented region and the amorphous region. How the proportion in volume of the oriented region and the amorphous region was measured is the same as described in Embodiment 8, and accordingly, it will not be described repeatedly.

The CNT assembled wire bundle of sample 7 had 80% by volume of oriented region and 20% by volume of amorphous region.

(Distance Between Carbon Nanotubes)

The carbon nanotube assembled wire bundle of sample 7 was subjected to measurement of a minimum value of a distance between adjacent ones of a plurality of carbon nanotube assembled wires in the oriented region. It was also subjected to measurement of an average diameter of the CNT assembled wires constituting the CNT assembled wire bundle. How a minimum value of a distance between adjacent ones of the plurality of carbon nanotube assembled wires in the oriented region and an average diameter of the CNT assembled wires were measured is the same as has been described in Embodiment 8, and accordingly, it will not be described repeatedly.

In sample 7, the minimum value of the distance between adjacent ones of the plurality of carbon nanotube assembled wires in the oriented region was 300 nm, and the average diameter of the CNT assembled wires was 25 nm. That is, it has been confirmed that the minimum value of the distance between adjacent ones of the plurality of carbon nanotube assembled wires was 10 times or more the average diameter of the plurality of carbon nanotube assembled wires.

(Angle Between Carbon Nanotube Assembled Wires)

The carbon nanotube assembled wire bundle of sample 7 was subjected to measurement of a maximum value of an angle between adjacent carbon nanotube assembled wires in the oriented region. How an angle between adjacent carbon nanotube assembled wires in the oriented region was measured is the same as has been described in Embodiment 8, and accordingly, it will not be described repeatedly.

In sample 7, the oriented region had adjacent carbon nanotube assembled wires forming an angle having a maximum value of 9°. That is, it has been confirmed that the maximum value of the angle between adjacent carbon nanotube assembled wires was 10° or less.

<<Study 4>>

In a study 4, CNT assembled wire manufacturing apparatuses were used to investigate a relationship between an area in cross section of the second flow channel of the CNT assembling unit and a diameter and length of a CNT included in an obtained CNT assembled wire.

[Preparing Carbon Nanotube Assembled Wire Manufacturing Apparatuses]

(Apparatuses 9-14)

Apparatuses 9 to 14 are similar in configuration to the carbon nanotube assembled wire manufacturing apparatus shown in FIG. 14. Specifically, carbon nanotube growing unit 21 and carbon nanotube assembling unit 24 are disposed in electric furnace 28. The CNT growing unit is a quartz tube having an inner diameter of 20 mm and a length of 800 mm. As carbon nanotube assembling unit 24, a ceramic honeycomb structure is disposed in a quartz tube in communication with the CNT growing unit. Apparatuses 9 to 14 each have a honeycomb structure with each throughhole (i.e., the second flow channel) having an area in cross section and a length as shown in Table 1. For example, apparatus 9 has a honeycomb structure with each throughhole (i.e., the second flow channel) having an area in cross section of 1 mm$^2$ and a length of 50 mm.

Catalyst supplying unit 23 is disposed on a side of CNT growing unit 21 opposite to a side thereof in communication with CNT assembling unit 24. Catalyst supplying unit 23 is a quartz tube having an inner diameter of 20 mm and a length of 200 mm, and is disposed in communication with the CNT growing unit. In catalyst supplying unit 23, ferrocene is disposed as a catalyst on catalyst holder 26. Catalyst supplying unit 23 is heated by heater 25.

Gas supplying unit 22 is disposed on a side of catalyst supplying unit 23 opposite to a side thereof connected to CNT growing unit 21. Apparatuses 9-14 correspond to examples.

[Producing Carbon Nanotube Assembled Wires]

Carbon nanotube assembled wires were produced using apparatuses 9-14 as manufacturing apparatuses. Initially, in each of apparatuses 9 to 14, an electric furnace's internal temperature was raised to 1000° C. while an argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

In each of apparatuses 9 to 14, the carbon-containing gas had a temperature of 1000° C. on the upstream side of the CNT assembling unit and a temperature of 600° C. on the downstream side of the CNT assembling unit.

In each of apparatuses 9 to 14, by thus supplying the argon gas, the methane gas and the carbon disulfide gas, a catalyst is disintegrated, and catalyst particles were thus discharged into the CNT growing unit. Thereafter, CNTs were grown in the CNT growing unit, and furthermore, the CNTs were drawn and assembled together in the CNT assembling unit, and CNT assembled wires for samples 9 to 14 were thus obtained.

[Measuring CNT Assembled Wires]

The CNT assembled wires of samples 9 to 14 had their degrees of orientation and their CNTs' diameters. How their degrees of orientation and their CNTs' diameters were measured is the same as has been described in Embodiment 5, and accordingly, it will not be described repeatedly. A result thereof is indicated in table 1, the "CNT" column, the "degree of orientation" and "diameter" subcolumns.

TABLE 1

| samples | 2nd flow channel (through hole) | | CNT | |
| --- | --- | --- | --- | --- |
| | area in cross section (mm²) | length (mm) | degree of orientation | diameter (nm) |
| 9 | 9.61 | 50 | 0.90 | 2 |
| 10 | 4 | 50 | 0.92 | 1.5 |
| 11 | 1.96 | 50 | 0.92 | 1.5 |
| 12 | 1.96 | 100 | 0.94 | 1 |
| 13 | 1.21 | 50 | 0.94 | 1 |
| 14 | 0.81 | 50 | 0.94 | 1 |

Evaluation

From samples 9 to 14, it has been confirmed that the smaller the area in cross section of the through hole (or second flow channel) is, the smaller the diameter of the CNT tends to be. In addition, from samples 11 and 12, it has been confirmed that the longer the through hole is, the smaller the diameter of the CNT tends to be.

<<Study 5>>

In a study 5, a relationship between a temperature of the carbon-containing gas on the upstream side of the CNT assembling unit and that of the carbon-containing gas on the downstream side of the CNT assembling unit, and a ratio of CNTs assembled together was investigated in a CNT assembled wire manufacturing process.

[Preparing Carbon Nanotube Assembled Wire Manufacturing Apparatus]

As a CNT assembled wire manufacturing apparatus, an apparatus having the same configuration as that of apparatus 9 of study 4 was prepared.

[Producing Carbon Nanotube Assembled Wires] (Manufacturing Process 9-1)

Initially, in apparatus 9, an electric furnace's internal temperature was raised to 1200° C. while an argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

In manufacturing process 9-1, the carbon-containing gas has a temperature of 1200° C. on the upstream side of the CNT assembling unit and a temperature of 600° C. on the downstream side of the CNT assembling unit, and a temperature of 600° C. at a downstream end inside of the throughhole (or second flow channel) of the CNT assembling unit.

By thus supplying the argon gas, the methane gas and the carbon disulfide gas, a catalyst is disintegrated, and catalyst particles were thus discharged into the CNT growing unit. Thereafter, CNTs were grown in the CNT growing unit, and furthermore, the CNTs were drawn and assembled together in the CNT assembling unit, and a CNT assembled wire was thus obtained.

(Manufacturing Process 9-2)

In a manufacturing process 9-2, a CNT assembled wire was produced in a method similar to that of manufacturing process 9-1, except that the carbon-containing gas had a temperature of 500° C. on the downstream side of the CNT assembling unit and at the downstream end inside of the throughhole (or second flow channel) of the CNT assembling unit.

(Manufacturing Process 9-3)

In a manufacturing process 9-3, a CNT assembled wire was produced in a manner similar to manufacturing process 9-1, except that the carbon-containing gas had a temperature of 300° C. on the downstream side of the CNT assembling unit and at the downstream end inside of the throughhole (or second flow channel) of the CNT assembling unit.

Evaluation

In manufacturing process 9-1, when the downstream side of the CNT assembling unit was observed with a TEM, it has been confirmed that single CNTs were also present together with a CNT assembled wire.

In manufacturing process 9-2, when the downstream side of the CNT assembling unit was observed with a TEM, it has been confirmed that single CNTs were also present together with a CNT assembled wire. The manufacturing process presented a lower ratio of single CNTs than manufacturing process 9-1.

In manufacturing process 9-3, when the downstream side of the CNT assembling unit was observed with an electron microscope, a CNT assembled wire was confirmed. No single CNT was observed.

Discussion

From the above, it has been confirmed that when the downstream side of the CNT assembling unit is lower in temperature, CNT assembled wires are formed at a higher ratio and single CNTs are present at a lower ratio. It is inferred that this is because CNTs are assembled together more easily when the downstream side of the CNT assembling unit is lower in temperature.

<<Study 6>>

In a study 6, in a CNT assembled wire bundle manufacturing process, a relationship between whether the volatile liquid adhering and evaporating steps are performed and a CNT assembled wire bundle's density was investigated.

[Preparing Carbon Nanotube Assembled Wire Bundle Manufacturing Apparatus]

(Apparatus 10-1)

As an apparatus 10-1, an apparatus including a CNT assembled wire manufacturing apparatus having the same configuration as that of apparatus 9 of study 4 and a bundling unit including a diaphragm and a winding apparatus downstream of the CNT assembled wire manufacturing apparatus was prepared.

(Apparatus 10-2)

As an apparatus 10-2, a CNT assembled wire bundle manufacturing apparatus having the configuration shown in FIG. 21 was prepared. Specifically, apparatus 10-2 is similar in configuration to apparatus 10-1, and furthermore, downstream of the diaphragm, includes a liquid adhering apparatus followed by a winding apparatus. Ethanol is sealed in the liquid adhering apparatus.

(Apparatus 10-3)

As an apparatus 10-3, a CNT assembled wire bundle manufacturing apparatus having a configuration shown in FIG. 22 was prepared. Specifically, apparatus 10-3 is similar in configuration to apparatus 10-1, and further includes a liquid adhering apparatus disposed between a CNT assembled wire manufacturing apparatus and a diaphragm, and a winding apparatus disposed downstream of the diaphragm. Ethanol is sealed in the liquid adhering apparatus as a volatile liquid.
(Apparatus 10-4)

As an apparatus 10-4, an apparatus having a configuration similar to that of apparatus 7 of study 3 was prepared.
[Producing Carbon Nanotube Assembled Wire Bundles]
(Manufacturing Process 10-1)

In a manufacturing process 10-1, CNT assembled wires were manufactured under conditions similar to those in manufacturing process 9-1, and subsequently, the CNT assembled wires were bundled through a diaphragm to obtain a CNT assembled wire bundle for sample 10-1. The bundling step was performed while applying tension to the CNT assembled wires by winding the CNT assembled wire bundle with the winding apparatus.
(Manufacturing Process 10-2)

In a manufacturing process 10-2, CNT assembled wires were manufactured under conditions similar to those in manufacturing process 9-1 and bundled together through a diaphragm, and subsequently, a volatile liquid in the form of vapor was adhered to the CNT assembled wires and thereafter the volatile liquid was naturally dried and thus evaporated to obtain a CNT assembled wire bundle for sample 10-2. The bundling step was performed while applying tension to the CNT assembled wires by winding the CNT assembled wire bundle with the winding apparatus.
(Manufacturing Process 10-3)

In a manufacturing process 10-3, CNT assembled wires were manufactured under conditions similar to those in manufacturing process 9-1 and a volatile liquid in the form of vapor was adhered to the CNT assembled wires, and subsequently, the CNT assembled wires were bundled together through a diaphragm and the volatile liquid was naturally dried and thus evaporated to obtain a CNT assembled wire bundle for sample 10-3. The bundling step was performed while applying tension to the CNT assembled wires by winding the CNT assembled wire bundle with the winding apparatus.
(Manufacturing Process 10-4)

In a manufacturing process 10-4, a CNT assembled wire bundle was manufactured under conditions similar to those for sample 7 of study 3.

Evaluation

<Measuring a Carbon Nanotube Assembled Wire Bundles>
(Degree of Orientation)

The carbon nanotube assembled wire bundles of samples 10-1 to 10-4 had their degrees of orientation measured. The method used herein to calculate a degree of orientation of CNT (hereinafter also referred to as "CNT's degree of orientation") in a CNT assembled wire is the same as the method described in Embodiment 5, and accordingly, it will not be described repeatedly. The method used herein to calculate a degree of orientation of CNT assembled wires (hereinafter also referred to as "CNT assembled wire's degree of orientation") in a CNT assembled wire bundle is the same as the method described in Embodiment 8, and accordingly, it will not be described repeatedly. A result thereof is shown in table 2, the "CNT's degree of orientation" and "CNT assembled wire's degree of orientation" columns.
(Density)

The carbon nanotube assembled wire bundles of samples 10-1 to 10-4 were measured in density. Density was calculated based on the CNT assembled wire bundle's volume and weight, and represented in % as compared with 100% of CNT. A result thereof is shown in table 2, the "density" column.
(Breaking Strength)

The carbon nanotube assembled wire bundles of samples 10-1 to 10-4 were measured for breaking strength. Breaking strength was measured as follows:

A CNT assembled wire having a length of about 3 cm was prepared, and had its opposite ends fixed to a tensile jig plate with an adhesive. A load cell (measurement instrument: ZTS-5N manufactured by IMADA Co., Ltd.) was used to measure tensile stress until a 1 cm of the CNT assembled wire which was not fixed with the adhesive broke. A result thereof is shown in table 2, the "Breaking Strength" column.

TABLE 2

| | | | CNT assembled wire bundle | | | |
|---|---|---|---|---|---|---|
| | bundling step | | CNT's | CNT assembled wire's | | |
| samples | tension | adhering step | degree of orientation | degree of orientation | density | breaking strength |
| 10-1 | applied | not applied | 0.90 | 0.85 | 45% | 1.8 GPa |
| 10-2 | applied | applied | 0.94 | 0.90 | 70% | 2.8 GPa |
| 10-3 | applied | applied | 0.94 | 0.93 | 80% | 3.4 GPa |
| 10-4 | not applied | not applied | 0.85 | 0.75 | 40% | 1.4 GPa |

Discussion

When samples 10-1 and 10-4 were compared, it has been confirmed that when the bundling step is performed with CNT assembled wires tensioned, a CNT assembled wire bundle increased in density and hence strength is obtained.

When samples 10-1 to 10-3 were compared, it has been confirmed that when the bundling step includes the volatile liquid adhering and evaporating steps, a CNT assembled wire bundle increased in density and hence strength is obtained.

While embodiments and examples of the present disclosure have been described as above, it is also planned from the beginning that the configurations of the above-described embodiments and examples are appropriately combined and variously modified.

The embodiments and examples disclosed herein are illustrative in any respects and should not be construed as being restrictive. The scope of the present invention is defined by the scope of the claims, rather than the embodiments and the examples described above, and is intended to include any modifications within the scope and meaning equivalent to the scope of the claims.

REFERENCE SIGNS LIST 1, 1a, 1b, 1c, 1d carbon nanotube assembled wire, 2 carbon nanotube, 3 carbon nanotube assembled wire bundle 20, 20a, 20b CNT assembled wire manufacturing apparatus, 21 CNT growing unit, 22 gas supplying unit, 23 catalyst supplying unit, 24, 24a carbon nanotube assembling unit, 25 heater, 26 catalyst holder, 27 catalyst, 28 electric furnace, 29, 29a, 29b, 29c, 29d, 29e, 29f, 29g honeycomb structure, 30 CNT drawing unit, 291 outlet, 240, 240a, 240b, 240c, 240d second flow channel, 301 electric wire, 31 reactor tube, 32 magnetic line of force, 33 positive electrode, 34 negative electrodes, 35 oriented region, 36 amorphous region, 50 bundling unit, 51 liquid adhering apparatus, 52 winding apparatus, 53 volatile liquid, 54 vapor, 55 diaphragm, 500, 501 carbon nanotube assembled wire bundle manufacturing apparatus, T tube portion, C cone portion, P catalyst particle, M1 helical groove.

The invention claimed is:

1. A method for manufacturing a carbon nanotube, the method comprising:
    a growing step of growing a carbon nanotube from a catalyst particle by supplying a carbon-containing gas to the catalyst particle in a suspended state; and
    a drawing step of drawing the carbon nanotube by applying a tensile force to the carbon nanotube in a suspended state,
    wherein the tensile force is applied to the carbon nanotube by varying a flow velocity of the carbon-containing gas, and
    wherein an average flow velocity of the carbon-containing gas at a downstream side is higher than an average flow velocity of the carbon-containing gas at an upstream side.

2. The method for manufacturing a carbon nanotube according to claim 1, wherein in the drawing step, the carbon nanotube is oriented and drawn in a direction along flow of the carbon-containing gas.

3. The method for manufacturing a carbon nanotube according to claim 1, wherein the tensile force is applied to the carbon nanotube by means of a magnetic field.

4. The method for manufacturing a carbon nanotube according to claim 1, wherein the tensile force is applied to the carbon nanotube by means of an electric field.

5. A method for manufacturing a carbon nanotube assembled wire, the method comprising:
    a growing step of growing a plurality of carbon nanotubes by supplying a carbon-containing gas to a plurality of catalyst particles in a suspended state to grow one or a plurality of carbon nanotubes from each of the plurality of catalyst particles;
    a drawing step of drawing the plurality of carbon nanotubes by applying a tensile force to the plurality of carbon nanotubes in a suspended state; and
    an assembling step of obtaining a carbon nanotube assembled wire by orienting and assembling the plurality of carbon nanotubes in the suspended state in a direction along flow of the carbon-containing gas,
    wherein the tensile force is applied to the plurality of carbon nanotubes by varying a flow velocity of the carbon-containing gas, and
    wherein an average flow velocity of the carbon-containing gas at a downstream side is higher than an average flow velocity of the carbon-containing gas at an upstream side.

6. The method for manufacturing a carbon nanotube assembled wire according to claim 5, wherein in the drawing step, the plurality of carbon nanotubes are oriented and drawn in the direction along flow of the carbon-containing gas.

7. The method for manufacturing a carbon nanotube assembled wire according to claim 5, wherein the drawing step and the assembling step are performed simultaneously.

8. The method for manufacturing a carbon nanotube assembled wire according to claim 5, wherein the tensile force is applied to the plurality of carbon nanotubes by means of a magnetic field.

9. The method for manufacturing a carbon nanotube assembled wire according to claim 5, wherein the tensile force is applied to the plurality of carbon nanotubes by means of an electric field.

10. The method for manufacturing a carbon nanotube assembled wire according to claim 5, wherein in the assembling step, the plurality of carbon nanotubes that are oriented are caused to approach each other.

11. The method for manufacturing a carbon nanotube assembled wire according to claim 5, wherein in the assembling step, the plurality of carbon nanotubes are reduced in diameter.

12. The method for manufacturing a carbon nanotube assembled wire according to claim 5, wherein
    in the growing step, the plurality of carbon nanotubes and the carbon-containing gas pass through a first flow channel,
    in the assembling step, the plurality of carbon nanotubes and the carbon-containing gas pass through one or more second flow channels located downstream of the first flow channel, and
    the one or more second flow channels each have an area in cross section smaller than an area in cross section of the first flow channel.

13. The method for manufacturing a carbon nanotube assembled wire according to claim 12, wherein the carbon-containing gas located downstream of the one or more second flow channels is lower in temperature than the carbon-containing gas located upstream of the one or more second flow channels.

14. The method for manufacturing a carbon nanotube assembled wire according to claim 12, wherein the carbon-containing gas located upstream of the one or more second flow channels has a temperature of 800° C. or more, and the carbon-containing gas located downstream of the one or more second flow channels has a temperature of 600° C. or less.

15. The method for manufacturing a carbon nanotube assembled wire according to claim 12, wherein
    in the one or more second flow channels, the carbon-containing gas at a downstream side is lower in temperature than the carbon-containing gas at an upstream side, and
    in the one or more second flow channels, the carbon-containing gas at a downstream end has a temperature of 600° C. or less.

16. The method for manufacturing a carbon nanotube assembled wire according to claim 12, wherein a first region in which the carbon-containing gas has a temperature of 600° C. or less is located in a downstream side in the one or more second flow channels, and the first region has a length of 1 cm or more in a longitudinal direction of the one or more second flow channels.

17. The method for manufacturing a carbon nanotube assembled wire according to claim 12, wherein the one or more second flow channels each have an area in cross section of 0.01 mm$^2$ or more and 4 mm$^2$ or less.

18. The method for manufacturing a carbon nanotube assembled wire according to claim 12, wherein a ratio S1/S2 is 100 or more and 1000000 or less, where S1 is an area in cross section of the first flow channel and S2 is an area in cross section of each of the one or more second flow channels.

19. The method for manufacturing a carbon nanotube assembled wire according to claim 12, wherein the one or more second flow channels each have a length of 10 mm or more and 200 mm or less.

20. The method for manufacturing a carbon nanotube assembled wire according to claim 12, wherein the one or more second flow channels each have a shape of a through hole with a helical groove in a periphery of the through hole.

21. The method for manufacturing a carbon nanotube assembled wire according to claim 12, each second flow channel of the one or more second flow channels has an area in cross section smaller in a downstream side of the second flow channel than in an upstream side of the second flow channel.

22. A method for manufacturing a carbon nanotube assembled wire bundle, the method comprising:
a growing step of growing a plurality of carbon nanotubes by supplying a carbon-containing gas to a plurality of catalyst particles in a suspended state to grow one or a plurality of carbon nanotubes from each of the plurality of catalyst particles;
a drawing step of drawing the plurality of carbon nanotubes by applying a tensile force to the plurality of carbon nanotubes in a suspended state;
an assembling step of obtaining a plurality of carbon nanotube assembled wires by orienting and assembling the plurality of carbon nanotubes in the suspended state in a direction along flow of the carbon-containing gas; and
a bundling step of obtaining a carbon nanotube assembled wire bundle by orienting and bundling the plurality of carbon nanotube assembled wires in a direction along a longitudinal direction of the plurality of carbon nanotube assembled wires,
wherein the tensile force is applied to the carbon nanotube by varying a flow velocity of the carbon-containing gas, and
wherein an average flow velocity of the carbon-containing gas at a downstream side is higher than an average flow velocity of the carbon-containing gas at an upstream side.

23. The method for manufacturing a carbon nanotube assembled wire bundle according to claim 22, wherein the bundling step includes: an adhering step of adhering a volatile liquid to the plurality of carbon nanotube assembled wires; and an evaporating step of evaporating the volatile liquid adhered to the plurality of carbon nanotube assembled wires.

24. The method for manufacturing a carbon nanotube assembled wire bundle according to claim 23, wherein the adhering step is performed before orienting and bundling the plurality of carbon nanotube assembled wires in the direction along the longitudinal direction of the plurality of carbon nanotube assembled wires.

25. The method for manufacturing a carbon nanotube assembled wire bundle according to claim 23, wherein the adhering step is performed after orienting and bundling the plurality of carbon nanotube assembled wires in the direction along the longitudinal direction of the plurality of carbon nanotube assembled wires.

26. The method for manufacturing a carbon nanotube assembled wire bundle according to claim 22, wherein the bundling step is performed while tension is applied to the plurality of carbon nanotube assembled wires.

27. The method for manufacturing a carbon nanotube assembled wire bundle according to claim 22, wherein
in the growing step, the plurality of carbon nanotubes and the carbon-containing gas pass through a first flow channel,
in the assembling step and the bundling step, the plurality of carbon nanotubes and the carbon-containing gas pass through one or more second flow channels located downstream of the first flow channel, and
the one or more second flow channels each have an area in cross section smaller than an area in cross section of the first flow channel.

28. The method for manufacturing a carbon nanotube assembled wire bundle according to claim 27, wherein the one or more second flow channels each have a shape of a through hole with a helical groove in a periphery of the through hole.

29. The method for manufacturing a carbon nanotube assembled wire bundle according to claim 27, wherein
the one or more second flow channels are a plurality of second flow channels, and
a distance between nearest neighbor second flow channels of the plurality of second flow channels is shorter in a downstream side of the nearest neighbor second flow channels than in an upstream side of the nearest neighbor second flow channels.

30. The method for manufacturing a carbon nanotube assembled wire bundle according to claim 27, wherein each second flow channel of the second flow channels has an area in cross section smaller in a downstream side of the second flow channel than in an upstream side of the second flow channel.

31. A carbon nanotube manufacturing apparatus comprising:
a carbon nanotube growing unit in a tubular shape;
a gas supplying unit that supplies a carbon-containing gas into the carbon nanotube growing unit from one end of the carbon nanotube growing unit;
a catalyst supplying unit that supplies a catalyst particle into the carbon nanotube growing unit; and
a carbon nanotube drawing unit that is located on another end of the carbon nanotube growing unit and draws a carbon nanotube obtained in the carbon nanotube growing unit,
wherein a hollow portion in the carbon nanotube drawing unit passing the carbon-containing gas has a cross section smaller in area than a hollow portion in the carbon nanotube growing unit passing the carbon-containing gas, and
wherein the average flow velocity of the carbon-containing gas on the downstream side is larger than the average flow velocity of the carbon-containing gas on the upstream side.

32. A carbon nanotube assembled wire manufacturing apparatus comprising:
a carbon nanotube growing unit in a tubular shape;
a gas supplying unit that supplies a carbon-containing gas into the carbon nanotube growing unit from one end of the carbon nanotube growing unit;
a catalyst supplying unit that supplies a catalyst particle into the carbon nanotube growing unit; and
a carbon nanotube assembling unit that is located on another end of the carbon nanotube growing unit, and orients and assembles a plurality of carbon nanotubes obtained in the carbon nanotube growing unit, in a direction along flow of the carbon-containing gas,
wherein an average flow velocity of the carbon-containing gas in the carbon nanotube assembling unit is higher than an average flow velocity of the carbon-containing gas in the carbon nanotube growing unit, and
the carbon nanotube growing unit has a first flow channel in the carbon nanotube growing unit, the carbon nanotube assembling unit has one or more second flow channels in the carbon nanotube assembling unit, and the one or more second flow channels each have an area in cross section smaller than an area in cross section of the first flow channel.

33. The carbon nanotube assembled wire manufacturing apparatus according to claim 32, wherein in the carbon nanotube assembling unit, the carbon nanotubes obtained in the carbon nanotube growing unit are drawn.

34. The carbon nanotube assembled wire manufacturing apparatus according to claim 32, wherein the carbon nanotube assembling unit has a honeycomb structure.

35. The carbon nanotube assembled wire manufacturing apparatus according to claim 34, wherein
the honeycomb structure is a honeycomb structural body having a plurality of second flow channels formed by a plurality of through holes, and
the second flow channels each have an area in cross section of 0.01 mm$^2$ or more and 4 mm$^2$ or less.

36. The carbon nanotube assembled wire manufacturing apparatus according to claim 32, wherein a ratio S1/S2 is 100 or more and 1000000 or less, where S1 is an area in cross section of the first flow channel and S2 is an area in cross section of each of the second flow channels.

37. The carbon nanotube assembled wire manufacturing apparatus according to claim 32, wherein in the carbon nanotube assembling unit, the plurality of carbon nanotubes are reduced in diameter.

38. The carbon nanotube assembled wire manufacturing apparatus according to claim 32, wherein the second flow channels of the carbon nanotube assembling unit each have a length of 10 mm or more and 200 mm or less.

39. The carbon nanotube assembled wire manufacturing apparatus according to claim 32, wherein the second flow channels each have a shape of a through hole with a helical groove in a periphery of the through hole.

40. The carbon nanotube assembled wire manufacturing apparatus according to claim 32, wherein each second flow channel of the second flow channels has an area in cross section smaller in a downstream side of the second flow channel than in an upstream side of the second flow channel.

41. A carbon nanotube assembled wire bundle manufacturing apparatus comprising:
a carbon nanotube assembled wire manufacturing apparatus according to claim 32; and
a bundling unit that obtains a carbon nanotube assembled wire bundle by orienting and bundling a plurality of carbon nanotube assembled wires obtained by the carbon nanotube assembled wire manufacturing apparatus, in a direction along a longitudinal direction of the plurality of carbon nanotube assembled wires.

42. The carbon nanotube assembled wire bundle manufacturing apparatus according to claim 41, wherein the bundling unit includes a liquid adhering apparatus that adheres a volatile liquid to the plurality of carbon nanotube assembled wires.

43. The carbon nanotube assembled wire bundle manufacturing apparatus according to claim 41, wherein the bundling unit includes a winding apparatus that winds the plurality of carbon nanotube assembled wires oriented and bundled in the direction along the longitudinal direction of the plurality of carbon nanotube assembled wires while applying tension to the plurality of carbon nanotube assembled wires.

44. The carbon nanotube assembled wire bundle manufacturing apparatus according to claim 41, wherein
the carbon nanotube assembling unit and the bundling unit are formed of the same honeycomb structural body having a plurality of second flow channels, and
the second flow channels each have a shape of a through hole with a helical groove in a periphery of the through hole.

45. The carbon nanotube assembled wire bundle manufacturing apparatus according to claim 44, wherein a distance between nearest neighbor second flow channels of the plurality of second flow channels is shorter in a downstream side of the nearest neighbor second flow channels than in an upstream side of the nearest neighbor second flow channels.

46. The carbon nanotube assembled wire bundle manufacturing apparatus according to claim 44, wherein each second flow channel of the second flow channels has an area in cross section smaller in a downstream side of the second flow channel than in an upstream side of the second flow channel.

* * * * *